United States Patent
Biswas et al.

(10) Patent No.: US 12,321,493 B2
(45) Date of Patent: Jun. 3, 2025

(54) METHOD AND APPARATUS FOR INTERACTIVE AND PRIVACY-PRESERVING COMMUNICATION BETWEEN A SERVER AND A USER DEVICE

(71) Applicant: Philip Morris Products S.A., Neuchatel (CH)

(72) Inventors: Debmalya Biswas, Neuchatel (CH); Louis Beck, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 180 days.

(21) Appl. No.: 17/904,652

(22) PCT Filed: Feb. 18, 2021

(86) PCT No.: PCT/EP2021/054073
§ 371 (c)(1),
(2) Date: Aug. 19, 2022

(87) PCT Pub. No.: WO2021/165425
PCT Pub. Date: Aug. 26, 2021

(65) Prior Publication Data
US 2023/0096240 A1    Mar. 30, 2023

(30) Foreign Application Priority Data
Feb. 21, 2020 (EP) .................... 20158838

(51) Int. Cl.
*G06F 21/62* (2013.01)
*G06F 21/57* (2013.01)
*G06V 40/16* (2022.01)

(52) U.S. Cl.
CPC ........ *G06F 21/6254* (2013.01); *G06F 21/577* (2013.01); *G06V 40/161* (2022.01);
(Continued)

(58) Field of Classification Search
CPC ............. G06F 21/6254; G06F 18/2413; G06F 2221/033; G06F 21/577; G06V 40/161; G06V 40/174; G06V 40/168
(Continued)

(56) References Cited

U.S. PATENT DOCUMENTS 11,373,446 B1 * 6/2022 Beisel ..................... G10L 25/63
2010/0328492 A1   12/2010 Fedorovskaya et al.
(Continued)

FOREIGN PATENT DOCUMENTS

CN    107807947 A    3/2018
JP    2010-508710 A   3/2010
(Continued)

OTHER PUBLICATIONS

International Search Report mailed on Mar. 11, 2021 in PCT/EP2021/054073 filed on Feb. 18, 2021 (citing references 1-4 therein, 3 pages).
(Continued)

*Primary Examiner* — Benjamin A Kaplan
(74) *Attorney, Agent, or Firm* — Oblon, McClelland, Maier & Neustadt, L.L.P.

(57) ABSTRACT

A computer-implemented method is provided for interactive communication of a user device with a server, the method including: providing, on the user device, a notification to a user of the user device; acquiring reaction data indicative of a reaction of the user to the notification; and determining, based on the acquired reaction data, a sentiment score for transmission to the server, in which the sentiment score is indicative of a sentiment of the user in reaction to the notification. A nontransitory computer-readable storage medium, an a user device for interactive communication with a server, are also provided.

12 Claims, 5 Drawing Sheets

(52) U.S. Cl.
CPC ...... *G06V 40/168* (2022.01); *G06F 2221/033* (2013.01); *G06V 40/174* (2022.01)

(58) Field of Classification Search
USPC .......................................................... 726/25
See application file for complete search history.

(56) References Cited

U.S. PATENT DOCUMENTS

| | | |
|---|---|---|
| 2012/0072936 A1 | 3/2012 | Small et al. |
| 2014/0191872 A1 | 7/2014 | Gomi et al. |
| 2016/0275175 A1 | 9/2016 | Gomi et al. |
| 2016/0379047 A1 | 12/2016 | Natan et al. |
| 2020/0210528 A1* | 7/2020 | Agnihotram ............ G06F 40/30 |

FOREIGN PATENT DOCUMENTS

| | | |
|---|---|---|
| JP | 2012-155616 A | 8/2012 |
| JP | 2019-185201 A | 10/2019 |
| KR | 10-2013-0014161 A | 2/2013 |
| KR | 10-2018-0014195 A | 2/2018 |
| RU | 2 331 918 C2 | 8/2008 |

OTHER PUBLICATIONS

Written Opinion mailed on Nov. 8, 2021 in PCT/EP2021/054073 filed on Feb. 18, 2021 (citing references 1, 2 & 4 therein, 8 pages).
International Preliminary Report on Patentability mailed on Mar. 23, 2022 in PCT/EP2021/054073 filed on Feb. 18, 2021 (citing references 1, 2 & 4 therein, 9 pages).
Japanese Office Action issued Oct. 30, 2023 in Japanese Patent Application No. 2022-549855 (with English translation), citing documents 15-17 therein, 9 pages.
Combined Russian Office Action and Search Report issued Apr. 26, 2023 in Russian Patent Application No. 2022124672/07(053435) (with English translation), citing document 18 therein, 13 pages.
Russian Office Action issued Jul. 31, 2023 in Russian Patent Application No. 2022124672/07(053435) (with English translation), citing document 1 therein, 13 pages.
Korean Office Action issued Oct. 19, 2024 in Korean Patent Application No. 10-2022-7031311 (with English Translation), citing references 15 and 16 therein, 18 pages.
Chinese Office Action and Search Report issued Jan. 4, 2025 in corresponding Chinese Patent Application No. 202180014293.7, with English Translation, 25 pages.

* cited by examiner

METHOD AND APPARATUS FOR INTERACTIVE AND PRIVACY-PRESERVING COMMUNICATION BETWEEN A SERVER AND A USER DEVICE

The present disclosure generally relates to the field of interactive communication between a server and a user device. In particular, the present disclosure relates to a computer-implemented method for interactive communication of a user device with a server, to a computer-implemented method for interactive communication of a server with a user device and to a computer-implemented method for interactive communication between a server and a user device. The present disclosure further relates to a user device for interactive communication with a server, to a use of such a user device, to a server for interactive communication with a user device and to a system comprising such a user device and such a server. Further, the present disclosure relates to one or more computer programs and to one or more computer-readable mediums.

In an exemplary interactive communication, a query received from a user device may be processed by one or more servers, for example using a Natural Language Processing ("NLP") engine or any other engine configured to process the query. The query can be sent or transmitted from the user device to the one or more servers via a communication link or data connection between the user device and the one or more servers. The query may then be processed by the one or more servers and one or more notifications may be provided to the user device in response. By way of example, such query can comprise or be indicative of one or more of a textual input of the user via a user interface of the user device, an oral input via a microphone of the user device, and a video-based input via a camera of the user device. Further, the one or more notifications provided by the one or more servers in response to the query may, for example, comprise at least one of a text, a sound, an acoustic message, a message, an alert, an image, and a video.

Therein, identifying or selecting a notification that is an appropriate response to the query received from the user device can be a challenging task. For this purpose, for example a deep reinforcement learning model or reinforcement learning model can be implemented on the one or more servers, wherein feedback from the users regarding the notifications provided in response to queries can be used as a reward for improving the reinforcement learning model in terms of providing more appropriate, accurate and/or correct answers or notifications to queries with content.

The process of improving the reinforcement learning model, however, can require a significant amount of computing power on the one or more servers. Moreover, the feedback from the users may contain private information about the users, which may raise concerns about data protection at the user side and may require additional safety measures at the server side.

Therefore, it may be desirable to provide for improved methods and apparatuses for interactive communication between a server and a user device. This is achieved by the subject matter of the independent claims, wherein further embodiments are incorporated in the dependent claims and following description.

In the following, various aspects as well as embodiments and examples of those aspects of the present disclosure are described. It should be noted that various aspects of the present disclosure relate at least in part, primarily or entirely to one or more of at least one server, at least one user device, at least one user-side device, at least one user-side sensor, and at least one system comprising one or more of the such components or devices. In other words, the present invention may be considered as being dispersed among one or more of at least one server, at least one user device, at least one user-side device, at least one user-side sensor, and at least one system comprising one or more of the such components or devices.

It is emphasized, however, that any feature, step, function, element, technical effect and/or advantage described hereinabove and hereinbelow with reference to one aspect of the present disclosure, equally applies to any other aspect of the present disclosure, as described hereinabove and hereinbelow.

According to a first aspect of the present disclosure, there is provided a computer-implemented method for interactive communication of a user device with a server. The method according to the first aspect may alternatively or additionally relate to a computer-implemented method for operating a user device, for example for interactive communication with a server, and optionally for operating one or more user-side devices. The method comprises:

providing, on the user device, a notification to a user of the user device;

acquiring reaction data indicative of a reaction of the user to the notification;

determining, based on the acquired reaction data, a sentiment score for transmission to the server, wherein the sentiment score is indicative of a sentiment of the user in reaction to the notification.

As will be described and discussed in more detail hereinafter, determining the sentiment score for transmission to the server on the user device may allow to significantly improve an interactive communication between the server and the user device or between the server and the user of the user device. In particular, by determining the sentiment score on the user device, computing resources used by the server for the interactive communication may be significantly reduced. Alternatively or additionally, a process or method of selecting (or engine or module configured to), identifying and/or generating a notification on the server can be improved in terms of efficiency, quality and accuracy. Alternatively or in addition, determining the sentiment score on the user device may allow for preserving privacy or anonymity of the user of the user device.

In the context of the present disclosure, the interactive communication between the server and the user device may comprise, for example, one or more notifications sent or transmitted from the server to the user device. Alternatively or in addition, the interactive communication between the server and the user device may comprise one or more queries sent or transmitted from the user device to the server, for example in response to one or more user inputs at the user device. Therein, the one or more notifications may be sent or transmitted from the server to the user device in response to the one or more queries. Alternatively or in addition, the one or more notifications may be sent or transmitted from the server to the user device proactively or automatically. For instance, the one or more notifications or at least some of the notifications may be time-triggered and/or event-triggered.

Further, the notification provided on the user device may refer to a notification, for example having or including content, that can be brought to the user's attention via the user device. For example, the notification can comprise one or more of at least one character, at least one symbol, at least one number, a text, a sound, an acoustic message, a question, an answer to a question, a statement, a request, a message, a text message, at least one icon, an alert, an acoustic alert, an optical alert, at least one image and a video. Generally, the notification may trigger and/or may be configured to trigger a reaction of the user.

Similarly, in the context of the present disclosure, a query can comprise one or more of at least one character, at least one symbol, at least one number, a text, a rating, a question, an answer to a question, a statement, a request, a sound, an acoustic message, a message, a text message, at least one icon, at least one image and a video. For instance, a query may comprise a textual input received via a user interface at the user device, an oral input received via a microphone at the user device and/or a video-based input received via a camera of the user device.

In a non-limiting example, the interactive communication between the user device and the server may be FAQ-based (Frequently Asked Questions, "FAQ"), and a query may relate to or comprise a question of the user transmitted via the user device to the server, which question or query can be answered with one or more notifications of the server.

Further, the reaction of the user to the notification may, for example, be or refer to a movement of the user, a gesture of the user, a motion of the user, a mimic of the user, a facial expression of the user, a head movement, an emotion, an emotional expression, a head shaking, a nodding, a smile, a mouth movement, a change in skin tone of the user, a change in skin tone, a verbal reaction, an acoustic reaction, and a body reaction, such as for example goose skin, goose bumps, a shaking body part, a shaking hand, or the like. The skilled person would understand that these reactions can be sensed using readily available systems. For instance, various software packages are provided for detecting emotion, and emotional expression from image data. One example, of this software is the facial detection package provided by Microsoft Azure™.

In the context of the present disclosure, the term "reaction data" is to be understood or construed broadly. For example, the reaction data may comprise or refer to data containing information about, being indicative of, being representative of, and/or being descriptive of one or more reactions of the user to one or more notifications. Alternatively or in addition, the reaction data may comprise or refer to data containing information about, being indicative of, being representative of, and/or being descriptive of one or more reactions of the user, which reactions may be un-related to the one or more notifications and/or may not be caused or triggered by the one or more notifications.

By way of example, the reaction data may comprise or refer to sensor data of a sensor configured to sense one or more reactions of the user. Alternatively or additionally, the reaction data may refer to or comprise combined sensor data, such as for example sensor data from a plurality of sensors or independent sensors. Alternatively or in addition, the reaction data may refer to or comprise data derived from sensor data of one or more sensors.

As will be further discussed hereinbelow, at least in some embodiments, the reaction data may be acquired based on or using one or more sensors of the user device. Alternatively or in addition, the reaction data may be acquired based on or using one or more user-side sensors of one or more user-side devices.

Generally, the reaction of the user may be associated with, may be indicative of and/or may be an expression of the sentiment of the user in reaction and/or in response to the notification provided on the user device. Therein, the sentiment of the user can, for example, refer to or be indicative of a feeling, a mood, and/or an emotion of the user. Accordingly, by acquiring the reaction data, which can be indicative, descriptive and/or representative of the user's reaction to the notification, the sentiment of the user can be determined and/or derived from the reaction data.

In the context of the present disclosure, the sentiment score can refer to or be a measure or indicator, for example a numerical measure, numerical indicator, and/or a numerical score, indicative of the sentiment of the user in reaction to the notification provided on the user device. Accordingly, the sentiment or actual sentiment of the user may be encoded in and/or converted to the sentiment score. In other words, the sentiment score may be determined based on converting and/or encoding the sentiment of the user, for example as determined based on the reaction data, into the sentiment score. Alternatively or additionally, the sentiment score may be derived from the reaction data, for example based on processing at least some of or a part of the reaction data. Alternatively or additionally, determining the sentiment score may comprise computing and/or calculating the sentiment score, for example based on reaction data.

Moreover, the term sentiment score "for transmission to the server" may mean that the sentiment score can be configured for transmission and/or can be configured for being transmitted from the user device to the server.

As the sentiment score is indicative of the user's sentiment in reaction to the notification, the sentiment score can serve as and/or be indicative of a feedback of the user to the notification. Accordingly, the sentiment score and/or the feedback indicated therewith may reflect an accuracy, a level of adequacy and/or a quality of the notification. As the notification can, for example, be transmitted to the user device in response to one or more queries transmitted from the user device to the server, the sentiment score and/or the feedback indicated therewith may, alternatively or in addition, reflect an accuracy, a level of adequacy and/or a quality of the notification in response to the one or more queries.

Further, the determined sentiment score can be used by the server, can be usable by the server and/or can be configured for being used by the server to improve, personalize, adapt and/or modify the interactive communication between the server and the user device. For instance, the sentiment score may be usable by the server for modifying, personalizing and/or adapting an engine or module of the server configured to select, identify, determine and/or generate a notification, for example a notification in response to one or more queries from the user device.

In the context of the present disclosure the server may comprise at least one computing device, for example including one or more processors. It should be noted, however, that the server may refer to a server system, a computer system, a server network, a computing network, a cloud computing network or the like. Accordingly, any reference to "a server" or "the server" should be construed as also including a plurality of servers.

Generally, the server may comprise or include an engine or module for identifying, selecting and/or generating the notification to be sent or transmitted to the user device, for example in response to one or more queries from the user device. The server may, for example, comprise a Natural Language Processing ("NLP") module or engine configured to process, analyse and/or decompose one or more queries received from the user device. The server may further be configured to determine one or more notifications to be transmitted to the user device, for example in response to the one or more queries, proactively, in an automated manner, in a time-triggered manner and/or in an event-triggered manner.

Further, the server may comprise an artificial intelligence (also referred to as a recommendation engine) allowing to determine, identify, select and/or generate the notification, which may, for example, represent an appropriate or the most appropriate notification among or based on a plurality of potential notifications transmittable to the user device. By way of example, the server may comprise a knowledge base comprising a plurality of notifications transmittable to the user device. The artificial intelligence module of the server may be configured to determine, select, identify and/or generate the appropriate or the most appropriate notification among or based on the plurality of notifications in the knowledge base. For example, one or more queries received from the user device can be classified with the artificial intelligence module of the server to determine, select, identify and/or generate the appropriate or the most appropriate notification among or based on the plurality of notifications in the knowledge base.

In order to improve a quality, accuracy, a level of adequacy and/or an appropriateness of the notification selected by the artificial intelligence module of the server, for example in response to one or more queries from the user device, the sentiment score may advantageously be used by the server to train the artificial intelligence module. Accordingly, it may be possible to successively improve the artificial intelligence module over time by using one or more sentiment scores for training the artificial intelligence module.

Generally, the artificial intelligence module (and/or recommendation engine) may refer to a classifier arrangement or classifier circuitry of the server configured to classify an input, for example one or more queries, and determine an output, for example one or more notifications to be transmitted to the user device based on this classification. For instance, the artificial intelligence module may comprise a neural network, may refer to a machine learning module and/or may relate to a deep learning module. However, any other type of artificial intelligence module may be used.

By way of example, the server, the artificial intelligence module and/or the recommendation engine may comprise a reinforcement learning model, wherein the sentiment score may be used by the server for training the reinforcement learning model of the server. Generally, the reinforcement learning model may be configured for being trained based on maximizing and/or optimizing a reward function over time, for example successively and/or iteratively in a plurality of training steps. In each training step, a reinforcement learning reward (also referred to as "reward") reflecting and/or being indicative of a level of correctness or a quality of a decision of the reinforcement learning module taken can be supplied or fed to the reinforcement learning model in order to penalize the reinforcement learning model, when it takes a wrong decision, and reward it, when it takes a correct decision.

Accordingly, the sentiment score may advantageously be used as a reinforcement learning reward. Alternatively or additionally, a reinforcement learning reward may be derived from and/or determined based on the sentiment score, which reinforcement learning reward can be used by the server to train the reinforcement learning model of the server or impended on the server. For instance, the sentiment score may correlate with and/or be indicative of a reinforcement learning reward for training the reinforcement learning model of the server.

Accordingly, based on the sentiment score, the reinforcement learning model and/or the artificial intelligence module of the server may be efficiently and accurately trained, thereby allowing to efficiently improve the interactive communication between the server and the user device, for example in terms of improving a level of accuracy, a level of adequacy, a quality and/or an appropriateness of one or more notifications selected, identified, and/or generated by the server, for example in response to one or more queries from the user device.

Moreover, the interaction between the server and the user device may be personalized over time based on the sentiment score. Therefore, it may be possible to meet user demands, while requiring minimum user efforts to ensure a sufficient level of correctness for providing a correct notification to a response from the user device. Such efforts may, for example, be entailed in requesting explicit feedback from the user, for example based on rating the correctness of a notification provided in response to a query. Accordingly, based on the sentiment score, the interaction between the server and the user device may be improved in an automated manner, while keeping user efforts, such as explicit feedback from the user, at a minimum or eliminating such user efforts.

In the context of the present disclosure, the user device may refer to any device or apparatus configured to communicate with the server, for example based on exchanging data or information. Generally, the user device may be a handheld or portable device. Alternatively the user device may be a stand-alone or fixedly installed device. By way of example, the user device may refer to a handheld, a smart phone, a personal computer ("PC"), a tablet PC, a notebook, or a computer. The user device may be configured for receiving, for example via a user interface of the user device, an input from the user, such as for example one or more queries.

The user device may comprise one or more processors for data processing. Further, the user device may comprise a data storage for storing data, such as for example the reaction data. The user device may have software instructions or a computer program stored in the data storage, which, when executed by the one or more processors, instruct the user device to perform one or more steps of the method according to the first aspect and/or any other aspect of the present disclosure. Alternatively or additionally, an app or computer program may be stored on the user device configured to interactively communicate with server, for example based on transmitting one or more queries to the server and receiving one or more notifications in response thereto.

The user device may be configured to communicate with the server via a communication link or a communication connection between the server and the user device, for example using a communication protocol, standard or technology. For this purpose, the user device may comprise a communication circuitry couplable with a corresponding communication arrangement of the server to allow data exchange between the user device and the server. By way of example, the user device may be couplable and/or may be configured to communicate with the server (and vice versa) via an Internet connection, a WiFi connection, a Bluetooth connection, a mobile phone network, a 3G connection, an edge connection, an LTE connection, a BUS connection, a wireless connection, a wired connection, a radio connection, a near field connection, an IoT connection or any other connection using any appropriate communication protocol.

The method may further comprise transmitting the determined sentiment score to the server. In other words, the sentiment score can be transmitted from the user device to the server. Therein, transmitting the sentiment score to the server may comprise providing and/or sending the sentiment score to the server. Optionally, transmitting the sentiment score to the server may comprise establishing a communication link or connection between the user device and the server. Optionally, transmitting the sentiment score may comprise confirming receipt of the sentiment score at the server, for example based on a signal or a confirmation transmitted by the server to the user device upon receipt of the sentiment score. By transmitting the sentiment score to the server, the sentiment score can be provided to the server, thereby enabling the server to use the sentiment score, for example for improving, modifying, personalizing and/or adapting the interactive communication between the server and the user device.

The sentiment score may be transmitted by the user device to the server in an automated manner. This may mean that no user interaction with the user device and/or no user input at the user device may be required for transmitting the sentiment score. Accordingly, determination of the sentiment score may trigger transmission of the sentiment score to the user device. Alternatively or additionally, the sentiment score may be transmitted upon or in response to a user input at the user device.

The sentiment score may determined by the user device, for example based on processing at least a part of the reaction data with a control circuitry of the user device. Alternatively or in addition, the sentiment score may be determined by, at and/or on at least one user-side device communicatively coupled or couplable with the user device. For instance, the user device may instruct the user-side device to determine the sentiment score based on processing at least a part of the reaction data. Alternatively or in addition, determining the sentiment score may comprise determining the sentiment score on the user device and providing the sentiment score to the user-side device, for example for transmission to the server or for further processing of the sentiment score. Alternatively or in addition, determining the sentiment score may comprise determining the sentiment score on the user-side device and providing the sentiment score to the user device, for example for transmission to the server or for further processing of the sentiment score.

Determining the sentiment score on the user device and/or on the user-side device may advantageously allow to reduce computing resources used on the server, for example because the computing burden of determining the sentiment score can be distributed to the user device and/or the user-side device. In turn, the overall interactive communication between the server and the user device can be significantly improved, for example in terms of a more efficient and faster reaction of the server in response to queries from user device. Apart from that efforts and costs, for example hardware costs and/or maintenance costs for the server, can be advantageously reduced.

In the context of the present disclosure, the user-side device may refer to a device or apparatus arranged in a vicinity of, a surrounding of, an environment of and/or remote from the user device. Alternatively or additionally, the user-side device may refer to a device or apparatus that is at least partly under a control of the user of the user device. For instance, the user device may be configured to transmit one or more control signals to the user-side device and/or the user-side device may be configured to receive one or more control signals from the user device. Alternatively or additionally, the user-side device may refer to a device or apparatus that is connected to the user device via a common communication network, for example the same Local Area Network (LAN) as the user device.

The user-side device may be configured to communicate with the user device via a communication link or a communication connection between the user-side device and the user device, for example using a communication protocol, standard or technology. For this purpose, the user-side device may comprise a communication circuitry couplable with a corresponding communication circuitry of the user device to allow data exchange between the user device and the user-side device. By way of example, the user-side device may be couplable and/or may be configured to communicate with the user device (and vice versa) via an Internet connection, a WiFi connection, a Bluetooth connection, a mobile phone network, a 3G connection, an edge connection, an LTE connection, a BUS connection, a wireless connection, a wired connection, a radio connection, a near field connection an IoT connection or any other connection using any appropriate communication protocol.

Further, the user-side device may be configured to communicate with the server via a communication link or a communication connection between the user-side device and the server, for example using a communication protocol, standard or technology. For this purpose, the user-side device may comprise a communication circuitry couplable with a corresponding communication arrangement of the server to allow data exchange between the server and the user-side device. By way of example, the user-side device may be couplable and/or may be configured to communicate with the server (and vice versa) via an Internet connection, a WiFi connection, a Bluetooth connection, a mobile phone network, a 3G connection, an edge connection, an LTE connection, a BUS connection, a wireless connection, a wired connection, a radio connection, a near field connection an IoT connection or any other connection using any appropriate communication protocol. The user-side device may be configured to communicate with the server via the user device.

The user-side device may be configured to sense, monitor and/or detect a vicinity, environment, and/or surrounding of the user-side device. For this purpose, the user-side device may comprise one or more user-side sensors. The user-side device may, for example, be configured to capture and/or acquire at least a part of the reaction data. Alternatively or additionally, the user-side device may comprise a controller or control circuitry configured to process data, for example the reaction data and/or user-side sensor data acquired with one or more user-side sensors of the user-side device.

By way of example, the user-side device may refer to or be one or more of a smart TV, a smart speaker, a smart watch, smart device a health monitor, and an electric aerosol-generating device. It should be noted, however, that the present disclosure is not limited to the foregoing exemplary user-side devices.

The determined sentiment score may be transmitted from the user device to the server and/or from at least one user-side device communicatively coupled with the user device. By way of example, the user device may, for example upon determination of the sentiment score at the user device or at the user-side device, instruct the user-side device to transmit the sentiment score to the server. Alternatively or in addition, transmitting the sentiment score to the server may comprise transmitting the sentiment score from the user device to the user-side device and transmitting the sentiment score from the user-side device to the server. Vice versa, transmitting the sentiment score to the server may comprise transmitting the sentiment score from the user-side device to the user device and transmitting the sentiment score from the user device to the server.

The reaction data or at least a part thereof may be acquired at and/or by the user device. Alternatively or additionally, the reaction data or at least a part thereof can be acquired at and/or by at least one user-side device communicatively coupled or couplable with the user device. Alternatively or additionally, a part of the reaction data may be acquired at the user device and a further part of the reaction data may be acquired at the at least one user-side device. Various parts of the reaction data may further be merged and/or combined, for example on the user device and/or on the at least one user-side device. It should be noted that, alternatively or additionally, the reaction data may be entirely acquired at the user device and/or at the user-side device. In other words, a complete set of reaction data may be acquired at the user device and/or at the user-side device. Accordingly, it may be possible to perform a plausibility check of the reaction data, for example based on comparing the reaction data acquired with the user device with the reaction data acquired at the user-side device.

The method may further comprise receiving, at the user device, a query, wherein the notification is provided in response to the query by the server. Therein, the query may be received at the user device based on one or more user inputs, for example via a user interface, a microphone, a camera, and/or a sensor of the user device. Alternatively or additionally, the notification may be provided on the user device by the server in response to the query.

The method may further comprise transmitting the query, received at the user device, to the server. Therein, transmitting the query may comprise sending the query, for example in the form of one or more data packages, to the server. Optionally, transmitting the query to the server may comprise establishing a communication link or connection between the user device and the server.

The query may comprise a textual input received via a user interface at the user device, an oral input received via a microphone at the user device and/or a video-based input received via a camera of the user device. As noted above, the query can comprise one or more of at least one character, at least one symbol, at least one number, a text, a question, an answer to a question, a statement, a request, a sound, an acoustic message, a message, a text message, at least one icon, at least one image and a video.

The notification may comprise one or more of at least one character, at least one symbol, at least one number, a text, a sound, an acoustic message, a question, an answer to a question, a statement, a request, a message, a text message, at least one icon, an alert, an acoustic alert, an optical alert, at least one image and a video. It should be noted, however, that the notification may be any other type of notification. The notification may comprise any suitable content.

The sentiment score may be an anonymized numerical measure (or score) indicative of the reaction of the user to the notification. Alternatively or additionally, the sentiment score may be correlate with and/or may be indicative of a reinforcement learning reward configured for being used by the server for training a reinforcement learning model implemented on the server.

Therein, the term "anonymized" may mean that the sentiment score does not contain, lacks and/or is lacking personal information and/or personal data about the user of the user device. Generally, the sentiment score may be regarded as or may refer to a numerical measure of the reaction of the user to the notification provided on the user device.

Further, the sentiment score may be measured on a scale, which can be a scale of absolute or relative values, between a minimum value of the sentiment score and a maximum value of the sentiment score, wherein an actual value of the sentiment score may be indicative of and/or reflect the sentiment, a current sentiment and/or an actual sentiment of the user in reaction to the notification.

By way of example, the sentiment score could be measured on a scale between "−10" and "+10", wherein a sentiment score of "−10" could refer to a most negative reaction of the user to the notification, a sentiment score of "0" could refer to a neutral reaction of the user to the notification, and a sentiment score of "+10" could refer to the most positive reaction of the user to the notification. It is emphasized, however, that any other scale could be used for the sentiment score, including a scale with non-integer values of the sentiment score.

Determining the sentiment score may comprise:
  determining an intermediate sentiment score based on the acquired reaction data; and
  anonymizing the intermediate sentiment score, thereby generating the sentiment score.

Therein, the intermediate sentiment score may comprise information or data related to personal information and/or personal data of the user, whereas the sentiment score may not contain or comprise any personal information and/or personal data of the user. Accordingly, the intermediate sentiment score may be regarded as an intermediate quantity or measure that can be determined, for example temporarily determined, in order to determine the sentiment score. Generally, the intermediate sentiment score can be determined and anonymized on the user device and/or on at least one user-side device.

Generally, anonymizing the intermediate sentiment score to generate the sentiment score as anonymized score or measure advantageously allows to preserve privacy or anonymity of the interactive communication between the server and the user device. This may mean that no personal information or personal data of the user or related to the user may be transmitted from the user device to the server. On the other hand, the (anonymized) sentiment score may, irrespective of the anonymization, be equally usable for improving and/or personalizing the interactive communication between the user device and the server, for example based on training an artificial intelligence module and/or a reinforcement learning model on the server based on the sentiment score, as it would be the case if personal information or data such as the reaction data would be transmitted to the server. Accordingly, determining the sentiment score based on anonymizing the intermediate sentiment score may allow to selectively provide the information or data to the server that may be useful for improving the overall interactive communication, without providing any personal information or personal data to the server.

In addition, privacy concerns of the user can be complied with in a comprehensive manner. In turn, this may decrease the likelihood of secure data relating to user being compromised Moreover, from the server's perspective, the processing burden and costs involved in security or safety related measures, can be effectively reduced, as no personal data or information may be processed by or stored on the server. Hence, also no computing resources may be required for additional safety measures on the server, which can lead to a more efficient and faster reaction of the server in response to queries from the user device. Also, an overall performance of the server can be increased and processing burden and costs, for example hardware costs and/or maintenance costs, which could otherwise be required for providing comprehensive safety measures on the server, can be effectively reduced.

Apart from that, by determining the anonymized sentiment score and transmitting the sentiment score to the server for improving the interactive communication, an amount or volume of data that is transmitted from the user device and/or a user-side device to the server can be significantly reduced, for example when compared to transmitting the reaction data to the server and determining the sentiment score on the server. This can further improve the overall performance of the server and improve the overall interactive communication between the server and the user device, for example in terms of a more efficient and faster reaction of the server in response to queries from user device.

The sentiment score may be anonymized based on normalizing the intermediate sentiment score with a reference sentiment score (and/or a reference sentiment score value). Therein, the reference sentiment score may be chosen, for example depending on the scale, on which the sentiment score is determined. For instance, the reference sentiment score may refer to and/or be indicative of a most negative reaction of the user to the notification, a neutral reaction of the user to the notification, a most positive reaction of the user to the notification, or any reaction of the user therebetween. Further, normalizing the intermediate sentiment score may comprise converting the intermediate sentiment score into the sentiment score based on the reference sentiment score. For instance, the intermediate sentiment score may be divided by or multiplied with the reference sentiment score. However, any other mathematical operation can be applied. Further, it should be noted that the sentiment score can be given in absolute values or in relative values.

Optionally, further safety measures and/or privacy preserving schemes can be implemented on the user device and/or on a user-side device for protecting the intermediate sentiment score and/or the sentiment score. For instance, secret sharing, encryption and/or homomorphic encryption can be used on the user device and/or the user-side device.

The method may further comprise removing the intermediate sentiment score from the user device upon anonymizing the intermediate sentiment score and/or upon generating the sentiment score. Alternatively or additionally, the intermediate sentiment score can be removed from at least one user-side device. By removing the intermediate sentiment score from the user device and/or the at least one user-device, private or personal information of the user can be further protected. Therein, removing the intermediate sentiment score may comprise deleting, overriding and/or destroying the intermediate sentiment score.

The method may further comprise removing the sentiment score from the user device upon transmitting the sentiment score to the server. Alternatively or additionally, the sentiment score may be removed from at least one user-side device upon transmitting the sentiment score to the server. In other words, transmission of the sentiment score to the server, for example from the user device and/or from at least one user-side device, may trigger removal of the sentiment score from the user device and/or from the user-side device. Hence, it may be ensured that no storage resources or memory is used or blocked by the sentiment score, if it has been transmitted to the server.

Providing the notification on the user device may include displaying the notification on a user interface of the user device. Displaying the notification on the user device may allow to reliably bring the notification to the user's attention. Alternatively or additionally, providing the notification on the user device can comprise playing or outputting the notification via a microphone.

Acquiring the reaction data may include retrieving the reaction data from a data storage of the user device. Alternatively or additionally, acquiring the reaction data may include retrieving the reaction data from a data storage or memory of one or more user-side devices. Alternatively or additionally, acquiring the reaction data may include requesting, by the user device, the reaction data to be transmitted from one or more user-side devices to the user device. Alternatively or additionally, acquiring the reaction data may comprise instructing, by the user device, one or more user-side devices to transmit the reaction data to the user device.

Acquiring the reaction data may include capturing sensor data with at least one sensor of the user device. In other words, the reaction data or at least a part thereof may be acquired based on sensor data of one or more sensors of the user device.

The method may further comprise deriving, with the user device, the reaction data from the captured sensor data of the at least one sensor of the user device. Therein, deriving the reaction data may comprise processing the sensor data, for example by a control circuitry of the user device. Such processing may, for example, comprise one or more of filtering, transforming, and converting the captured sensor data to generate the reaction data. Alternatively or additionally, deriving the reaction data may comprise selecting at least a part of the sensor data as reaction data. Alternatively or additionally, deriving the reaction data may comprise using at least a part of the sensor data as reaction data. Alternatively or additionally, deriving the reaction data may comprise combining at least a part of the sensor data with further sensor data of a further sensor of the user device and/or with user-side sensor data of at least one user-side sensor.

The at least one sensor of the user device may be at least one of a camera, an acoustic sensor, an accelerometer, a motion sensor, a gyroscope, a capacitive sensor, a touch sensor, a piezoelectric sensor, a piezoresistive sensor, a Hall sensor, an optical sensor, an infrared sensor, a near field sensor, and a position sensor. Such sensors may advantageously allow to detect or sense the user's reaction in response to the notification and, in turn, may allow to reliably and determine the reaction data indicative of user's reaction. It should be noted, however, that any other type of sensor of the user device can be used for capturing sensor data and/or for determining the reaction data based thereon.

The reaction data may be acquired based on sensor data from a plurality of sensors, for example sensors of different types, of the user device. Accordingly, acquiring the reaction data may comprise capturing sensor data with a plurality of sensors of the user device. Therein, sensor data of different sensors may be combined, merged and/or fused for determining the reaction data. Accordingly, it may be possible to provide accurate and comprehensive reaction data, for example which may accurately and comprehensively reflect the user's reaction to the notification and/or which may contain comprehensive and accurate information about the user's reaction to the notification. Alternative or in addition, using sensor data of a plurality of sensors for determining the reaction data may allow for a plausibility check of the sensor data and/or the reaction data.

For example, first sensor data of a first sensor of the user device may be captured and the first sensor data may be supplemented, merged, combined and/or fused with second sensor data of a second sensor of the user device to generate the reaction data, wherein the first sensor may differ from the second sensor.

Acquiring the reaction data may comprise receiving, with and/or at the user device, user-side sensor data from at least one user-side sensor communicatively couplable with the user device. In other words, the reaction data or at least a part thereof may be acquired based on user-side sensor data of one or more user-side sensors. Therein, the "user-side sensor" may denote or refer to a sensor of a user-side device. Further, receiving the user-side sensor data may comprise retrieving the user-side sensor data from the at least one user-side sensor. Alternatively or additionally, receiving the user-side sensor side data may comprise instructing the at least one user-side sensor to transmit the user-side sensor data to the user device.

Generally, the user-side sensor may refer to a sensor arranged in a vicinity of, a surrounding of, an environment of and/or remote from the user device. Alternatively or additionally, the user-side sensor may refer to a sensor configured for being coupled to, being communicatively coupled to, couplable with and/or communicating with the user device. For instance, the user-side sensor may be comprised in or may be part of a user-side device. Alternatively or in addition, the user-side sensor may be a stand-alone sensor. It is should be noted, however, that various or multiple different user-side sensors may be used for acquiring the reaction data, such as for example at least one user-side sensor comprised in at least one user-side device and at least one further user-side sensor that may be a standalone user-side sensor. If the user-side sensor is comprised in a user-side device, a communication between the user device and the user-side sensor (or user-side device) may be performed via a communication circuitry of the user-side device. If the user-side sensor is a standalone sensor, the communication between the user-side sensor and the user device may be performed via corresponding communication circuitry of the user-side sensor, for example using a communication link, a communication connection and/or a communication protocol, for example as described hereinabove with respect to the user-side device.

The method may further comprise deriving, with the user device, the reaction data from the received user-side sensor data of the at least one user-side sensor. Therein, deriving the reaction data may comprise processing the user-side sensor data, for example by a control circuitry of the user device. Such processing may, for example, comprise one or more of filtering, transforming, and converting the user-side sensor data to generate the reaction data. Alternatively or additionally, deriving the reaction data may comprise selecting at least a part of the user-side sensor data as reaction data. Alternatively or additionally, deriving the reaction data may comprise using at least a part of the user-side sensor data as reaction data. Alternatively or additionally, deriving the reaction data may comprise combining at least a part of the user-side sensor data with further user-side sensor data of a further user-side sensor and/or with sensor data of one or more sensors of the user device.

The at least one user-side sensor may be at least one of a camera, an acoustic sensor, an accelerometer, a motion sensor, a gyroscope, a capacitive sensor, a touch sensor, a piezoelectric sensor, a piezoresistive sensor, a Hall sensor, a contact blood pressure sensor, a photoplethysmography sensor, an oximeter, a (non-invasive) laser sensor, a heart rate sensor, a respiratory sensor, an air flow sensor, an air pressure sensor, a temperature sensor, an electrochemical gas sensor, an ultrasonic sensor, an acoustic resonance sensor, an optical sensor, an infrared sensor, a near field sensor, a time-of-flight sensor, a radar sensor, and a bio-impedance sensor. It should be noted, however, that any other type of user-side sensor may be used.

The at least one user-side sensor may be comprised in at least one user-side device arranged in a vicinity of the user device, the at least one user-side device being one or more of a smart TV (television), a smart speaker, a smart watch, a health monitor, an IoT (Internet of Things) device, and an aerosol-generating device.

In the context of the present disclosure, the aerosol-generating device can relate to a device that interacts with an aerosol-forming substrate to generate an aerosol. The aerosol-forming substrate may be part of an aerosol-generating article, for example part of a smoking article. An aerosol-generating device may comprise one or more components used to supply energy from a power supply to an aerosol-forming substrate to generate an aerosol. The aerosol-generating device and all its components may be portable and mobile. Therein, the heating element can be provided in different shapes, sizes and numbers. For example, the heating element can be shaped as a needle, pin, rod, or blade that may be inserted into a smoking article in order to contact the aerosol-forming substrate. The aerosol-generating device may comprise more than one heating element and in the following description, reference to a heating element means one or more heating elements. The aerosol-generating device may also comprise electronic circuitry arranged to control a supply of current to the heating element to control its temperature. The aerosol-generating device may optionally comprise means for sensing the temperature of the heating element.

The method may further comprise deriving, from the reaction data, at least one environmental parameter, wherein the at least one environmental parameter is related to and/or indicative of an environment of the user affecting the sentiment of the user. Therein, the sentiment score may be determined based on the at least one environmental parameter. Generally, by determining the at least one environmental parameter and by determining the sentiment score based thereon, one or more reactions of the user to the at least one environmental parameter, to an environment of the user and/or circumstances in the user's environment may be distinguished from and/or differentiated against the actual reaction of the user in response to the notification. This may ensure that the sentiment score, which may be used by the server to improve the interactive communication, preferably only reflects or is at least predominantly indicative of the sentiment or reaction of the user in direct consequence to the notification. Accordingly, it may be possible to improve the interactive communication in a more accurate, specific, target-oriented and goal-oriented manner. This may be of particular advantage if the sentiment score is used by the server to train an artificial intelligence module and/or a reinforcement learning model of the server, as an erroneous training may be effectively avoided or at least reduced to a minimum.

In the context of the present disclosure the at least one environmental parameter indicative of an environment of the user affecting the sentiment of the user may refer to any factor or circumstance affecting the sentiment of the user and/or (potentially) triggering a reaction of the user, for example which superposes or interferes with the reaction of the user to the notification. Examples of such environmental parameters may be a temperature in the user's environment, a noise in the user's environment, family members or friends present in the user's environment, a location of the user, and the like.

In the following, an illustrative example for the determination of the at least one environmental parameter and the benefits associated therewith is provided. The sentiment score can, for example, be calculated implicitly from multiple sources, such as one or more sensors of the user device and/or one or more user-side sensors or user-side devices, such as for example a smart TV, a thermostat, a GPS sensor, or the like. Accordingly, it may be possible to validate the determined sentiment score in terms of ensuring that the sentiment score is at least predominantly indicative of the user's reaction to the notification. This may, for example, allow to train the reinforcement learning model on the server predominantly or only based on reactions that are a consequence of the notification provided by the server and/or a consequence of the reinforcement learning model's decision to select a particular notification, for example as opposed to reactions that are based on external factors. For instance, the server might provide a notification to the user device and a negative sentiment or negative reaction from the user may be determined based on one or more sensor data, such as for example sensor data or image data of a camera of the user device. However, this negative sentiment or negative reaction of the user might be a consequence of a cold temperature in the user's environment, a noise in the user's environment or any other environmental parameter adversely affecting the user's sentiment. Accordingly, the negative sentiment or negative reaction of the user might not be caused by the notification, but by one or more environmental parameters. By determining the sentiment score based on the determined at least one environmental parameter, it may be determined whether the sentiment score predominantly reflects or is indicative of the sentiment or reaction of the user in direct consequence to the notification, or whether the user's reaction or sentiment is predominantly caused by one or more environmental parameters. Accordingly, a quality of the sentiment score may be increased by determining the sentiment score based on the at least one environmental parameter.

The reaction data may be acquired by the user device based on sensor data of at least one sensor of the user device and based on user-side sensor data of at least one user-side sensor arranged in an environment of the user device. Using multiple sources to determine the sentiment score, such as for example one or more sensors of the user device and/or one or more user-side sensors, may allow for a plausibility check for the determined sentiment score. In turn, a quality of the sentiment score may be further increased.

Determining the sentiment score may comprise providing at least a part of the reaction data to a classifier circuitry of the user device. Alternatively or additionally, the sentiment score may be determined based on classifying at least a part of the reaction data with a classifier circuitry of the user device. The classifier circuitry may, for example, refer to an artificial intelligence module and/or a machine learning classifier, such as for example a neural network, of the user device that may allow to determine the user's reaction for determining the sentiment score.

The method may further comprise:
capturing, with a camera of the user device, image data indicative of one or more images of the user of the user device;
determining the reaction data based on the captured image data; and
determining the sentiment score based on providing at least a part of the reaction data to a classifier circuitry of the user device.

Accordingly, the camera of the user device may be used to acquire sensor data in the form of image data. However, the image data is not transmitted from the user device to the server; determining the sentiment score instead, may mean that that an anonymised sentiment score can be sent to the server without the image data leaving the user device. The reaction data may be determined based on the sensor data, for example by selecting one or more images of the image data. Moreover, the sentiment score may then be determined based on processing these reaction data. Therein, providing at least a part of the reaction data to the classifier circuitry may comprise supplying the at least part of the reaction data to the classifier circuitry. By means of the classifier circuitry, the sentiment score may be determined quickly and accurately, as many different reactions of the user may be reliably determined with the classifier circuitry.

Determining the sentiment score may further comprise:
determining, with a classifier circuitry of the user device, a reaction pattern based on processing at least a part of the reaction data, wherein the reaction pattern is indicative of an emotional expression of the user in response to the notification; and
deriving the sentiment score from the determined reaction pattern.

Therein, the reaction pattern indicative of the emotional expression may reflect the user's reaction to the notification. Hence, by determining the reaction pattern with the classifier circuitry, the sentiment score may be determined with high accuracy and precision.

The sentiment score may be determined based on computing and/or calculating a current sentiment score with the user device and deriving the sentiment score from the computed current sentiment score.

In the context of the present disclosure, the "current sentiment score" may refer to a sentiment score that is locally determined or computed on the user device. For instance, the current sentiment score may be determined based on sensor data of one or more sensors of the user device. In particular, the current sentiment score may be determined only based on sensor data of one or more sensors of the user device.

Determining the sentiment score may comprise receiving, with the user device, at least one user-side sentiment score from at least one user-side device communicatively couplable and/or communicatively coupled to the user device, wherein the sentiment score may be determined based on the user-side sentiment score received from the at least one user-side device.

In the context of the present disclosure, the "user-side sentiment score" may refer to a sentiment score that is determined or computed based on user-side sensor data of one or more user-side sensors. The user-side sentiment score can be determined by the user device and/or by one or more user-side devices based on user-side sensor data of one or more user-side sensors. For example, the user-side sentiment score may be determined only based on user-side sensor data of one or more user-side sensors.

The sentiment score may be determined based on (a) a current sentiment score computed with the user device, and based on (b) at least one user-side sentiment score received by the user device from at least one user-side device communicatively couplable to the user device, or based on (b) at least one user-side sentiment score computed by the user device based on user-side sensor data received from at least one user-side device. In other words, the sentiment score may be determined based on a plurality of sentiment scores, i.e. based on the current sentiment score and based on at least one user-side sentiment score.

Therein, the sentiment score may be determined based on selecting, as the sentiment score, either the current sentiment score or the at least one user-side sentiment score. Alternatively, the current sentiment score and the at least one user-side sentiment score may be combined to determine the sentiment score. For instance, a mean value or average value of the current sentiment score and the at least one user-side sentiment score may be computed to determine the sentiment score.

Determining the sentiment score may comprise comparing the current sentiment score and the at least one user-side sentiment score. By comparing the current sentiment score with one or more user-side sentiment scores, it may be determined whether or not the current sentiment score and the one or more user-side sentiment scores are in agreement and/or consistent with one another. Accordingly, the sentiment score may be determined based on a plurality of sources. Accordingly, it may be possible to validate the sentiment score that may be transmitted to the server, for example for improving the interactive communication, and, at least in certain embodiments, may be used for training an artificial intelligence module of the server. Further, it may be possible to perform a plausibility check of the current sentiment score and the user-side sentiment score.

Determining the sentiment score may comprise determining a deviation of the current sentiment score and the at least one user-side sentiment score, and comparing the determined deviation to a threshold value for the deviation. By comparing the deviation with the threshold value, a degree or extent of agreement, consistency, disagreement and/or inconsistency between the current sentiment score and the at least one user-side sentiment score may be efficiently determined. Therein, the threshold value may be a pre-determined threshold value. Optionally, the threshold value may be stored in a data storage of the user device or it may be retrieved from another source, for example from the server. Further, it should be noted that the threshold value for the deviation may refer to or be indicative of a range of deviation.

The method may further comprise discarding and/or ignoring at least one of the current sentiment score, the at least one user-side sentiment score and the sentiment score, if the determined deviation between the current sentiment score and the at least one user-side sentiment score reaches and/or exceeds the threshold value for the deviation. Therein, discarding at least one of the current sentiment score, the at least one user-side sentiment score and the sentiment score may comprise removing and/or deleting the at least one of the current sentiment score, the at least one user-side sentiment score and the sentiment score, for example from the user device and/or at the least one user-side device.

For this reason, it may be possible to ensure that only a sentiment score is used by the server for improving the interactive communication, which sentiment score is based on a current sentiment score and one or more user-side sentiment scores, which agree and/or are consistent with one another. On the other hand, a sentiment score that is determined based on a current sentiment score and one or more user-side sentiment scores, which differ from another, may be ignored and may not be used by the server. Overall, it may be possible to effectively improve the interactive communication between the server and the user device, for example by using the sentiment score to train the artificial intelligence module and/or the reinforcement learning model of the server.

The method may further comprise preventing the sentiment score from being transmitted to the server, if the determined deviation between the current sentiment score and the at least one user-side sentiment score reaches and/or exceeds the threshold value for the deviation. Alternatively or additionally, the method may further comprise transmitting the sentiment score to the server, only if the current sentiment score and the at least one user-side sentiment score substantially match each other. Hence, it may be ensured that only a sentiment score is transmitted to the server and/or is used by the server for improving the interactive communication if the sentiment score is based on a current sentiment score and at least one user-side sentiment score that agree with one another and/or that match each other.

In the context of the present disclosure, "substantially" match (or differ) may mean that a relative deviation between the respective quantities or measures, for example the current sentiment score and the at least one user-side sentiment score, is within a certain range. For instance, substantially match or differ may mean that the respective measures differ from one another by less than 40%, in particular less than 30%, less than 25%, less than 20%, less than 15% or less than 10%.

The method may further comprise aggregating a plurality of sentiment scores, for example one or more of the current sentiment score and the at least user-side sentiment score to determine the sentiment score for transmission to the server. Accordingly, the sentiment score for transmission to the server can refer to a consolidated sentiment score determined based on a plurality of sentiment scores.

Aggregating the plurality of sentiment scores may comprise applying an aggregation function, such as for example a weighted average.

Further, the plurality of sentiment scores may be aggregated depending on a deviation between at least two of the plurality of sentiment scores.

By way of example, if the deviation between at least two sentiment scores reaches and/or exceeds the threshold value for the deviation, different weights may be applied to different sentiment scores for determining the sentiment score for transmission to the server.

Alternatively or additionally, weights depending on the source of the aggregated sentiment scores, for example the user device and/or a user-side device, may be applied. For example, a current sentiment score determined based on sensor data of the user device may have a higher weight than one or more user-side sentiment scores determined based on user-side sensor data of one or more user-side sensors.

The method may further comprise:
prohibiting and/or delaying transmission of the sentiment score to the server, if the determined deviation between the current sentiment score and the at least one user-side sentiment score reaches and/or exceeds the threshold value for the deviation;
receiving a further notification to the user from the server, wherein the further notification substantially matches and/or equals the notification;
acquiring further reaction data indicative of a further reaction of the user to the further notification; and
determining a further sentiment score based on the acquired further reaction data, wherein the further sentiment score is indicative of a further sentiment of the user in reaction to the further notification.

In other words, transmission of a determined sentiment score to the server may be delayed and the further sentiment score may be determined before transmitting the sentiment score to the server. Accordingly, it may be possible to use the further sentiment score for validating the sentiment score, as similar or identical reactions of the user should be triggered by the notification and the further notification, which substantially match each other, equal each other and/or are identical. In turn, it may be possible to detect whether the sentiment score or the further sentiment score is indeed indicative of the user's reaction to the notification and not for example indicative of a reaction of the user to an environmental parameter or factor, such as for example a cold temperature or noise in the environment of the user. Hence, a quality of the sentiment score may be improved and/or it may be ensured that the sentiment score at least predominantly reflects and/or is indicative of the user's sentiment in reaction to the notification. Further, it may be possible to effectively improve the interactive communication, as erroneous sentiment scores may not be used by the server, as such sentiment scores can be effectively identified based on comparing the sentiment score and the further sentiment score, for example if the sentiment score and the further sentiment score differ from one another.

The method may further comprise comparing the further sentiment score, determined based on the further reaction data indicative of the user's further reaction to the further notification, with the sentiment score or the current sentiment score, determined based on the reaction data indicative of the user's reaction to the notification. Therein, comparing may comprise determining a deviation between the sentiment score and the further sentiment score. Optionally, a deviation between the further sentiment score and the sentiment score or the current sentiment score may be determined.

The method may further comprise transmitting at least one of the sentiment score, the current sentiment score, and the further sentiment score to the server, only if the further sentiment score, determined based on the further reaction data indicative of the user's further reaction to the further notification, substantially matches the sentiment score or the current sentiment score, determined based on the reaction data indicative of the user's reaction to the notification.

By way of example, determining the sentiment score and the further sentiment score before transmitting the sentiment score to the server and comparing these sentiment scores may allow to avoid a misinterpretation of the user's reaction. For instance, a determined sentiment score may not be regarded as being correlated with a negative reaction, if the sentiment score and the further sentiment score do not agree with one another, for example one is positive and one is negative. Instead, the further notification, which may be identical or similar to the notification, may be provided on the user device, for example at a different time as the notification. Then, the further reaction of the user to the further notification and/or the further sentiment score can allow ascertaining that the sentiment score is at least predominantly indicative of the user's reaction to the notification (and not to any environmental parameter), if the sentiment score and the further sentiment score substantially match each other. Accordingly, determining the sentiment score and the further sentiment score and comparing these sentiment scores may allow to confirm correctness of the sentiment score and/or the further sentiment score. In turn, the interactive communication can be effectively improved, as only sentiment scores that have been confirmed may be used by the server, for example for training the artificial intelligence module and/or the reinforcement learning model.

The method may further comprise determining a privacy level for at least one of the reaction data, sensor data of one or more sensors of the user device, and user-side sensor data of one or more user side sensors, wherein the privacy level is indicative of one or more features in one or more of the reaction data, the sensor data, and the user-side sensor data, which one or more features are to be manipulated in and/or removed from one or more of the reaction data, the sensor data, and the user-side sensor data for determining and/or before determining the sentiment score. Such manipulation can be performed on or by one or more of the user device, one or more user-side sensors, and one or more user-side devices.

The privacy level may, for example, be at least one of definable, user-configurable, and programmable. For instance, the user may define one or more privacy levels for one or more feature groups, such as for example 'location, people, health, activity'. Therein, a privacy level may be for example be set to 'low, medium, high'. Further, a feature group may define one or more features in one or more of the reaction data, the sensor data, and the user-side sensor data.

Based on the defined privacy level for one or more of the feature groups, one or more processing operations to process one or more of the reaction data, the sensor data, and the user-side sensor data may be selected by the user device for one or more features defined by the one or more feature groups.

The one or more features in one or more of the reaction data, the sensor data, and the user-side sensor data may comprise and/or refer to a reaction feature and/or reaction pattern of the user related to one or more of a movement of the user, a body movement, an activity, a health state, a heart rate, a facial reaction, a change skin tone of the user, or the like. Alternatively or additionally, the one or more features may comprise and/or refer to one or more environmental parameters affecting the user's sentiment, such as for example people in the vicinity of the user, a location of the user and/or the user-device, a temperature in the user device's environment, or the like.

The selected one or more processing operations for processing one or more of the reaction data, the sensor data, and the user-side sensor data may depend on a data type of the reaction data, the sensor data, and/or the user-side sensor data.

For example, when the reaction data, the sensor data, and/or the user-side sensor data comprise one or more images or image data, a processing operation associated with the privacy level could be keeping the image as is for a privacy level 'low', blurring the face of a person for a privacy level 'medium', and cropping the image to remove the person from the image for a privacy level 'high'.

Similarly, when the reaction data, the sensor data, and/or the user-side sensor data comprise textual input or acoustic, for example received via the user interface or via a microphone, depending on the privacy level set for certain features, the textual input or acoustic input may be cropped and certain features or information, such as a name, a birth date, a city name, an address, or the like, may be removed from the reaction data, the sensor data, and/or the user-side sensor data.

According to a second aspect of the present disclosure, there is provided a computer program comprising instructions or software instructions, which, when the program is executed on one or more processors of a user device, cause the user device to carry out the method according to the first aspect of the present disclosure. The computer program may, for instance, be stored on a data storage or memory of the user device.

According to a third aspect of the present disclosure, there is provided a non-transitory computer-readable medium having stored thereon the computer program according to the second aspect of the present disclosure.

According to a fourth aspect of the present disclosure, there is provided a computer-implemented method for interactive communication of a user device with a server. The method according to the fourth aspect may alternatively or additionally relate to a computer-implemented method for operating a user device, for example for interactive communication with a server, and optionally for operating one or more user-side devices. The method comprises:

providing, on the user device, one or more notifications to a user of the user device;

acquiring reaction data indicative of one or more reactions of the user to the one or more notifications;

determining, based at least in part on the acquired reaction data, a plurality of sentiment scores, wherein at least one of the plurality of sentiment scores is indicative of a sentiment of the user in reaction to the one or more notifications; and determining a final sentiment score for transmission to the server based on comparing at least two of the plurality of sentiment scores with one another, wherein the final sentiment score is usable by the server for training an artificial intelligence module and/or a reinforcement learning model implemented on the server.

In other words, a plurality of sentiment scores may be determined for at least one notification provided on the user device, and the final sentiment score may be determined based on comparing at least two of the sentiment scores. As is also discussed hereinabove, for example with reference to the first aspect of the present disclosure, and hereinbelow, by comparing at least two sentiment scores, a deviation, an agreement, a consistency, a disagreement and/or an inconsistency between the at least two sentiment scores can be determined. Hence, it may be possible to validate the determined sentiment scores and/or a plausibility check. Accordingly, it may be possible to ensure that only a (final) sentiment score is used by the server for improving the interactive communication, which (final) sentiment score is based on at least two sentiment scores, for example a current sentiment score and one or more user-side sentiment scores, which agree and/or are consistent with one another.

It should be noted that the term "final sentiment score" may refer to a sentiment score that is transmittable to the server and usable by the server for training the artificial intelligence module and/or the reinforcement learning module.

Generally, the final sentiment score may refer to "the sentiment score", as described, inter alia, with reference to the first aspect of the present disclosure. Further, each of the "at least two sentiment scores" and/or each of the "plurality of sentiment scores" may, for example, refer to at least one of a current sentiment score, and a user-side sentiment score, as described, inter alia, with reference to the first aspect of the present disclosure.

On the user device, at least one notification may be provided. Further, a plurality of sentiment scores is determined. The plurality of sentiment scores can be determined based on the same source or based on different sources. For instance, all of or a subset of the plurality of sentiment scores may be determined with the user device, for example based on sensor data of one or more sensors of the user device and/or based on user-side sensor data of one or more user-side sensors. Alternatively or additionally, all of or a subset of the plurality of sentiment scores may be determined with one or more user-side devices, for example based on user-side sensor data of one or more user-side devices. Therein, at least one of the determined sentiment scores is indicative of the user's reaction to the at least one notification. One or more of the plurality of sentiment scores may be indicative of a reaction of the user to at least one environmental parameter or factor. Alternatively, all of the plurality of sentiment scores may be indicative of the user's reaction to the at least one notification. Alternatively or additionally, at least a subset of the sentiment scores may be indicative of reactions of the user to different notifications, for example notifications that are provided at different times.

If, for example, a first sentiment score determined based on user-side sensor data of at least one user-side device and a second sentiment score determined based on sensor data of the user device do not agree with one another or do not substantially match each other, this might indicate that the user's reaction to the at least one notification could have been triggered or caused by one or more environmental parameters or factors, such as a cold room temperature or noise in the user's environment. Hence, by comparing these two sentiment scores, it may be reliably determined if the final sentiment score predominantly or correctly indicates or reflects the user's sentiment in reaction to the notification, or if the user's reaction might have been caused by one or more environmental parameters or factors affecting the user's sentiment.

Alternatively or additionally, if for example a first sentiment score is determined, which is indicative of a first reaction of the user to a first notification, and a second sentiment score is determined, which is indicative of a second reaction of the user to a second notification, do not agree with one another or do not substantially match each other, this might indicate that at least one of the first and second reaction of the user could have been triggered or caused by one or more environmental parameters or factors, such as a cold room temperature or noise in the user's environment. Therein, the first and second notifications can be provided on the user device at different times, for example subsequently to each other.

Accordingly, it may be possible to validate sentiment scores and/or the final sentiment score based on comparing at least two different sentiment scores. Therein, the two different sentiment scores can be based on different sensor data and/or reaction data, such as for example user-side sensor data of at least one user-side sensor and/or sensor data of at least one sensor of the user device. Alternatively or additionally, the at least two sentiment scores can be indicative of different or a plurality of reactions of the user in response to a plurality of notifications, for example provided at different times. Comparing the at least two sentiment scores may allow to reliably determine if the at least two sentiment scores are consistent with each other, which allows for a comprehensive validation of the determined sentiment scores and/or a plausibility check. Hence, it may be possible to provide a final sentiment score usable for training the artificial intelligence module and/or the reinforcement learning model on the server, which accurately reflects or indicates the sentiment of the user in reaction to at least one notification.

It is emphasized that any feature, step, element, and/or example described hereinabove and hereinbelow with reference to one aspect of the present disclosure equally applies to any other aspect of the present disclosure, and vice versa. In particular, any embodiment of the first aspect can be combined with any embodiment of the fourth aspect, and vice versa.

At least one of the plurality of sentiment scores may be indicative of a sentiment of the user in reaction of the user to at least one environmental parameter related to and/or indicative of an environment of the user affecting the sentiment of the user.

At least two of the plurality of sentiment scores may be indicative of a sentiment of the user in reaction of the user to at least two notifications received from the server, for example at different times.

The final sentiment score may be determined based on selecting at least one of the plurality of sentiment scores as the final sentiment score. Alternatively or additionally, a plurality of sentiment scores, for example said at least two sentiment scores, can be combined to determine the final sentiment score. For instance, the final sentiment score may be determined as a mean value or average value of the at least two sentiment scores.

The method may further comprise receiving, with the user device, at least one of the plurality of sentiment scores from at least one user-side device communicatively couplable and/or communicatively coupled to the user device. In other words, at least one of the plurality of sentiment scores can be determined with one or more user-side devices and transmitted to the user device. Therein, receiving the sentiment score may comprise retrieving the sentiment score from the at least one user-side device and/or instructing the at least one user-side device to transmit or send the sentiment score to the user device.

Acquiring the reaction data may include capturing sensor data with at least one sensor of the user device. In other words, the reaction data or at least a part thereof may be acquired based on sensor data of one or more sensors of the user device.

The method may further comprise deriving, with the user device, the reaction data from the captured sensor data of the at least one sensor of the user device. Therein, deriving the reaction data may comprise processing the sensor data, for example by a control circuitry of the user device. Such processing may, for example, comprise one or more of filtering, transforming, and converting the captured sensor data to generate the reaction data. Alternatively or additionally, deriving the reaction data may comprise selecting at least a part of the sensor data as reaction data. Alternatively or additionally, deriving the reaction data may comprise using at least a part of the sensor data as reaction data. Alternatively or additionally, deriving the reaction data may comprise combining at least a part of the sensor data with further sensor data of a further sensor of the user device and/or with user-side sensor data of at least one user-side sensor.

The at least one sensor of the user device may be at least one of a camera, an acoustic sensor, an accelerometer, a motion sensor, a gyroscope, a capacitive sensor, a touch sensor, a piezoelectric sensor, a piezoresistive sensor, a Hall sensor, an optical sensor, an infrared sensor, a near field sensor, and a position sensor. Such sensors may advantageously allow to reliably detect or sense the user's reaction in response to the notification and, in turn, may allow to reliably and determine the reaction data indicative of the user's reaction. It should be noted, however, that any other type of sensor of the user device can be used for capturing sensor data and/or for determining the reaction data based thereon.

The reaction data may be acquired based on sensor data from a plurality of sensors, for example sensors of different types, of the user device. Accordingly, acquiring the reaction data may comprise capturing sensor data with a plurality of sensors of the user device. Therein, sensor data of different sensors may be combined, merged and/or fused for determining the reaction data. Hence, it may be possible to provide accurate and comprehensive reaction data, for example which may accurately and comprehensively reflect the user's reaction to the one or more notifications or which may contain comprehensive and accurate information about the user's reaction to the one or more notifications. Alternative or in addition, using sensor data of a plurality of sensors for determining the reaction data may allow for a plausibility check of all sensor data and/or the reaction data.

For example, first sensor data of a first sensor of the user device may be captured and the first sensor data may be supplemented, merged, combined and/or fused with second sensor data of a second sensor of the user device to generate the reaction data, wherein the first sensor may differ from the second sensor.

Acquiring the reaction data may comprise receiving, with and/or at the user device, user-side sensor data from at least one user-side sensor communicatively couplable with the user device. In other words, the reaction data or at least a part thereof may be acquired based on user-side sensor data of one or more user-side sensors.

The "user-side sensor" may denote or refer to a sensor of a user-side device. Further, receiving the user-side sensor data may comprise retrieving the user-side sensor data from the at least one user-side sensor. Alternatively or additionally, receiving the user-side sensor side data may comprise instructing the at least one user-side sensor to transmit the user-side sensor data to the user device.

As described hereinabove with reference to the first aspect of the present disclosure, the user-side sensor may refer to a sensor arranged in a vicinity of, a surrounding of, an environment of and/or remote from the user device. Alternatively or additionally, the user-side sensor may refer to a sensor configured for being coupled to, being communicatively coupled to, couplable with and/or communicating with the user device via a common communications network, for example the same Local Area Network (LAN) with which the user device is connected. For instance, the user-side sensor may be comprised in or may be part of a user-side device. Alternatively or in addition, the user-side sensor may be a standalone sensor. It is should be noted, however, that various or multiple different user-side sensors may be used for acquiring the reaction data, such as for example at least one user-side sensor comprised in at least one user-side device and at least one further user-side sensor that may be a standalone user-side sensor. If the user-side sensor is comprised in a user-side device, a communication between the user device and the user-side sensor (or user-side device) may be performed via a communication circuitry of the user-side device. If the user-side sensor is a standalone sensor, the communication between the user-side sensor and the user device may be performed via corresponding communication circuitry of the user-side sensor, for example using a communication link, a communication connection and/or a communication protocol, for example as described hereinabove with respect to the user-side device.

The method may further comprise deriving, with the user device, the reaction data from the received user-side sensor data of the at least one user-side sensor. Therein, deriving the reaction data may comprise processing the user-side sensor data, for example by a control circuitry of the user device.

Such processing may, for example, comprise one or more of filtering, transforming, and converting the user-side sensor data to generate the reaction data. Alternatively or additionally, deriving the reaction data may comprise selecting at least a part of the user-side sensor data as reaction data. Alternatively or additionally, deriving the reaction data may comprise using at least a part of the user-side sensor data as reaction data. Alternatively or additionally, deriving the reaction data may comprise combining at least a part of the user-side sensor data with further user-side sensor data of a further user-side sensor and/or with sensor data of one or more sensors of the user device.

The at least one user-side sensor may be at least one of a camera, an acoustic sensor, an accelerometer, a motion sensor, a gyroscope, a capacitive sensor, a touch sensor, a piezoelectric sensor, a piezoresistive sensor, a Hall sensor, a contact blood pressure sensor, a photoplethysmography sensor, an oximeter, a (non-invasive) laser sensor, a heart rate sensor, a respiratory sensor, an air flow sensor, an air pressure sensor, a temperature sensor, an electrochemical gas sensor, an ultrasonic sensor, an acoustic resonance sensor, an optical sensor, an infrared sensor, a near field sensor, a time-of-flight sensor, a radar sensor, and a bio-impedance sensor. It should be noted, however, that any other type of user-side sensor may be used.

The at least one user-side sensor may be comprised in at least one user-side device arranged in a vicinity of the user device, the at least one user-side device being one or more of a smart TV (television), a smart speaker, a smart watch, a health monitor, an IoT (Internet of Things) device, and an aerosol-generating device.

The method may further comprise receiving, with the user device, user-side sensor data from at least one user-side device, and computing, with the user device, at least one of the plurality of sentiment scores based on deriving at least a part of the reaction data and/or further reaction data from the received user-side sensor data. In other words, user-side sensor data may be retrieved from at least one user-side sensor and further reaction data may be derived therefrom by the user device to determine one or more of the plurality of sentiment scores.

The method may further comprise receiving, at the user device, at least one query, wherein the at least one notification is provided in response to the at least one query by the server. Therein, the at least one query may be received at the user device based on one or more user inputs, for example via a user interface, a microphone, a camera, and/or a sensor of the user device. Alternatively or additionally, the one or more notifications may be provided on the user device by the server in response to the at least one query.

The method may further comprise transmitting the at least one query, received at the user device, to the server. Therein, transmitting the at least one query may comprise sending the at least one query, for example in the form of one or more data packages, to the server. Optionally, transmitting the at least one query to the server may comprise establishing a communication link or connection between the user device and the server.

The at least one query may comprise a textual input received via a user interface at the user device, an oral input received via a microphone at the user device and/or a video-based input received via a camera of the user device. As noted above, the at least one query can comprise one or more of at least one character, at least one symbol, at least one number, a text, a question, an answer to a question, a statement, a request, a sound, an acoustic message, a message, a text message, at least one icon, an alert, an acoustic alert, an optical alert, at least one image and a video.

Each of the one or more notifications may comprise one or more of at least one character, at least one symbol, at least one number, a text, a sound, an acoustic message, a question, an answer to a question, a statement, a request, a message, a text message, at least one icon, an alert, an acoustic alert, an optical alert, at least one image and a video. It should be noted, however, that any other type of notification or any content of the notification is conceivable.

The determined final sentiment score may be transmitted to the server. Therein, the final sentiment score can be transmitted to the server from the user device and/or from one or more user-side devices.

The method may further comprise displaying one or more notifications, for example on a user interface of the user device. Alternatively or additionally, one or more of the notifications can be played or output on a microphone of the user device.

Determining the final sentiment score may comprise:
  determining an intermediate sentiment score based on the acquired reaction data; and
  anonymizing the intermediate sentiment score, thereby generating the final sentiment score.

As described with reference to the first aspect of the present disclosure, the intermediate sentiment score may comprise information or data related to personal information and/or personal data of the user, whereas the final sentiment score may not contain or comprise any personal information and/or personal data of the user. Accordingly, the intermediate sentiment score may be regarded as an intermediate quantity or measure that can be determined, for example temporarily determined, in order to determine the final sentiment score. Generally, the intermediate sentiment score can be determined and anonymized on the user device and/or on at least one user-side device. Generally, anonymizing the intermediate sentiment score to generate the final sentiment score as anonymized score or measure advantageously allows to preserve privacy or anonymity of the interactive communication between the server and the user device, as described hereinabove with respect to the first aspect of the present disclosure.

The final sentiment score may be anonymized based on normalizing the intermediate sentiment score with a reference sentiment score (and/or a reference sentiment score value). Therein, the reference sentiment score may be chosen, for example depending on the scale, on which the sentiment score is determined. For instance, the reference sentiment score may refer to and/or be indicative of a most negative reaction of the user to the notification, a neutral reaction of the user to the notification, a most positive reaction of the user to the notification, or any reaction of the user therebetween. Further, normalizing the intermediate sentiment score may comprise converting the intermediate sentiment score into the final sentiment score based on the reference sentiment score. For instance, the intermediate sentiment score may be divided by or multiplied with the reference sentiment score. However, any other mathematical operation can be applied. Further, it should be noted that the final sentiment score can be given in absolute values or in relative values.

The method may further comprise removing the intermediate sentiment score from the user device upon anonymizing the intermediate sentiment score and/or upon generating the final sentiment score. Alternatively or additionally, the intermediate sentiment score can be removed from at least one user-side device. By removing the intermediate sentiment score from the user device and/or the at least one user-device, private or personal information of the user can be further protected. Therein, removing the intermediate sentiment score may comprise deleting, overriding and/or destroying the intermediate sentiment score.

The method may further comprise removing the final sentiment score from the user device upon transmitting the final sentiment score to the server. Alternatively or additionally, the final sentiment score may be removed from at least one user-side device upon transmitting the final sentiment score to the server. In other words, transmission of the final sentiment score to the server, for example from the user device and/or from at least one user-side device, may trigger removal of the final sentiment score from the user device and/or from the user-side device. This way, it may be ensured that no storage resources or memory is used or blocked by the final sentiment score, if it has been transmitted to the server.

Providing one or more notifications may comprise receiving a first notification and a second notification at the user device, wherein the second notification substantially matches and/or equals the first notification. Therein, acquiring reaction data may comprise acquiring first reaction data indicative of a first reaction of the user to the first notification and acquiring second reaction data indicative of a second reaction of the user to the second notification. Further, determining the plurality of sentiment scores may comprise determining a first sentiment score based on the first reaction data and determining a second sentiment score based on the second reaction data. The first and second reaction data may be determined based on at least one of sensor data of one or more sensors of the user device, and user-side sensor data of one or more user-side sensors. By determining independent or separate sentiment scores, for example the first and second sentiment scores, based on independent, separate and/or different notifications, for example the first and second notifications, which substantially match each other, it may be ensured that the final sentiment score predominantly or correctly indicates the user's sentiment in reaction to the one of the notifications. In turn, the interactive communication can be accurately improved and/or personalized, for example based on training the artificial intelligence module and/or the reinforcement learning model on the server. For example, the final sentiment score may be determined based on the first and second sentiment scores.

Determining the final sentiment score may comprise determining a deviation between at least two of the plurality of sentiment scores, for example the first sentiment score and the second sentiment score, and comparing the determined deviation to a threshold value for the deviation. The threshold value may be predetermined and/or may be stored in a data storage or memory of the user device. Alternatively or additionally, the threshold value may be retrieved from another source, for example the server. Further, the threshold value for the deviation may refer to a range of deviation, for example a percentage of a relative deviation between the at least two sentiment scores.

The method may further comprise discarding and/or ignoring at least one of said at least two sentiment scores, for example at least one of the first sentiment score and the second sentiment score, if the determined deviation between the at least two sentiment scores, for example between the first sentiment score and the second sentiment score, reaches or exceeds the threshold value for the deviation.

The method may further comprise preventing the final sentiment score from being transmitted to the server, if the determined deviation between said at least two sentiment scores, for example between the first sentiment score and the second sentiment score, reaches and/or exceeds the threshold value for the deviation. Alternatively or additionally, the method may further comprise transmitting the final sentiment score to the server, only if said at least two sentiment scores, for example the first sentiment score and the second sentiment score, substantially match each other.

The method may further comprise aggregating the plurality of sentiment scores to determine the final sentiment score for transmission to the server. Accordingly, the final sentiment score for transmission to the server can refer to a consolidated sentiment score determined based on a plurality of sentiment scores.

Aggregating the plurality of sentiment scores may comprise applying an aggregation function, such as for example a weighted average.

Further, the plurality of sentiment scores may be aggregated depending on a deviation between at least two of the plurality of sentiment scores.

By way of example, if the deviation between at least two sentiment scores reaches and/or exceeds the threshold value for the deviation, different weights may be applied to different sentiment scores for determining the final sentiment score.

Alternatively or additionally, weights depending on the source of the aggregated sentiment scores, for example the user device and/or a user-side device, may be applied. For example, a sentiment score determined based on sensor data of the user device may have a higher weight than one or more (user-side) sentiment scores determined based on user-side sensor data of one or more user-side sensors.

The method may further comprise determining a privacy level for at least one of the reaction data, sensor data of one or more sensors of the user device, and user-side sensor data of one or more user side sensors, wherein the privacy level is indicative of one or more features in one or more of the reaction data, the sensor data, and the user-side sensor data, which one or more features are to be manipulated in and/or removed from one or more of the reaction data, the sensor data, and the user-side sensor data for determining and/or before determining the sentiment score. Such manipulation can be performed on or by one or more of the user device, one or more user-side sensors, and one or more user-side devices.

The privacy level may, for example, be at least one of definable, user-configurable, and programmable. For instance, the user may define one or more privacy levels for one or more feature groups, such as for example 'location, people, health, activity'. Therein, a privacy level may be for example be set to 'low, medium, high'. Further, a feature group may define one or more features in one or more of the reaction data, the sensor data, and the user-side sensor data.

Based on the defined privacy level for one or more of the feature groups, one or more processing operations to process one or more of the reaction data, the sensor data, and the user-side sensor data may be selected by the user device for one or more features defined by the one or more feature groups.

The one or more features in one or more of the reaction data, the sensor data, and the user-side sensor data may comprise and/or refer to a reaction feature and/or reaction pattern of the user related to one or more of a movement of the user, a body movement, an activity, a health state, a heart rate, a facial reaction, or the like. Alternatively or additionally, the one or more features may comprise and/or refer to one or more environmental parameters affecting the user's sentiment, such as for example people in the vicinity of the user, a location of the user and/or the user-device, a temperature in the user device's environment, or the like.

The selected one or more processing operations for processing one or more of the reaction data, the sensor data, and the user-side sensor data may depend on a data type of the reaction data, the sensor data, and/or the user-side sensor data.

For example, when the reaction data, the sensor data, and/or the user-side sensor data comprise one or more images or image data, a processing operation associated with the privacy level could be keeping the image as is for a privacy level 'low', blurring the face of a person for a privacy level 'medium', and cropping the image to remove the person from the image for a privacy level 'high'.

Similarly, when the reaction data, the sensor data, and/or the user-side sensor data comprise textual input or acoustic, for example received via the user interface or via a microphone, depending on the privacy level set for certain features, the textual input or acoustic input may be cropped and certain features or information, such as a name, a birth date, a city name, an address, or the like, may be removed from the reaction data, the sensor data, and/or the user-side sensor data.

According to a fifth aspect of the present disclosure, there is provided a computer program comprising instructions and/or software instructions, which, when the program is executed on one or more processors of a user device, cause the user device to carry out the method according to the fourth aspect of the present disclosure. The computer program may, for instance, be stored on a data storage or memory of the user device.

According to a sixth aspect of the present disclosure, there is provided a non-transitory computer-readable medium having stored thereon the computer program according to the fifth aspect of the present disclosure.

According to a seventh aspect of the present disclosure, there is provided a computer-implemented method for interactive communication of a server with a user device. The method according to the seventh aspect may alternatively or additionally relate to a computer-implemented method for operating a server, for example for interactive communication with a user-device, and optionally for operating one or more user-side devices. The method comprises:
- transmitting a notification from the server to the user device;
- receiving, by the server, a sentiment score, wherein the sentiment score correlates with a reinforcement learning reward for training a reinforcement learning model implemented on the server; and
- training the reinforcement learning model implemented on the server based on the received sentiment score.

Therein, the sentiment score may be received from the user device and/or from one or more user-side devices. Further, receiving the sentiment score may comprise retrieving the sentiment score from the user device and/or from at least one user-side device. Alternatively or additionally, receiving the sentiment score may comprise instructing the user device and/or at least one user-side device to transmit or send the sentiment score to the server.

Generally, the method according to the seventh aspect may correspond to one or more of the method of the first aspect and the fourth aspect of the present disclosure, however, from or at least predominantly from the server's perspective. Any of the disclosure, embodiments and examples described hereinabove and hereinbelow with reference to any aspect of the present disclosure equally applies to and can be combined with the method according to the seventh aspect of the present disclosure, and vice versa.

The method may further comprise selecting, from a knowledge base of the server, a further notification to be transmitted to the user device based on the received sentiment score. The further notification may, for example, be selected upon or in response to receipt of one or more queries from the user device at the server.

The server may, for example comprise a Natural Language Processing ("NLP") module or engine configured to process, analyse and/or decompose one or more queries received from the user device. Further, the knowledge base of the server may comprise a plurality of notifications transmittable to the user device, wherein the server may be configured to determine, select, identify and/or generate the further notification among or based on the plurality of notifications, for instance, based on or using an artificial intelligence module, a recommendation engine and/or the reinforcement learning model of the server.

The reinforcement learning model may be trained based on maximizing and/or optimizing a reward function of the reinforcement learning model implemented on the server.

Hence, it may be possible to improve the interactive communication and/or the reinforcement learning model over time, for example successively or iteratively in a plurality of training steps. In each of the training steps, a reinforcement learning reward reflecting and/or being indicative of a level of correctness or a quality of a decision of the reinforcement learning model taken, can be supplied or fed to the reinforcement learning model in order to penalize the reinforcement learning model, when it takes a wrong decision, and reward it, when it takes a correct decision.

The method may further comprise receiving, from the user device, at least one query, wherein the one or more notifications are transmitted from the server to the user device upon receiving the at least one query from the user device.

The method may further comprise receiving, from the user device, a further query, wherein a further notification is selected based on the received sentiment score and based on the received further query. By means of the sentiment score the reinforcement learning model can be accurately trained, such that the further notification may be more appropriate to the further query, thereby improving the interactive communication. Alternatively or additionally, the interactive communication may be personalized based on or using the sentiment score, as the sentiment score reflects or indicates the user's sentiment in reaction to the notification, which for example could have been provided earlier than the further notification during the interactive communication.

The method may further comprise transmitting the further notification to the user device in response to the further query.

The method may further comprise processing the query and/or the further query using a Natural Language Processing engine implemented on the server.

The method may further comprise receiving at least one further sentiment score, and selecting, from a knowledge-base of the server, the further notification to be transmitted to the user device based on the received sentiment score and based on the received further sentiment score. Therein, both the sentiment score and the further sentiment may be used by the server to train the reinforcement learning model of the server. Alternatively or additionally, the sentiment score and the further sentiment score may be used to validate one or both of the sentiment score and the further sentiment score, as for example described with reference to the first and forth aspects of the present disclosure.

The at least one further sentiment score may be received by the server from the user device and/or from a user-side device. Therein, receiving the further sentiment score may comprise retrieving the further sentiment score from the user device and/or from at least one user-side device. Alternatively or additionally, receiving the sentiment score may comprise instructing the user device and/or at least one user-side device to transmit or send the sentiment score to the server.

The method may further comprise comparing the sentiment score and the at least one further sentiment score. Based on such comparison, the sentiment score and/or the further sentiment can be validated. Hence, it may be possible to effectively improve the reinforcement learning model or the training thereof.

The method may further comprise determining a deviation of the sentiment score and the at least one further sentiment score, and comparing the determined deviation to a threshold value for the deviation. The threshold value may be predetermined and/or may be stored in a data storage or memory of the server. Alternatively or additionally, the threshold value may be retrieved from another source, for example the user device. Further, the threshold value for the deviation may refer to a range of deviation, for example a percentage of a relative deviation between the sentiment score and the at least one.

The method may further comprise discarding at least one of the sentiment score and the at least one further sentiment score, if the determined deviation between the sentiment score and the at least one further sentiment score reaches and/or exceeds the threshold value for the deviation.

The method may further comprise training a reinforcement learning model implemented on the server based on the sentiment score and/or the at least one further sentiment score, only if the sentiment score and the at least one further sentiment score substantially match each other.

According to an eighth aspect of the present disclosure, there is provided a computer program comprising instructions and/or software instructions, which, when the program is executed on one or more processors of a server, cause the server to carry out the method according to the seventh aspect of the present disclosure. The computer program may, for instance, be stored on a data storage or memory of the server.

According to a ninth aspect of the present disclosure, there is provided a non-transitory computer-readable medium having stored thereon the computer program according to the ninth aspect of the present disclosure.

According to a tenth aspect of the present disclosure, there is provided a computer-implemented method for interactive communication of a server with a user device with. The method according to the tenth aspect may alternatively or additionally relate to a computer-implemented method for operating a server, for example for interactive communication with a user-device, and optionally for operating one or more user-side devices. The method comprises:

transmitting one or more notifications from the server to the user device;
receiving, by the server, a plurality of sentiment scores, wherein each of plurality of sentiment scores correlates with a reinforcement learning reward for training a reinforcement learning model implemented on the server; and
training the reinforcement learning model implemented on the server based on comparing at least two of the plurality of sentiment scores.

Therein, each of the sentiment scores may be received from the user device and/or from one or more user-side devices. Further, receiving the sentiment scores may comprise retrieving the sentiment scores from the user device and/or from at least one user-side device. Alternatively or additionally, receiving the sentiment scores may comprise instructing the user device and/or at least one user-side device to transmit or send the sentiment scores to the server.

Generally, the method according to the tenth aspect may correspond to one or more of the methods of the first aspect, the fourth aspect, and the seventh aspect of the present disclosure, however, from or at least predominantly from the server's perspective. Any of the disclosure, embodiments and examples described hereinabove and hereinbelow with reference to any aspect of the present disclosure equally applies to and can be combined with the method according to the tenth aspect of the present disclosure, and vice versa.

Accordingly, at least two sentiment scores, for example a first sentiment score and a second sentiment score, may be determined, wherein each of the first sentiment score and the second sentiment score may correlate with a reinforcement learning reward for training a reinforcement learning model implemented on the server. Further, the reinforcement learning model implemented on the server may be trained based on comparing the first sentiment score and the second sentiment score.

At least one of the plurality of sentiment scores, for example a first and/or a second sentiment score, may be received by the server from the user device or from a user-side device.

At least one of the plurality of sentiment scores, for example the first and/or the second sentiment score, may be indicative of a sentiment of the user in reaction of the user to at least one environmental parameter related to and/or indicative of an environment of the user affecting the sentiment of the user. Alternatively or additionally, at least one of the plurality of sentiment scores, for example the first and/or the second sentiment score, may be indicative of a sentiment of the user in reaction of the user to at least one of the one or more notifications, for example a first and/or second notification, received by the user-device from the server.

Transmitting one or more notifications from the server to the user device may comprise transmitting a first notification and a second notification from the server to the user device, wherein the second notification substantially matches and/or equals the first notification. Therein, receiving the plurality of sentiment scores may comprise receiving a first sentiment score in response to transmitting the first notification to the user-device and receiving a second sentiment score in response to transmitting the second notification to the user device. The first and second notifications may for example be transmitted subsequently and/or at different times. As described hereinabove, for this reason, it may be possible to validate the first and/or second sentiment score and in turn to effectively train the reinforcement learning model.

The method may further comprise determining a deviation between at least two of the plurality of sentiment scores, for example between the first sentiment score and the second sentiment score, and comparing the determined deviation to a threshold value for the deviation. The threshold value may be predetermined and/or may be stored in a data storage or memory of the server. Alternatively or additionally, the threshold value may be retrieved from another source, for example the user device. Further, the threshold value for the deviation may refer to a range of deviation, for example a percentage of a relative deviation between the sentiment score and the at least one.

The method may further comprise discarding and/or ignoring at least one of the plurality of sentiment scores, for example the first sentiment score and/or the second sentiment score, if the determined deviation between said at least two of the plurality of sentiment scores, for example between the first sentiment score and the second sentiment score, reaches and/or exceeds the threshold value for the deviation.

The method may further comprise training the reinforcement learning model implemented on the server based on at least one of the received plurality of sentiment scores, for example based on at least one of the first sentiment score and the second sentiment score, only if said at least two sentiment scores, for example the first sentiment score and the second sentiment score, substantially match each other.

Training the reinforcement learning model may comprise:
determining a final sentiment score based on at least one of the plurality of sentiment scores, for example at least one of the first sentiment score and the second sentiment score;
deriving the reinforcement learning reward for training the reinforcement learning model from the determined final sentiment score and/or computing the reinforcement learning reward based on the final sentiment score; and
supplying the reinforcement learning reward to the reinforcement learning model.

Therein, the final sentiment score may be determined based on selecting at least one of the plurality of sentiment scores, for example at least one of the first sentiment score and the second sentiment score, as the final sentiment score. Alternatively or additionally, a plurality of sentiment scores, for example the first and the second sentiment scores, can be combined to determine the final sentiment score. For instance, the final sentiment score may be determined as a mean value or average value of a plurality of sentiment scores, for example the first and the second sentiment scores.

The method may further comprise aggregating the plurality of sentiment scores to determine the final sentiment score for transmission to the server. Accordingly, the final sentiment score for transmission to the server can refer to a consolidated sentiment score determined based on a plurality of sentiment scores.

Aggregating the plurality of sentiment scores may comprise applying an aggregation function, such as for example a weighted average.

Further, the plurality of sentiment scores may be aggregated depending on a deviation between at least two of the plurality of sentiment scores.

By way of example, if the deviation between at least two sentiment scores reaches and/or exceeds the threshold value for the deviation, different weights may be applied to different sentiment scores for determining the final sentiment score.

Alternatively or additionally, weights depending on the source of the aggregated sentiment scores, for example the user device and/or a user-side device, may be applied. For example, a sentiment score determined based on sensor data of the user device may have a higher weight than one or more (user-side) sentiment scores determined based on user-side sensor data of one or more user-side sensors. The reinforcement learning reward may refer to a reinforcement learning reward value. The reinforcement learning reward may, for example, be determined, calculated and/or computed based on at least the final sentiment score and a reward function of the reinforcement learning model.

Determining and/or computing the reinforcement learning reward may further comprise determining a trend of a plurality and/or series of previous sentiment scores, for example a plurality and/or series of previously determined final sentiment scores determined at least in part based on one or more notifications provided to the user. Accordingly, the plurality and/or series of previous sentiment scores may refer to a series of past sentiment scores, for example past final sentiment scores, determined at least in part based on one or more notifications provided to the user device.

The method may further comprise determining a weight based on the determined trend of the plurality and/or the series of previous sentiment scores, and determining the reinforcement learning reward based on the determined weight and the final sentiment score.

By determining the trend and determining the reinforcement learning reward based thereon, it may be possible to bring the user's current sentiment in reaction to a notification into a historical context, for example of an ongoing or repeated interactive communication between the user device and the server, such that the reinforcement learning reward may accurately reflect the user's current sentiment.

The method may further comprise comparing the final sentiment score with the trend of the plurality and/or series of previous sentiment scores, and determining the reinforcement learning reward based on the comparison.

The method may further comprise determining the reinforcement learning reward based on one or more previous reinforcement learning rewards determined based on one or more previous sentiment scores, for example one or more previous final sentiment scores.

According to an eleventh aspect of the present disclosure, there is provided a computer program comprising instructions and/or software instructions, which, when the program is executed on one or more processors of a server, cause the server to carry out the method according to the tenth aspect of the present disclosure. The computer program may, for instance, be stored on a data storage or memory of the server.

According to a twelfth aspect of the present disclosure, there is provided a non-transitory computer-readable medium having stored thereon the computer program according to the eleventh aspect of the present disclosure.

According to a thirteenth aspect of the present disclosure, there is provided a computer-implemented method for interactive communication between a user device and a server. The method according to the thirteenth aspect may alternatively or additionally relate to a computer-implemented method for operating a system for interactive communication, wherein the system comprises at least one server and at least one user device. Optionally, the system may comprise one or more user-side devices and/or one or more user-side sensors. The method comprises:
transmitting a notification from the server to the user device;
providing, on the user device, the notification to a user of the user device;
acquiring, with the user device and/or with at least one user-side device, reaction data indicative of a reaction of the user to the notification;
determining, with the user device and/or with the at least one user-side device, a sentiment score based on the acquired reaction data, wherein the sentiment score is indicative of a sentiment of the user in reaction to the notification, and wherein the sentiment score correlates with a reinforcement learning reward for training a reinforcement learning model implemented on the server;

transmitting the determined sentiment score to the server from the user device and/or from the at least one user-side device;

receiving, by the server, the sentiment score; and training the reinforcement model implemented on the server based on the sentiment score received by the server.

Therein, receiving the sentiment score may comprise retrieving the sentiment score from the user device and/or from at least one user-side device. Alternatively or additionally, receiving the sentiment score may comprise instructing the user device and/or at least one user-side device to transmit or send the sentiment score to the server.

Generally, the method according to the thirteenth aspect may correspond to one or more of the methods of the first aspect, the fourth aspect, the seventh aspect, and the tenth aspect of the present disclosure, however, from or at least predominantly from the system's perspective. Any of the disclosure, embodiments and examples described hereinabove and hereinbelow with reference to any aspect of the present disclosure equally applies to and can be combined with the method according to the thirteenth aspect of the present disclosure, and vice versa.

According to a fourteenth aspect of the present disclosure, there is provided a computer-implemented method for interactive communication between a user device and a server. The method according to the fourteenth aspect may alternatively or additionally relate to a computer-implemented method for operating a system for interactive communication, wherein the system comprises at least one server and at least one user device. Optionally, the system may comprise one or more user-side devices and/or one or more user-side sensors. The method comprises:

transmitting one or more notifications from the server to the user device;

providing, on the user device, the one or more notification to a user of the user device;

acquiring, with the user device and/or with at least one user-side device, reaction data indicative of one or more reactions of the user to the one or more notifications;

determining, with the user device and/or with the at least one user-side device, a plurality of sentiment scores based on the acquired reaction data, wherein each of the plurality of sentiment scores correlates with a reinforcement learning reward for training a reinforcement learning model implemented on the server;

comparing at least two of the determined plurality of sentiment scores with one another;

transmitting at least one of the plurality of sentiment scores to the server from the user device and/or from the at least one user-side device;

receiving, by the server, at least one of the plurality of sentiment scores; and training a reinforcement model implemented on the server based on at least one of the plurality of sentiment scores received by the server.

Therein, receiving the at least one sentiment score may comprise retrieving the sentiment score from the user device and/or from at least one user-side device. Alternatively or additionally, receiving the sentiment score may comprise instructing the user device and/or at least one user-side device to transmit or send the sentiment score to the server.

Generally, the method according to the fourteenth aspect may correspond to one or more of the methods of the first aspect, the fourth aspect, the seventh aspect, and the tenth aspect of the present disclosure, however, from or at least predominantly from the system's perspective. Any of the disclosure, embodiments and examples described hereinabove and hereinbelow with reference to any aspect of the present disclosure equally applies to and can be combined with the method according to the fourteenth aspect of the present disclosure, and vice versa.

According to a fifteenth aspect of the present disclosure, there is provided a computer program comprising instructions and/or software instructions, which, when the program is executed on one or more processors of a system for interactive communication, cause the system to carry out the method according to one or both of the thirteenth aspect and the fourteenth aspect of the present disclosure. The computer program may, for instance, be stored on a data storage or memory of a server, a user device and/or one or more user-side devices.

According to a sixteenth aspect of the present disclosure, there is provided a non-transitory computer-readable medium having stored thereon the computer program according to the fifteenth aspect of the present disclosure.

According to a seventeenth aspect of the present disclosure, there is provided user device configured to interactively communicate with a server. The user device may, for example, be configured to carry out steps of one or more of the methods according any of the first, the fourth, the seventh, the tenth, the thirteenth, and the fourteenth aspect of the present disclosure. The user device comprises a communication circuitry configured to communicatively couple the user device to the server and to receive a notification from the server. The user device further comprises a user interface configured to provide the notification to a user of the user device, and a control circuitry including one or more processors, wherein the control circuitry is configured to:

acquire reaction data indicative of a reaction of the user to the notification; and determine a sentiment score for transmission to the server based on the acquired reaction data, wherein the sentiment score is indicative of a sentiment of the user in reaction to the notification.

The communication circuitry of the user may be configured to being coupled with a corresponding communication arrangement of the server to allow data exchange between the user device and the server. By way of example, the user device may be couplable and/or may be configured to communicate with the server (and vice versa) via an Internet connection, a WiFi connection, a Bluetooth connection, a mobile phone network, a 3G connection, an edge connection, an LTE connection, a BUS connection, a wireless connection, a wired connection, a radio connection, a near field connection an IoT connection or any other connection using any appropriate communication protocol.

The control circuitry of the user device may refer to a controller, a control module and/or a control arrangement.

Further, the user device may comprise a data storage or memory for storing for example the sentiment score, the notification and/or the reaction data. Alternatively or additionally, a computer program, instructions, an app, an application, and/or software instructions may be stored in the data storage or the memory.

The control circuitry may be further configured to transmit the determined sentiment score via the communication circuitry of the user device to the server.

The sentiment score may be an anonymized numerical measure indicative of the reaction of the user to the notification. Alternatively or additionally, the sentiment score may correlate with and/or may be indicative of a reinforcement learning reward configured for being used by the server for training a reinforcement learning model implemented on the server.

The control circuitry may be configured to:
determine an intermediate sentiment score based on the acquired reaction data; and
anonymize the intermediate sentiment score to generate the sentiment score.

The control circuitry may be configured to anonymize the sentiment score based on normalizing the intermediate sentiment score with a reference sentiment score.

The control circuitry may be configured to remove the intermediate sentiment score from the user device upon anonymizing the intermediate sentiment score and/or upon generating the sentiment score.

The control circuitry may be configured to remove the sentiment score from the user device upon transmitting the sentiment score to the server.

The user device may further comprise at least one sensor, wherein the control circuitry maybe further configured to capture sensor data with the at least one sensor of the user device.

The control circuitry may be configured to derive the reaction data from the captured sensor data of the at least one sensor.

The at least one sensor of the user device may be at least one of a camera, an acoustic sensor, an accelerometer, a motion sensor, a gyroscope, a capacitive sensor, a touch sensor, a piezoelectric sensor, a piezoresistive sensor, a Hall sensor, an optical sensor, an infrared sensor, a near field sensor, and a position sensor.

The communication circuitry may be further configured to receive user-side sensor data from at least one user-side sensor communicatively coupled with the user device via the communication circuitry.

The control circuitry may be configured to derive the reaction data from the received user-side sensor data of the at least one user-side sensor.

The at least one user-side sensor may be at least one of a camera, an acoustic sensor, an accelerometer, a motion sensor, a gyroscope, a capacitive sensor, a touch sensor, a piezoelectric sensor, a piezoresistive sensor, a Hall sensor, a contact blood pressure sensor, a photoplethysmography sensor, an oximeter, a (non-invasive) laser sensor, a heart rate sensor, a respiratory sensor, an air flow sensor, an air pressure sensor, a temperature sensor, an electrochemical gas sensor, an ultrasonic sensor, an acoustic resonance sensor, an optical sensor, an infrared sensor, a near field sensor, a time-of-flight sensor, a radar sensor, and a bio-impedance sensor.

The at least one user-side sensor may be comprised in at least one user-side device arranged in a vicinity of the user device, the at least one user-side device being one or more of a smart TV, a smart speaker, a smart watch, an IoT device, a health monitor, and an aerosol-generating device.

The control circuitry may be configured:
derive, from the reaction data, at least one environmental parameter, wherein the at least one environmental parameter is related to and/or indicative of an environment of the user affecting the sentiment of the user; and
determine the sentiment score based on the at least one environmental parameter.

The control circuitry may be configured to acquire the reaction data based on sensor data of at least one sensor of the user device and based on user-side sensor data of at least one user-side sensor arranged in an environment of the user device.

The control circuitry may include a classifier circuitry configured to classify at least a part of the reaction data to determine the sentiment score.

The user device may further comprise at least one camera configured to capture image data indicative of one or more images of the user of the user device, wherein the control circuitry may be further configured to determine the reaction data based on the captured image data and to determine the sentiment score based on classifying at least a part of the reaction data with a classifier circuitry.

The control circuitry may be configured to:
determine, with the classifier circuitry, a reaction pattern based on processing at least a part of the reaction data, wherein the reaction pattern is indicative of an emotional expression of the user in response to the notification; and
derive the sentiment score from the determined reaction pattern.

The control circuitry may be configured to determine the sentiment score based on computing a current sentiment score and based on deriving the sentiment score from the computed current sentiment score.

The communication circuitry may be configured to receive at least one user-side sentiment score from at least one user-side device communicatively coupled to the user device, wherein the control circuitry may be configured to determine the sentiment score based on the user-side sentiment score received from the at least one user-side device.

The control circuitry may be configured to determine the sentiment score based on:
computing a current sentiment score; and
at least one user-side sentiment score received from at least one user-side device communicatively coupled to the user device, or at least one user-side sentiment score computed by the control circuitry based on user-side sensor data received from at least one user-side device.

The control circuitry may be configured to compare the current sentiment score and the at least one user-side sentiment score.

The control circuitry may be configured to determine a deviation of the current sentiment score and the at least one user-side sentiment score, and to compare the determined deviation to a threshold value for the deviation.

The control circuitry may be configured to discard and/or ignore at least one of the current sentiment score, the at least one user-side sentiment score and the sentiment score, if the determined deviation between the current sentiment score and the at least one user-side sentiment score reaches and/or exceeds the threshold value for the deviation.

The control circuitry may be configured to:
prevent the sentiment score from being transmitted to the server, if the determined deviation between the current sentiment score and the at least one user-side sentiment score reaches and/or exceeds the threshold value for the deviation; and/or
transmit the sentiment score to the server, only if the current sentiment score and the at least one user-side sentiment score substantially match each other.

The control circuitry may be configured to:
prohibit transmission of the sentiment score to the server, if the determined deviation between the current sentiment score and the at least one user-side sentiment score reaches and/or exceeds the threshold value for the deviation;

receive a further notification from the server, wherein the further notification substantially matches or equals the notification;

acquire further reaction data indicative of a further reaction of the user to the further notification; and determine a further sentiment score based on the acquired further reaction data, wherein the further sentiment score is indicative of a further sentiment of the user in reaction to the further notification.

The control circuitry may be configured to compare the further sentiment score, determined based on the further reaction data indicative of the user's further reaction to the further notification, with the sentiment score or the current sentiment score, determined based on the reaction data indicative of the user's reaction to the notification.

The control circuitry may be configured to transmit at least one of the sentiment score, the current sentiment score, and the further sentiment score to the server, only if the further sentiment score, determined based on the further reaction data indicative of the user's further reaction to the further notification, substantially matches the sentiment score or the current sentiment score, determined based on the reaction data indicative of the user's reaction to the notification.

According to an eighteenth aspect of the present disclosure, there is provided a user device configured to interactively communicate with a server. The user device may, for example, be configured to carry out steps of one or more of the methods according any of the first, the fourth, the seventh, the tenth, the thirteenth, and the fourteenth aspect of the present disclosure. The user device may also refer to the user device described with reference to the seventeenth aspect of the present disclosure. The user device comprises a communication circuitry configured to communicatively couple the user device to the server and to receive one or more notifications from the server. The user device further comprises a user interface configured to provide the one or more notifications to a user of the user device, and a control circuitry including one or more processors, wherein the control circuitry is configured to:

acquire reaction data indicative of one or more reactions of the user to the one or more notifications;

determine, based at least in part on the acquired reaction data, a plurality of sentiment scores, wherein at least one of the plurality of sentiment scores is indicative of a sentiment of the user in reaction to the one or more notifications; and determine a final sentiment score for transmission to the server based on comparing at least two of the plurality of sentiment scores, for example a first sentiment score and a second sentiment score, wherein the final sentiment score is usable by the server for training a reinforcement learning model implemented on the server.

At least one of the plurality of sentiment scores, for example at least one the first and second sentiment score, may be indicative of a sentiment of the user in reaction of the user to at least one environmental parameter related to and/or indicative of an environment of the user affecting the sentiment of the user.

At least two of the plurality of sentiment scores may be indicative of a sentiment of the user in reaction of the user to at least two notifications received from the server, for example at different times.

The control circuitry may be configured to determine the final sentiment score based on selecting at least one of the plurality of sentiment scores as the final sentiment score.

The communication circuitry may be further configured to receive at least one of the plurality sentiment scores, for example at least one the first and second sentiment score, from at least one user-side device communicatively couplable to the user device.

The communication circuitry may be further configured to receive user-side sensor data from at least one user-side device, wherein the control circuitry may be further configured to compute at least one of the plurality of sentiment scores, for example at least one the first and second sentiment score, based on deriving further reaction data from the received user-side sensor data.

The communication circuitry may be configured to receive a first notification and a second notification to the user from the server, wherein the second notification substantially matches and/or equals the first notification. Therein, the control circuitry may be further configured to:

acquire first reaction data indicative of a first reaction of the user to the first notification;

acquire second reaction data indicative of a second reaction of the user to the second notification; and determine a first sentiment score based on the first reaction data and determine a second sentiment score based on the second reaction data.

The control circuitry may be configured to determine a deviation between at least two of the plurality of sentiment scores, for example between the first sentiment score and the second sentiment score, and to compare the determined deviation to a threshold value for the deviation.

The control circuitry may be configured to discard and/or ignore at least one of said at least two sentiment scores, for example one of the first sentiment score and the second sentiment score, if the determined deviation reaches and/or exceeds the threshold value for the deviation.

The control circuitry may be configured to prevent the final sentiment score from being transmitted to the server, if the determined deviation between said at least two sentiment scores, for example between the first sentiment score and the second sentiment score, reaches and/or exceeds the threshold value for the deviation. Alternatively or additionally, the control circuitry may be further configured to transmit the final sentiment score to the server, only if said at least two sentiment scores, for example the first sentiment score and the second sentiment score, substantially match each other.

A nineteenth aspect of the present disclosure relates to a use of a user device, as described hereinabove and hereinbelow, for interactively communicating with a server and/or for determining a sentiment score.

A twentieth aspect of the present disclosure relates to a use of a user-side device, as described hereinabove and hereinbelow, for interactively communicating with a server and/or for determining a sentiment score.

According to a twenty-first aspect of the present disclosure, there is provided server configured to interactively communicate with a user device and/or with a user-side device. The server may, for example, be configured to carry out steps of one or more of the methods according any of the first, the fourth, the seventh, the tenth, the thirteenth, and the fourteenth aspect of the present disclosure. The server comprises a communication arrangement configured to communicatively couple the server with the user device and to transmit a notification to the user device, wherein the communication arrangement is further configured to receive a sentiment score from the user device, the sentiment score being indicative of a sentiment of the user in reaction to the notification. The server further comprises a control arrangement including a reinforcement learning model, wherein the sentiment score correlates with a reinforcement learning reward for training the reinforcement learning model, and wherein the control arrangement is configured to train the reinforcement learning model based on the received sentiment score.

The server may comprise at least one computing device, for example including one or more processors. It should be noted, however, that the server may refer to a server system, a computer system, a server network, a computing network, a cloud computing network or the like. Accordingly, when it is referred to "a server" or "the server", this also includes a plurality of servers.

Generally, the server may comprise or include an engine or module for identifying, selecting and/or generating the notification to be sent or transmitted to the user device, for example in response to one or more queries from the user device. The server may, for example comprise a Natural Language Processing ("NLP") module or engine configured to process, analyse and/or decompose one or more queries received from the user device. The server may further be configured to determine, for example based on processing the one or more queries, the notification to be transmitted to the user device in response to the one or more queries.

Further, the server may comprise an artificial intelligence module and/or a recommendation engine allowing to determine, identify, select and/or generate the notification, which may, for example, represent an appropriate or the most appropriate notification among or based on a plurality of notifications transmittable to the user device in response to the one or more queries from the user device. By way of example, the server may comprise a knowledge base comprising a plurality of notifications transmittable to the user device, wherein the artificial intelligence module or recommendation engine of the server may be configured to determine, select, identify and/or generate the appropriate or the most appropriate notification among or based on the plurality of potential notifications, for example based on classifying the one or more queries received from the user device.

The communication arrangement of the server may be configured for being coupled with a corresponding communication circuitry of the user device to allow data exchange between the user device and the server. By way of example, the server may be couplable and/or may be configured to communicate with the user device (and vice versa) via an Internet connection, a WiFi connection, a Bluetooth connection, a mobile phone network, a 3G connection, an edge connection, an LTE connection, a BUS connection, a wireless connection, a wired connection, a radio connection, a near field connection an IoT connection or any other connection using any appropriate communication protocol.

The control arrangement of the server may refer to a controller, a control module and/or a control arrangement.

Further, the server may comprise a data storage or memory for storing for example the sentiment score, the notification and/or the query. Alternatively or additionally, a computer program, instructions, an app, an application, and/or software instructions may be stored in the data storage or the memory.

The control arrangement may include a knowledgebase and may be configured to select a further notification for transmission to the user device based on the received sentiment score.

The control arrangement may comprise a reinforcement learning model, wherein the sentiment score may correlate with a reinforcement learning reward for training the reinforcement learning model, and wherein the control arrangement may be configured to train the reinforcement learning model based on the received sentiment score.

The control arrangement may be configured to train the reinforcement learning model based on maximizing and/or optimizing a reward function of the reinforcement learning model.

The communication arrangement may be further configured to receive a query from the user device, wherein the control arrangement may be configured to transmit the notification from the server to the user device upon receiving the query from the user device.

The communication arrangement may be configured to receive a further query from the user device, wherein the control arrangement may be configured to select a further notification based on the received sentiment score and based on the received further query.

The control arrangement may be configured to transmit, via the communication arrangement, the further notification to the user device in response to the further query.

The control arrangement may further include a Natural Language Processing engine configured to process the query and/or a further query using a Natural Language Processing engine.

The communication arrangement may further be configured to receive at least one further sentiment score, wherein the control arrangement may be further configured to select, from the knowledgebase, a further notification to be transmitted to the user device based on the received sentiment score and based on the received further sentiment score.

The at least one further sentiment score may be received by the server via the communication arrangement from the user device and/or from a user-side device.

The control arrangement may be configured to compare the sentiment score and the at least one further sentiment score.

The control arrangement may be configured to determine a deviation of the sentiment score and the at least one further sentiment score and to compare the determined deviation to a threshold value for the deviation.

The control arrangement may be configured to discard and/or ignore at least one of the sentiment score and the at least one further sentiment score, if the determined deviation between the sentiment score and the at least one further sentiment score reaches and/or exceeds the threshold value for the deviation.

The control arrangement may comprise a reinforcement learning model, wherein the control arrangement may be configured to train the reinforcement learning model based on the sentiment score and/or the at least one further sentiment score, only if the sentiment score and the at least one further sentiment score substantially match each other.

According to a twenty-second aspect of the present disclosure, there is provided a server configured to interactively communicate with a user device and/or with a user-side device. The server may, for example, be configured to carry out steps of one or more of the methods according any of the first, the fourth, the seventh, the tenth, the thirteenth, and the fourteenth aspect of the present disclosure. The server may also refer to the server of the twenty-first aspect of the present disclosure. The server comprises a communication arrangement configured to communicatively couple the server with the user device and to transmit one or more notifications from the server to the user device. The server comprises a control arrangement including a reinforcement learning model, wherein the communication arrangement is further configured to receive a plurality of sentiment scores, for example a first sentiment score and a second sentiment score, wherein each of plurality of sentiment scores correlates with a reinforcement learning reward for training a reinforcement learning model implemented on the server. Therein, the control arrangement is configured to train the reinforcement learning model implemented on the server based on comparing at least two of the plurality of sentiment scores with one another, for example the first sentiment score and the second sentiment score.

The communication arrangement may be configured to receive at least one of the plurality of sentiment scores, for example at least one of the first and the second sentiment scores, from the user device or from a user-side device.

At least one of the plurality of sentiment scores, for example at least one of the first and the second sentiment scores, may be indicative of a sentiment of the user in reaction of the user to at least one environmental parameter related to and/or indicative of an environment of the user affecting the sentiment of the user.

At least two of the plurality of sentiment scores, for example the first and the second sentiment scores, may be indicative of a sentiment of the user in reaction of the user to at least two notifications received by the user-device from the server.

The communication arrangement may be configured to transmit a first notification and a second notification from the server to the user device, wherein the second notification may substantially match and/or equal the first notification, and wherein the server may be configured to receive a first sentiment score in response to transmitting the first notification to the user-device and receiving a second sentiment score in response to transmitting the second notification to the user device.

The control arrangement may be configured to determine a deviation between at least two of the plurality of sentiment scores, for example between the first sentiment score and the second sentiment score, wherein the control arrangement may be configured to compare the determined deviation to a threshold value for the deviation.

The control arrangement may be configured to discard and/or ignore at least one of the plurality of sentiment scores, for example at least one of the first sentiment score and the second sentiment score, if the determined deviation between said at least two of the plurality of sentiment scores reaches and/or exceeds the threshold value for the deviation.

The control arrangement may be configured to train the reinforcement learning model implemented on the server based on at least one of the received plurality of sentiment scores, for example at least one of the first sentiment score and the second sentiment score, only if said at least two sentiment scores, for example the first sentiment score and the second sentiment score, substantially match each other.

The control arrangement may be configured to:
determine a final sentiment score based on and/or based on selecting at least one of the plurality of sentiment scores, for example at least one of the first sentiment score and the second sentiment score;
derive the reinforcement learning reward for training the reinforcement learning model from the determined final sentiment score; and
supply the reinforcement learning reward to the reinforcement learning model.

A twenty-third aspect of the present disclosure relates to a use of a server, as described hereinabove and hereinbelow, for interactively communicating with a user device, and optionally with one or more user-side devices. Alternatively or additionally, the twenty-third aspect may refer to a use of a server for determining a sentiment score, as described hereinabove and hereinbelow.

According to a twenty-fourth aspect of the present disclosure, there is provided a system for interactive communication between a server and a user device, and optionally at least one user-side device. The system may, for example, be configured to carry out steps of one or more of the methods according to any of the first, the fourth, the seventh, the tenth, the thirteenth, and the fourteenth aspect of the present disclosure. The system comprises at least one user device, as described hereinabove and hereinbelow, for example the user device according to one or more of the seventeenth aspect and the eighteenth aspect of the present disclosure. The system further comprises a server, as described hereinabove and hereinbelow, for example the server according to one or more of the twenty-first aspect and the twenty-second aspect of the present disclosure. Optionally, the system may comprise one or more user-side devices and/or one or more user-side sensors, as described hereinabove and hereinbelow.

A twenty-fifth aspect of the present disclosure relates to a use of a system, as described hereinabove and hereinbelow, for interactive communication between a server and a user device, and optionally one or more user-side devices. Alternatively or additionally, the twenty-fifth aspect may refer to a use of a system for determining a sentiment score, as described hereinabove and hereinbelow.

Below, there is provided a non-exhaustive list of non-limiting examples. Any one or more of the features of these examples may be combined with any one or more features of another example, embodiment, or aspect described herein.

A.1: A computer-implemented method for interactive communication of a user device with a server, the method comprising:
providing, on the user device, a notification to a user of the user device;
acquiring reaction data indicative of a reaction of the user to the notification;
determining, based on the acquired reaction data, a sentiment score for transmission to the server, wherein the sentiment score is indicative of a sentiment of the user in reaction to the notification.

B.1: The method according to example A.1, further comprising:
transmitting the determined sentiment score to the server.

C.1: The method according to any of examples A.1 to B.1, wherein the sentiment score is transmitted from the user device to the server.

D.1: The method according to any of examples A.1 to C.1, wherein the determined sentiment score is transmitted from the user device, and/or a user-side device communicatively coupled with the user device.

E.1: The method according to any of examples A.1 to D.1 further comprising:
receiving, at the user device, a query, wherein the notification is provided in response to the query by the server.

F.1: The method according to any of examples A.1 to E.1, wherein the query comprises a textual input received via a user interface at the user device, an oral input received via a microphone at the user device and/or a video-based input received via a camera of the user device.

G.1: The method according to any of examples A.1 to F.1, wherein the notification comprises text, sound, at least one image and/or a video.

H.1: The method according to any of examples A.1 to G.1, wherein the sentiment score is an anonymized numerical measure indicative of the reaction of the user to the notification; and/or
  wherein the sentiment score correlates with and/or is indicative of a reinforcement learning reward configured for being used by the server for training a reinforcement learning model implemented on the server.

I.1: The method according to any to any of examples A.1 to H.1, wherein determining the sentiment score comprises:
  determining an intermediate sentiment score based on the acquired reaction data; and
  anonymizing the intermediate sentiment score, thereby generating the sentiment score.

J.1: The method according to example I.1, wherein the sentiment score is anonymized based on normalizing the intermediate sentiment score with a reference sentiment score.

K.1: The method according to any of examples I.1 to J.1, further comprising:
  removing the intermediate sentiment score from the user device upon anonymizing the intermediate sentiment score and/or upon generating the sentiment score.

L.1: The method according to any to any of examples A.1 to K.1, further comprising:
  removing the sentiment score from the user device upon transmitting the sentiment score to the server.

M.1: The method according to any of examples A.1 to L.1, wherein providing the notification on the user device includes displaying the notification on a user interface of the user device.

N.1: The method according to any to any of examples A.1 to M.1, wherein acquiring the reaction data includes capturing sensor data with at least one sensor of the user device.

O.1: The method according to example N.1, further comprising:
  deriving, with the user device, the reaction data from the captured sensor data of the at least one sensor of the user device.

P.1: The method according to any of examples N.1 to O.1, wherein the at least one sensor of the user device is at least one of a camera, an acoustic sensor, an accelerometer, a motion sensor, a gyroscope, a capacitive sensor, a touch sensor, a piezoelectric sensor, a piezoresistive sensor, a Hall sensor, an optical sensor, an infrared sensor, a near field sensor, and a position sensor.

Q.1: The method according to any of examples A.1 to P.1, wherein acquiring the reaction data comprises receiving, with the user device, user-side sensor data from at least one user-side sensor communicatively couplable with the user device.

R.1: The method according to example Q.1, further comprising deriving, with the user device, the reaction data from the received user-side sensor data of the at least one user-side sensor.

S.1: The method according to any of examples Q.1 to R.1, wherein the at least one user-side sensor is at least one of a camera, an acoustic sensor, an accelerometer, a motion sensor, a gyroscope, a capacitive sensor, a touch sensor, a piezoelectric sensor, a piezoresistive sensor, a Hall sensor, a contact blood pressure sensor, a photoplethysmography sensor, an oximeter, a (non-invasive) laser sensor, a heart rate sensor, a respiratory sensor, an air flow sensor, an air pressure sensor, a temperature sensor, an electrochemical gas sensor, an ultrasonic sensor, an acoustic resonance sensor, an optical sensor, an infrared sensor, a near field sensor, a time-of-flight sensor, a radar sensor, and a bio-impedance sensor.

T.1: The method according to any of examples Q.1 to S.1, wherein the at least one user-side sensor is comprised in at least one user-side device arranged in a vicinity of the user device, the at least one user-side device being one or more of a smart TV, a smart speaker, a smart watch, a health monitor, an IoT device, and an aerosol-generating device.

U.1: The method according to any of examples A.1 to T.1, further comprising:
  deriving, from the reaction data, at least one environmental parameter, wherein the at least one environmental parameter is related to and/or indicative of an environment of the user affecting the sentiment of the user; and
  wherein the sentiment score is determined based on the at least one environmental parameter.

V.1: The method according to any of examples A.1 to U.1, wherein the reaction data is acquired by the user device based on sensor data of at least one sensor of the user device and based on user-side sensor data of at least one user-side sensor arranged in an environment of the user device.

W.1: The method according to any of examples A.1 to V.1, wherein determining the sentiment score comprises providing at least a part of the reaction data to a classifier circuitry of the user device; and/or wherein the sentiment score is determined based on classifying at least a part of the reaction data with a classifier circuitry of the user device.

X.1: The method according to any of examples A.1 to W.1, further comprising:
  capturing, with a camera of the user device, image data indicative of one or more images of the user of the user device;
  determining the reaction data based on the captured image data; and
  determining the sentiment score based on providing at least a part of the reaction data to a classifier circuitry of the user device.

Y.1: The method according to any of examples A.1 to X.1, wherein determining the sentiment score comprises:
  determining, with a classifier circuitry of the user device, a reaction pattern based on processing at least a part of the reaction data, wherein the reaction pattern is indicative of an emotional expression of the user in response to the notification; and
  deriving the sentiment score from the determined reaction pattern.

Z.1: The method according to any of examples A.1 to Y.1, wherein the sentiment score is determined based on computing a current sentiment score with the user device and deriving the sentiment score from the computed current sentiment score.

AA.1: The method according to one of examples A.1 to Z.1, wherein determining the sentiment score comprises receiving, with the user device, at least one user-side sentiment score from at least one user-side device communicatively couplable to the user device, wherein the sentiment score is determined based on the user-side sentiment score received from the at least one user-side device.

AB.1: The method according to any of examples A.1 to AA.1, wherein the sentiment score is determined based on a current sentiment score computed with the user device; and at least one user-side sentiment score received by the user device from at least one user-side device communicatively couplable to the user device, or at least one user-side sentiment score computed by the user device based on user-side sensor data received from at least one user-side device.

AC.1: The method according to example AB.1, wherein determining the sentiment score comprises comparing the current sentiment score and the at least one user-side sentiment score.

AD.1: The method according to any of examples AB.1 to AC.1, wherein determining the sentiment score comprises:
determining a deviation of the current sentiment score and the at least one user-side sentiment score; and
comparing the determined deviation to a threshold value for the deviation.

AF.1: The method according to example AD.1, further comprising discarding at least one of the current sentiment score, the at least one user-side sentiment score and the sentiment score, if the determined deviation between the current sentiment score and the at least one user-side sentiment score reaches or exceeds the threshold value for the deviation.

AG.1: The method according to any of examples AD.1 to AF.1, further comprising:
preventing the sentiment score from being transmitted to the server, if the determined deviation between the current sentiment score and the at least one user-side sentiment score reaches or exceeds the threshold value for the deviation; and/or
transmitting the sentiment score to the server, only if the current sentiment score and the at least one user-side sentiment score substantially match each other.

AH.1: The method according to any of examples AD.1 to AG.1, further comprising:
prohibiting transmission of the sentiment score to the server, if the determined deviation between the current sentiment score and the at least one user-side sentiment score reaches or exceeds the threshold value for the deviation;
receiving a further notification to the user from the server, wherein the further notification substantially matches or equals the notification;
acquiring further reaction data indicative of a further reaction of the user to the further notification; and
determining a further sentiment score based on the acquired further reaction data, wherein the further sentiment score is indicative of a further sentiment of the user in reaction to the further notification.

AI.1: The method according to example AH.1, further comprising comparing the further sentiment score, determined based on the further reaction data indicative of the user's further reaction to the further notification, with the sentiment score or the current sentiment score, determined based on the reaction data indicative of the user's reaction to the notification.

AJ.1: The method according to any examples AH.1 to AI.1, further comprising transmitting at least one of the sentiment score, the current sentiment score, and the further sentiment score to the server, only if the further sentiment score, determined based on the further reaction data indicative of the user's further reaction to the further notification, substantially matches the sentiment score or the current sentiment score, determined based on the reaction data indicative of the user's reaction to the notification.

AK.1: The method according to any of examples A.1 to AJ.1, further comprising aggregating a plurality of sentiment scores to determine the sentiment score for transmission to the server.

AL.1: The method according any of examples A.1 to AK.1 wherein aggregating the plurality of sentiment scores comprises applying an aggregation function.

AM.1: The method according to any of examples A.1 to AL.1, further comprising determining a privacy level for at least one of the reaction data, sensor data of one or more sensors of the user device, and user-side sensor data of one or more user side sensors, wherein the privacy level is indicative of one or more features in one or more of the reaction data, the sensor data, and the user-side sensor data, which one or more features are to be manipulated in and/or removed from one or more of the reaction data, the sensor data, and the user-side sensor data for determining and/or before determining the sentiment score.

AN.1: The method according to any of examples A.1 to AM.1, wherein the privacy level is at least one of definable, user-configurable, and programmable.

AO.4: The method according to any of examples A.1 to AN.1, further comprising selecting, based on the defined privacy level for one or more of the feature groups, one or more processing operations to process one or more of the reaction data, the sensor data, and the user-side sensor data may be selected by the user device for one or more features defined by the one or more feature groups.

AP.1: The method according to any of examples A.1 to AO.1, wherein the one or more features in one or more of the reaction data, the sensor data, and the user-side sensor data may comprise and/or refer to a reaction feature and/or reaction pattern of the user related to one or more of a movement of the user, a body movement, an activity, a health state, a heart rate, a facial reaction, a change in skin tone of the user, and one or more environmental parameters affecting the user's sentiment.

AQ.1: The method according to any of examples A.1 to AP.1, wherein the selected one or more processing operations for processing one or more of the reaction data, the sensor data, and the user-side sensor data depend on a data type of the reaction data, the sensor data, and/or the user-side sensor data.

A.2: A computer program comprising instructions, which, when the program is executed on one or more processors of a user device, cause the user device to carry out the method according to any of examples A.1 to AQ.1.

A.3: A non-transitory computer-readable medium having stored thereon the computer program according to example A.2.

A.4: A computer-implemented method for interactive communication of a user device with a server, the method comprising:
providing, on the user device, one or more notifications to a user of the user device;
acquiring reaction data indicative of one or more reactions of the user to the one or more notifications;
determining, based at least in part on the acquired reaction data, a plurality of sentiment scores, wherein at least one of the plurality of sentiment scores is indicative of a sentiment of the user in reaction to the one or more notifications; and
determining a final sentiment score for transmission to the server based on comparing at least two of the plurality of sentiment scores with one another, wherein the final sentiment score is usable by the server for training a reinforcement learning model implemented on the server.

B.4: The method according to example A.4, wherein at least one of the plurality of sentiment scores is indicative of a sentiment of the user in reaction of the user to at least one environmental parameter related to and/or indicative of an environment of the user affecting the sentiment of the user; and/or wherein at least two of the plurality of sentiment scores are indicative of a sentiment of the user in reaction of the user to at least two notifications received from the server.

C.4. The method according any of examples A.4 to B.4, wherein the final sentiment score is determined based on selecting at least one of the plurality of sentiment scores as the final sentiment score.

D.4. The method according to any of examples A.4 to C.4, further comprising receiving, with the user device, at least one of the plurality of sentiment scores from at least one user-side device communicatively couplable to the user device.

E.4: The method according to any of examples A.4 to D.4, further comprising receiving, with the user device, user-side sensor data from at least one user-side device; and computing, with the user device, at least one of the plurality of sentiment scores based on deriving at least a part of the reaction data and/or further reaction data from the received user-side sensor data.

F.4: The method according to any of examples A.4 to E.4, wherein acquiring the reaction data comprises:
receiving, with the user device, user-side sensor data from at least one user-side sensor communicatively couplable with the user device; and
deriving, with the user device, the reaction data from the received user-side sensor data of the at least one user-side sensor.

G.4: The method according to example F.4, wherein the at least one user-side sensor is at least one of a camera, an acoustic sensor, an accelerometer, a motion sensor, a gyroscope, a capacitive sensor, a touch sensor, a piezoelectric sensor, a piezoresistive sensor, a Hall sensor, a contact blood pressure sensor, a photoplethysmography sensor, an oximeter, a (non-invasive) laser sensor, a heart rate sensor, a respiratory sensor, an air flow sensor, an air pressure sensor, a temperature sensor, an electrochemical gas sensor, an ultrasonic sensor, an acoustic resonance sensor, an optical sensor, an infrared sensor, a near field sensor, a time-of-flight sensor, a radar sensor, and a bio-impedance sensor.

H.4: The method according to any examples F.4 to G.4, wherein the at least one user-side sensor is comprised in at least one user-side device arranged in a vicinity of the user device, the at least one user-side device being one or more of a smart TV, a smart speaker, a smart watch, a health monitor, an IoT device, and an aerosol-generating device.

I.4: The method according to any examples A.4 to H.4, wherein acquiring the reaction data includes capturing sensor data with at least one sensor of the user device; and deriving, with the user device, the reaction data from the captured sensor data of the at least one sensor of the user device.

J.4: The method according to example I.4, wherein the at least one sensor of the user device is at least one of a camera, an acoustic sensor, an accelerometer, a motion sensor, a gyroscope, a capacitive sensor, a touch sensor, a piezoelectric sensor, a piezoresistive sensor, a Hall sensor, an optical sensor, an infrared sensor, a near field sensor, and a position sensor.

K.4: The method according to any of examples A.4 to J.4, further comprising receiving, at the user device, at least one query, wherein the at least one notification is provided in response to the at least one query by the server.

L.4: The method according to example K.4, wherein the at least query comprises a textual input received via a user interface at the user device, an oral input received via a microphone at the user device and/or a video-based input received via a camera of the user device.

M.4: The method according to any examples A.4 to L.4, wherein each of the one or more notifications comprises at least one of a text, a sound, an acoustic message, a message, an alert, an image, and a video.

N.4: The method according to any of examples A.4 to M.4, further comprising transmitting the determined final sentiment score to the server.

O.4: The method according to any of examples A.4 to N.4, wherein the determined final sentiment score is transmitted from the user device; and/or wherein the determined final sentiment score is transmitted from a user-side device communicatively coupled with the user device.

P.4: The method according to any of examples A.4 to O.4, wherein the at least one notification comprises at least one of a text, a sound, an acoustic message, a message, an alert, an image, and a video.

Q.4: The method according to any of examples A.4 to P.4, wherein providing the one or more notifications on the user device includes displaying the one or more notifications on a user interface of the user device.

R.4: The method according to any of examples A.4 to Q.4, wherein determining the final sentiment score comprises determining an intermediate sentiment score based on the acquired reaction data; and anonymizing the intermediate sentiment score, thereby generating the final sentiment score.

S.4: The method according to example R.4, wherein the final sentiment score is anonymized based on normalizing the intermediate sentiment score with a reference sentiment score.

T.4: The method according to any of examples R.4 to S.4, further comprising removing the intermediate sentiment score from the user device upon anonymizing the intermediate sentiment score.

U.4: The method according to any of examples A.4 to T.4, further comprising removing the final sentiment score from the user device upon transmitting the final sentiment score to the server.

V.4: The method according to any of examples A.4 to U.4, wherein providing one or more notifications comprises receiving a first notification and a second notification at the user device, wherein the second notification substantially matches or equals the first notification, wherein acquiring reaction data comprises acquiring first reaction data indicative of a first reaction of the user to the first notification and acquiring second reaction data indicative of a second reaction of the user to the second notification; and wherein determining the plurality of sentiment scores comprises determining a first sentiment score based on the first reaction data and determining a second sentiment score based on the second reaction data.

W.4: The method according to any of examples A.4 to V.4, wherein determining the final sentiment score comprises determining a deviation between at least two of the plurality of sentiment scores; and comparing the determined deviation to a threshold value for the deviation.

X.4: The method according to example W.4, further comprising discarding at least one of said at least two sentiment scores, if the determined deviation reaches or exceeds the threshold value for the deviation.

Y.4: The method according to any of examples W.4 to X.4, further comprising:
preventing the final sentiment score from being transmitted to the server, if the determined deviation between said at least two sentiment scores reaches or exceeds the threshold value for the deviation; and/or transmitting the final sentiment score to the server, only if said at least two sentiment scores substantially match each other.

Z.4: The method according to any of examples A.4 to y.4, further comprising aggregating a plurality of sentiment scores to determine the final sentiment score for transmission to the server.

AA.4: The method according any of examples A.4 to Z.4, wherein aggregating the plurality of sentiment scores comprises applying an aggregation function.

AB.4: The method according to any of examples A.4 to AA.4, further comprising determining a privacy level for at least one of the reaction data, sensor data of one or more sensors of the user device, and user-side sensor data of one or more user side sensors, wherein the privacy level is indicative of one or more features in one or more of the reaction data, the sensor data, and the user-side sensor data, which one or more features are to be manipulated in and/or removed from one or more of the reaction data, the sensor data, and the user-side sensor data for determining and/or before determining the sentiment score.

AC.4: The method according to any of examples A.4 to AB.4, wherein the privacy level is at least one of definable, user-configurable, and programmable.

AD.4: The method according to any of examples A.4 to AC.4, further comprising selecting, based on the defined privacy level for one or more of the feature groups, one or more processing operations to process one or more of the reaction data, the sensor data, and the user-side sensor data may be selected by the user device for one or more features defined by the one or more feature groups.

AE.4: The method according to any of examples A.4 to AD.1, wherein the one or more features in one or more of the reaction data, the sensor data, and the user-side sensor data may comprise and/or refer to a reaction feature and/or reaction pattern of the user related to one or more of a movement of the user, a body movement, an activity, a health state, a heart rate, a facial reaction, a change in skin tone of the user, and one or more environmental parameters affecting the user's sentiment.

AF.4: The method according to any of examples A.4 to AE.1, wherein the selected one or more processing operations for processing one or more of the reaction data, the sensor data, and the user-side sensor data depend on a data type of the reaction data, the sensor data, and/or the user-side sensor data.

A.5: A computer program comprising instructions, which, when the program is executed on one or more processors of a user device, cause the user device to carry out the method according to any of examples A.4 to AF.4.

A.6: A non-transitory computer-readable medium having stored thereon the computer program according to example A.5.

A.7: A computer-implemented method for interactive communication of a server with a user device, the method comprising:

transmitting a notification from the server to the user device;

receiving, by the server, a sentiment score, wherein the sentiment score correlates with a reinforcement learning reward for training a reinforcement learning model implemented on the server; and training the reinforcement learning model implemented on the server based on the received sentiment score.

B.7: The method according to example A.7, wherein the reinforcement learning model is trained based on maximizing a reward function of the reinforcement learning model implemented on the server.

C.7: The method according to any of examples A.7 to B.7, further comprising selecting, from a knowledge base of the server, a further notification to be transmitted to the user device based on the received sentiment score.

D.7: The method according to any of examples A.7 to C.7, further comprising receiving, from the user device, a query, wherein the notification is transmitted from the server to the user device upon receiving the query from the user device.

E.7: The method according to any of examples A.7 to D.7, further comprising receiving, from the user device, a further query, wherein a further notification is selected based on the received sentiment score and based on the received further query.

F.7: The method according to any example E.7, further comprising transmitting the further notification to the user device in response to the further query.

G.7: The method according to any of examples A.7 to F.7, further comprising processing the query and/or the further query using a Natural Language Processing engine implemented on the server.

H.7: The method according to any of examples A.7 to G.7, further comprising:

receiving at least one further sentiment score; and selecting, from a knowledgebase of the server, a further notification to be transmitted to the user device based on the received sentiment score and based on the received further sentiment score.

I.7: The method according to example H.7, wherein the at least one further sentiment score is received by the server from the user device and/or from at least one user-side device.

J.7: The method according to any of examples H.7 to I.7, further comprising comparing the sentiment score and the at least one further sentiment score.

K.7: The method according to any of examples H.7 to J.7, further comprising:

determining a deviation of the sentiment score and the at least one further sentiment score; and comparing the determined deviation to a threshold value for the deviation.

L.7: The method according to example K.7, further comprising discarding at least one of the sentiment score and the at least one further sentiment score, if the determined deviation between the sentiment score and the at least one further sentiment score reaches or exceeds the threshold value for the deviation.

M.7: The method according to any of examples H.7 to L.7, further comprising training a reinforcement learning model implemented on the server based on the sentiment score and/or the at least one further sentiment score, only if the sentiment score and the at least one further sentiment score substantially match each other.

A.8: A computer program comprising instructions, which, when the program is executed on one or more processors of a server, cause the server to carry out the method according to any of examples A.7 to M.7.

A.9: A non-transitory computer-readable medium having stored thereon the computer program according to example A.8.

A.10: A computer-implemented method for interactive communication of a server with a user device with, the method comprising:

transmitting one or more notifications from the server to the user device;

receiving, by the server, a plurality of sentiment scores, wherein each of the plurality of sentiment scores correlates with a reinforcement learning reward for training a reinforcement learning model implemented on the server; and training the reinforcement learning model implemented on the server based on comparing at least two of the plurality of sentiment scores.

B.10: The method according example A.10, wherein at least one of the plurality of sentiment scores is received by the server from the user device or from a user-side device.

C.10: The method according to any of examples A.10 to B.10, wherein at least one of the plurality of sentiment scores is indicative of a sentiment of the user in reaction of the user to at least one environmental parameter related to and/or indicative of an environment of the user affecting the sentiment of the user.

D.10: The method according to any of examples A.10 to C.10, wherein at least one of the plurality of sentiment scores is indicative of a sentiment of the user in reaction of the user to at least one of the one or more notifications received by the user-device from the server.

E.10: The method according to any of examples A.10 to DC.10, wherein transmitting one or more notifications from the server to the user device comprises transmitting a first notification and a second notification from the server to the user device, wherein the second notification substantially matches or equals the first notification; and wherein receiving the plurality of sentiment scores comprises receiving a first sentiment score in response to transmitting the first notification to the user-device and receiving a second sentiment score in response to transmitting the second notification to the user device.

F.10: The method according to any of examples A.10 to E.10, further comprising determining a deviation between at least two of the plurality of sentiment scores; and comparing the determined deviation to a threshold value for the deviation.

G.10: The method according to example F.10, further comprising discarding at least one of the plurality of sentiment scores, if the determined deviation between said at least two of the plurality of sentiment scores reaches or exceeds the threshold value for the deviation.

H.10: The method according to any of examples F.10 to G.10, further comprising training the reinforcement learning model implemented on the server based on at least one of the received plurality of sentiment scores, only if said at least two sentiment scores substantially match each other.

I.10: The method according to any of examples A.10 to H.10, wherein training the reinforcement learning model comprises:

determining a final sentiment score based on at least one of the plurality of sentiment scores;

deriving the reinforcement learning reward for training the reinforcement learning model from the determined final sentiment score and/or computing the determined sentiment score based on the final sentiment score; and supplying the reinforcement learning reward to the reinforcement learning model.

J.10: The method according to any of examples A.10 to I.10, further comprising aggregating a plurality of sentiment scores to determine the sentiment score for transmission to the server.

K.10: The method according any of examples A.10 to J.10, wherein aggregating the plurality of sentiment scores comprises applying an aggregation function.

L.10: The method according any of examples A.10 to K.10, wherein the reinforcement learning reward is determined, calculated and/or computed based on at least the final sentiment score and a reward function of the reinforcement learning model.

M.10: The method according any of examples A.10 to L.10, wherein determining and/or computing the reinforcement learning reward comprises determining a trend of a plurality and/or series of previous sentiment scores.

N.10: The method according any of examples A.10 to M.10, further comprising determining a weight based on the determined trend of the plurality and/or the series of previous sentiment scores, and determining the reinforcement learning reward based on the determined weight and the final sentiment score.

O.10: The method according any of examples A.10 to N.10, further comprising comparing the final sentiment score with the trend of the plurality and/or series of previous sentiment scores, and determining the reinforcement learning reward based on the comparison.

P.10: The method according any of examples A.10 to O.10, wherein the reinforcement learning reward is determined based on one or more previous reinforcement learning rewards determined based on one or more previous sentiment scores.

A.11: A computer program comprising instructions, which, when the program is executed on one or more processors of a server, cause the server to carry out the method according to any of examples A.10 to P.10.

A.12: A non-transitory computer-readable medium having stored thereon the computer program according to example A.11.

A.13: A computer-implemented method for interactive communication between a user device and a server, the method comprising:

transmitting a notification from the server to the user device;

providing, on the user device, the notification to a user of the user device;

acquiring, with the user device and/or with at least one user-side device, reaction data indicative of a reaction of the user to the notification;

determining, with the user device and/or with the at least one user-side device, a sentiment score based on the acquired reaction data, wherein the sentiment score is indicative of a sentiment of the user in reaction to the notification, and wherein the sentiment score correlates with a reinforcement learning reward for training a reinforcement learning model implemented on the server;

transmitting the determined sentiment score to the server from the user device and/or the at least one user-side device;

receiving, by the server, the sentiment score; and training the reinforcement model implemented on the server based on the sentiment score received by the server.

A.14: A computer-implemented method for interactive communication between a user device and a server, the method comprising:

transmitting one or more notifications from the server to the user device;

providing, on the user device, the one or more notifications to a user of the user device;

acquiring, with the user device and/or with at least one user-side device, reaction data indicative of one or more reactions of the user to the one or more notifications;

determining, with the user device and/or with the at least one user-side device, a plurality of sentiment scores based on the acquired reaction data, wherein each of the plurality of sentiment scores correlates with a reinforcement learning reward for training a reinforcement learning model implemented on the server;

comparing at least two of the determined plurality of sentiment scores with one another;

transmitting at least one of the plurality of sentiment scores to the server from the user device and/or the at least one user-side device;

receiving, by the server, at least one of the plurality of sentiment scores; and training the reinforcement model implemented on the server based on at least one of the plurality of sentiment scores received by the server.

A.15: A computer program comprising instructions, which, when the program is executed on one or more processors of a server, cause the server to carry out the method according to any of examples A.13 to A.14.

A.16: A non-transitory computer-readable medium having stored thereon the computer program according to example A.15.

A.17: A user device configured to interactively communicate with a server, the user device comprising:
a communication circuitry configured to communicatively couple the user device to the server and to receive a notification from the server;
a user interface configured to provide the notification to a user of the user device, and
a control circuitry including one or more processors, wherein the control circuitry is configured to:
acquire reaction data indicative of a reaction of the user to the notification; and
determine a sentiment score for transmission to the server based on the acquired reaction data, wherein the sentiment score is indicative of a sentiment of the user in reaction to the notification.

B.17. The user device according to example A.17, wherein the control circuitry is further configured to transmit the determined sentiment score via the communication circuitry of the user device to the server.

C.17: The user device according to any of examples A.17 to B.17, wherein the sentiment score is an anonymized numerical measure indicative of the reaction of the user to the notification; and/or wherein the sentiment score correlates with or is indicative of a reinforcement learning reward configured for being used by the server for training a reinforcement learning model implemented on the server.

D.17: The user device according to any of examples A.17 to B.17, wherein the control circuitry is further configured to:
determine an intermediate sentiment score based on the acquired reaction data; and
anonymize the intermediate sentiment score to generate the sentiment score.

E.17: The user device according to example D.17, wherein the control circuitry is configured to anonymize the sentiment score based on normalizing the intermediate sentiment score with a reference sentiment score.

F.17: The user device according to example E.17, wherein the control circuitry is further configured to remove the intermediate sentiment score from the user device upon anonymizing the intermediate sentiment score and/or upon generating the sentiment score.

G.17: The user device according to any of examples A.17 to F.17, wherein the control circuitry is further configured to remove the sentiment score from the user device upon transmitting the sentiment score to the server.

H.17: The user device according to any of examples A.17 to G.17, further comprising at least one sensor, wherein the control circuitry is further configured to capture sensor data with the at least one sensor of the user device.

I.17: The user device according to example H.17, wherein the control circuitry is further configured to derive the reaction data from the captured sensor data of the at least one sensor.

J.17: The user device according to any of examples H.17 to I.17, wherein the at least one sensor of the user device is at least one of a camera, an acoustic sensor, an accelerometer, a motion sensor, a gyroscope, a capacitive sensor, a touch sensor, a piezoelectric sensor, a piezoresistive sensor, a Hall sensor, an optical sensor, an infrared sensor, a near field sensor, and a position sensor.

K.17: The user device according to any of examples A.17 to J.17, wherein the communication circuitry is further configured to receive user-side sensor data from at least one user-side sensor communicatively coupled with the user device via the communication circuitry.

L.17: The user device according to example K.17, wherein the control circuitry is further configured to derive the reaction data from the received user-side sensor data of the at least one user-side sensor.

M.17: The user device according to any of examples K.17 to L.17, wherein the at least one user-side sensor is at least one of a camera, an acoustic sensor, an accelerometer, a motion sensor, a gyroscope, a capacitive sensor, a touch sensor, a piezoelectric sensor, a piezoresistive sensor, a Hall sensor, a contact blood pressure sensor, a photoplethysmography sensor, an oximeter, a (non-invasive) laser sensor, a heart rate sensor, a respiratory sensor, an air flow sensor, an air pressure sensor, a temperature sensor, an electrochemical gas sensor, an ultrasonic sensor, an acoustic resonance sensor, an optical sensor, an infrared sensor, a near field sensor, a time-of-flight sensor, a radar sensor, and a bioimpedance sensor.

N.17: The user device according to any of examples K.17 to M.17, wherein the at least one user-side sensor is comprised in at least one user-side device arranged in a vicinity of the user device, the at least one user-side device being one or more of a smart TV, a smart speaker, a smart watch, a health monitor, and an aerosol-generating device.

O.17: The user device according to any of examples A.17 to N.17, wherein the control circuitry is further configured to
derive, from the reaction data, at least one environmental parameter, wherein the at least one environmental parameter is related to and/or indicative of an environment of the user affecting the sentiment of the user; and
determine the sentiment score based on the at least one environmental parameter.

P.17: The user device according to any of examples A.17 to O.17, wherein the control circuitry is configured to acquire the reaction data based on sensor data of at least one sensor of the user device and based on user-side sensor data of at least one user-side sensor arranged in an environment of the user device.

Q.17: The user device according to any of examples A.17 to P.17, wherein the control circuitry includes a classifier circuitry configured to classify at least a part of the reaction data to determine the sentiment score.

R.17: The user device according to any of examples A.17 to Q.17, further comprising at least one camera configured to capture image data indicative of one or more images of the user of the user device; wherein the control circuitry is further configured to determine the reaction data based on the captured image data and to determine the sentiment score based on classifying at least a part of the reaction data with a classifier circuitry.

S.17: The user device according to example R.17, wherein the control circuitry is further configured to:
determine, with the classifier circuitry, a reaction pattern based on processing at least a part of the reaction data, wherein the reaction pattern is indicative of an emotional expression of the user in response to the notification; and
derive the sentiment score from the determined reaction pattern.

T.17: The user device according to any of examples A.17 to S.17, wherein the control circuitry is configured to determine the sentiment score based on computing a current sentiment score and based on deriving the sentiment score from the computed current sentiment score.

U.17: The user device according to any of examples A.17 to T.17, wherein the communication circuitry is configured to receive at least one user-side sentiment score from at least one user-side device communicatively coupled to the user device; and wherein the control circuitry is configured to determine the sentiment score based on the user-side sentiment score received from the at least one user-side device.

V.17: The user device according to any of examples A.17 to U.17, wherein the control circuitry is configured to determine the sentiment score based on:
computing a current sentiment score; and
at least one user-side sentiment score received from at least one user-side device communicatively coupled to the user device, or at least one user-side sentiment score computed by the control circuitry based on user-side sensor data received from at least one user-side device.

W.17: The user device according to example V.17, wherein the control circuitry is further configured to compare the current sentiment score and the at least one user-side sentiment score.

X.17: The user device according to example W.17, wherein the control circuitry is further configured to
determine a deviation of the current sentiment score and the at least one user-side sentiment score; and
compare the determined deviation to a threshold value for the deviation.

Y.17: The user device according to example X.17, wherein the control circuitry is further configured to discard at least one of the current sentiment score, the at least one user-side sentiment score and the sentiment score, if the determined deviation between the current sentiment score and the at least one user-side sentiment score reaches or exceeds the threshold value for the deviation.

Z.17: The user device according to any of example X.17 to Y.17, wherein the control circuitry is further configured to:
prevent the sentiment score from being transmitted to the server, if the determined deviation between the current sentiment score and the at least one user-side sentiment score reaches or exceeds the threshold value for the deviation; and/or
transmit the sentiment score to the server, only if the current sentiment score and the at least one user-side sentiment score substantially match each other.

AA.17. The user device according to any of examples X.17 to Z.17, wherein the control circuitry is further configured to:
prohibit transmission of the sentiment score to the server, if the determined deviation between the current sentiment score and the at least one user-side sentiment score reaches or exceeds the threshold value for the deviation;
receive a further notification from the server, wherein the further notification substantially matches or equals the notification;
acquire further reaction data indicative of a further reaction of the user to the further notification; and
determine a further sentiment score based on the acquired further reaction data, wherein the further sentiment score is indicative of a further sentiment of the user in reaction to the further notification.

AB.17: The user device according to example AA.17, wherein the control circuitry is further configured to:
compare the further sentiment score, determined based on the further reaction data indicative of the user's further reaction to the further notification, with the sentiment score or the current sentiment score, determined based on the reaction data indicative of the user's reaction to the notification.

AC.17: The user device according to example AB.17, wherein the control circuitry is further configured to:
transmit at least one of the sentiment score, the current sentiment score, and the further sentiment score to the server, only if the further sentiment score, determined based on the further reaction data indicative of the user's further reaction to the further notification, substantially matches the sentiment score or the current sentiment score, determined based on the reaction data indicative of the user's reaction to the notification.

A.18: A user device configured to interactively communicate with a server, the user device comprising:
a communication circuitry configured to communicatively couple the user device to the server and to receive one or more notifications from the server;
a user interface configured to provide the one or more notifications to a user of the user device, and
a control circuitry including one or more processors, wherein the control circuitry is configured to:
acquire reaction data indicative of one or more reactions of the user to the one or more notifications;
determine, based at least in part on the acquired reaction data, a plurality of sentiment scores, wherein at least one of the plurality of sentiment scores is indicative of a sentiment of the user in reaction to the one or more notifications; and
determine a final sentiment score for transmission to the server based on comparing at least two of the plurality of sentiment scores, and
wherein the final sentiment score is usable by the server for training a reinforcement learning model implemented on the server.

B.18: The user device according to example A.18, wherein at least one of the plurality of sentiment scores is indicative of a sentiment of the user in reaction of the user to at least one environmental parameter related to and/or indicative of an environment of the user affecting the sentiment of the user C.18: The user device according to any of examples A.18 to B.18; wherein at least two of the plurality of sentiment scores are indicative of a sentiment of the user in reaction of the user to at least two notifications received from the server.

D.18: The user device according any of examples A.18 to C.18, wherein the control circuitry is further configured to determine the final sentiment score based on selecting at least one of the plurality of sentiment scores as the final sentiment score.

E.18: The user device according to any of examples A.18 to D.18, wherein the communication circuitry is further configured to receive at least one of the plurality sentiment scores from at least one user-side device communicatively couplable to the user device.

F.18: The user device according to any of examples A.18 to E.18, wherein the communication circuitry is further configured to receive user-side sensor data from at least one user-side device; and wherein the control circuitry is further configured to compute at least one of the plurality of sentiment scores based on deriving further reaction data from the received user-side sensor data.

G.18: The user device according to any of examples A.18 to F.18, wherein the communication circuitry is configured to receive a first notification and a second notification to the user from the server, wherein the second notification substantially matches or equals the first notification; and wherein the control circuitry is further configured to:
  acquire first reaction data indicative of a first reaction of the user to the first notification;
  acquire second reaction data indicative of a second reaction of the user to the second notification; and
    determine a first sentiment score based on the first reaction data and determine a second sentiment score based on the second reaction data.

H.18: The user device according to any of examples A.18 to G.18, wherein the control circuitry is further configured to:
  determine a deviation between at least two of the plurality of sentiment scores; and
  compare the determined deviation to a threshold value for the deviation.

I.18: The user device according to example H.18, wherein the control circuitry is further configured to discard at least one of said at least two sentiment scores, if the determined deviation reaches or exceeds the threshold value for the deviation.

J.18: The user device according to any of examples H.18 to I.18, wherein the control circuitry is further configured to prevent the final sentiment score from being transmitted to the server, if the determined deviation between said at least two sentiment scores reaches or exceeds the threshold value for the deviation; and/or wherein the control circuitry is further configured to transmit the final sentiment score to the server, only if said at least two sentiment scores substantially match each other.

A.19. Use of a user device according to any one of examples A.17 to J.18 for interactively communicating with a server.

A.20: A server configured to interactively communicate with a user device, the server comprising:
  a communication arrangement configured to communicatively couple the server with the user device and to transmit a notification to the user device, wherein the communication arrangement is further configured to receive a sentiment score from the user device, the sentiment score being indicative of a sentiment of the user in reaction to the notification; and
  a control arrangement including a reinforcement learning model;
  wherein the sentiment score correlates with a reinforcement learning reward for training the reinforcement learning model; and
  wherein the control arrangement is configured to train the reinforcement learning model based on the received sentiment score.

B.20: The server according to example A.20, wherein the server includes a knowledgebase and is configured to select a further notification for transmission to the user device based on the received sentiment score.

C.20: The server according to any of examples A.20 to B.20, wherein the control arrangement further comprises a reinforcement learning model; wherein the sentiment score correlates with a reinforcement learning reward for training the reinforcement learning model; and wherein the control arrangement is configured to train the reinforcement learning model based on the received sentiment score.

D.20: The server according to any of examples A.20 to C.20, wherein the control arrangement is configured to train the reinforcement learning model based on maximizing a reward function of the reinforcement learning model.

E.20: The server according to any of examples A.20 to C.20, wherein the communication arrangement is further configured to receive a query from the user device; and wherein the control arrangement is configured to transmit the notification from the server to the user device upon receiving the query from the user device.

F.20: The server according to any of examples A.20 to E.20, wherein the communication arrangement is configured to receive a further query from the user device; and wherein the control arrangement is configured to select the further notification based on the received sentiment score and based on the received further query.

G.20: The server according to example F.20, wherein the control arrangement is further configured to transmit, via the communication arrangement, the further notification to the user device in response to the further query.

H.20: The server according to any of examples A.20 to G.20, wherein the control arrangement further includes a Natural Language Processing engine configured to process the query and/or the further query using a Natural Language Processing engine.

I.20: The server according to any of examples A.20 to H.20, wherein the communication arrangement is further configured to receive at least one further sentiment score; and wherein the control arrangement is further configured to select, from the knowledgebase, the further notification to be transmitted to the user device based on the received sentiment score and based on the received further sentiment score.

J.20: The server according to example I.20, wherein the at least one further sentiment score is received by the server via the communication arrangement from the user device or from an user-side device.

K.20: The server according to any of examples I.20 to J.20, wherein the control arrangement is further configured to compare the sentiment score and the at least one further sentiment score.

L.20: The server according to any of examples I.20 to K.20, wherein the control arrangement is further configured to determine a deviation of the sentiment score and the at least one further sentiment score and to compare the determined deviation to a threshold value for the deviation.

M.20: The server according to example L.20, wherein the control arrangement is further configured to discard at least one of the sentiment score and the at least one further sentiment score, if the determined deviation between the sentiment score and the at least one further sentiment score reaches or exceeds the threshold value for the deviation.

N.20: The server according to any of examples L.20 to M.20, wherein the control arrangement comprises a reinforcement learning model; and wherein the control arrangement is configured to train the reinforcement learning model based on the sentiment score and/or the at least one further sentiment score, only if the sentiment score and the at least one further sentiment score substantially match each other.

A.21: A server configured to interactively communicate with a user device, the server comprising:
  a communication arrangement configured to communicatively couple the server with the user device and to transmit one or more notifications from the server to the user device; and
  a control arrangement including a reinforcement learning model;
  wherein the communication arrangement is further configured to receive a plurality of sentiment scores, wherein each of plurality of sentiment scores correlates with a reinforcement learning reward for training a reinforcement learning model implemented on the server; and
  wherein the control arrangement is configured to train the reinforcement learning model implemented on the server based on comparing at least two of the plurality of sentiment scores.

B.21: The server according to example A.21, wherein the communication arrangement is configured to receive at least one of the plurality of sentiment scores by the server from the user device or from a user-side device.

C.21: The server according to any of examples A.21 to B.21, wherein at least one of the plurality of sentiment scores is indicative of a sentiment of the user in reaction of the user to at least one environmental parameter related to and/or indicative of an environment of the user affecting the sentiment of the user; and/or wherein at least two of the plurality of sentiment scores are indicative of a sentiment of the user in reaction of the user to at least two notifications received from the server.

D.21: The server according to any of examples A.21 to C.21, wherein the communication arrangement is configured to transmit a first notification and a second notification from the server to the user device, wherein the second notification substantially matches or equals the first notification; and wherein the server is configured to receive a first sentiment score in response to transmitting the first notification to the user-device and receiving a second sentiment score in response to transmitting the second notification to the user device.

E.21: The server according to any of examples A.21 to D.21, wherein the control arrangement is configured to determine a deviation between at least two of the plurality of sentiment scores; and wherein the control arrangement is configured to compare the determined deviation to a threshold value for the deviation.

F.21: The server according to example E.21, wherein the control arrangement is configured to discard at least one of the plurality of sentiment scores, if the determined deviation between said at least two of the plurality of sentiment scores reaches or exceeds the threshold value for the deviation.

G.21: The server according to any of examples E.21 to F.21, wherein the control arrangement is configured to train the reinforcement learning model implemented on the server based on at least one of the received plurality of sentiment scores, only if said at least two sentiment scores substantially match each other.

H.21: The server according to any of examples A.21 to G.21, herein the control arrangement is further configured to:
  determine a final sentiment score based on at least one of the plurality of sentiment scores;
  derive the reinforcement learning reward for training the reinforcement learning model from the determined final sentiment score; and
  supply the reinforcement learning reward to the reinforcement learning model.

A.22: Use of a server according to any of examples A.20 to H.21 for interactively communicating with a user device.

A.23: A system for interactive communication between a server and a user device, the system comprising:
  a user device according to any of examples A.17 to J.18; and
  a server according to any of examples A.20 to H.21.

Examples will now be further described with reference to the Figures in which.

The Figures are schematic only and not true to scale. In principle, identical or like parts, elements and/or steps are provided with identical or like reference numerals in the figures.

Figure 1:
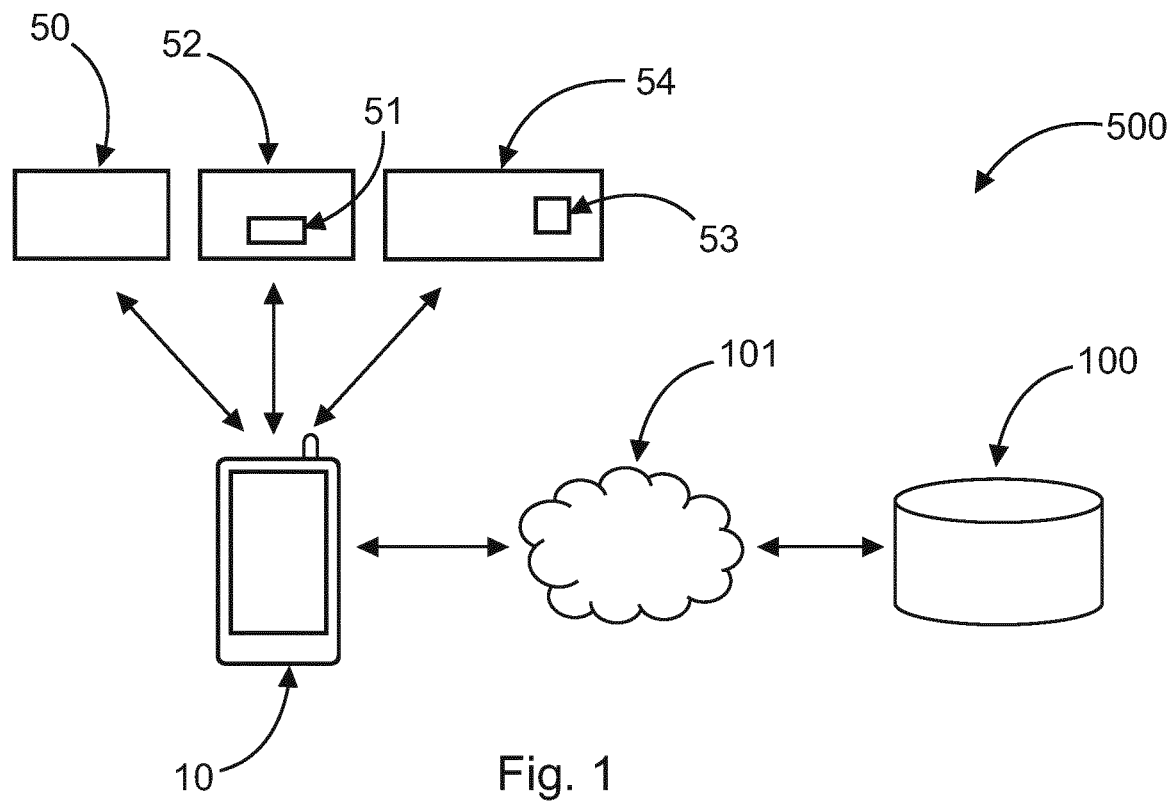
FIG. 1 shows a system for interactive communication between a server and at least one user device.
Figure 2:
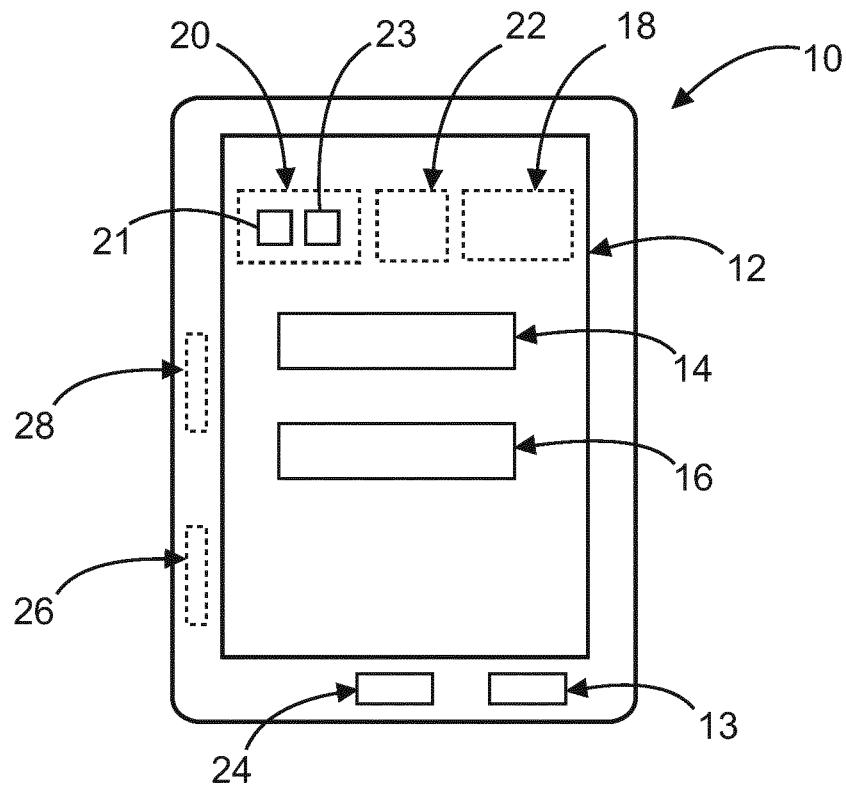
FIG. 2 shows a user device for interactively communicating with a server.
Figure 3:
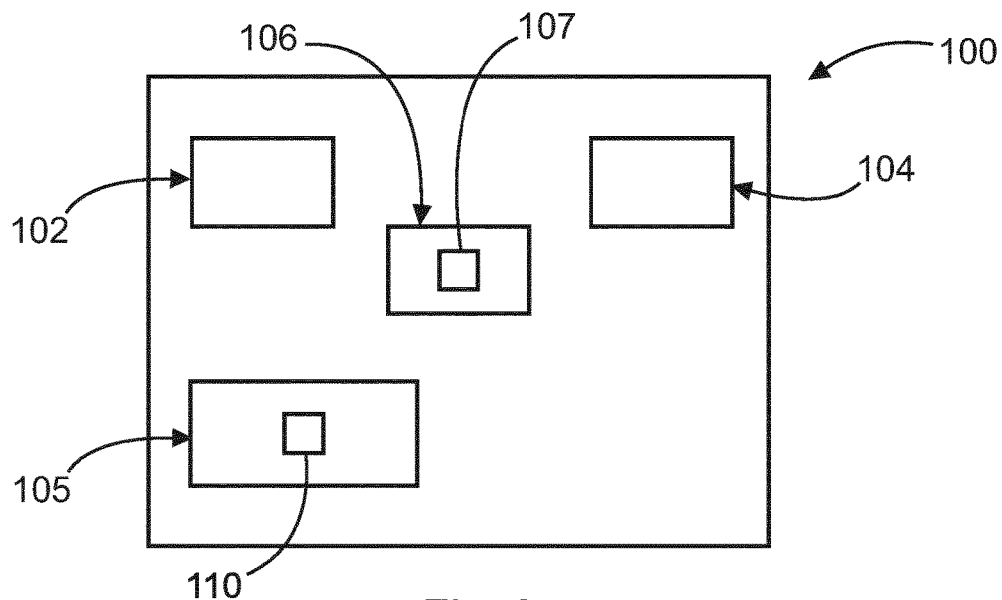
FIG. 3 shows a server for interactively communicating with a user device.

FIG. 1 shows a system 500 for interactive communication between a server 100 and at least one user device 10. FIG. 2 shows a user device 10 for interactively communicating with a server 100. FIG. 3 shows a server 100 for interactively communicating with a user device 10. Unless stated otherwise, it is referred to any or all of FIGS. 1 to 3 in the following.

The system 500 comprises at least one user device 10 and at least one server 100.

In the example shown in FIGS. 1 and 2, the user device 10 is a handheld user device 10. Alternatively, the user device 10 may be a stand-alone or fixedly installed device. By way of example, the user device 10 may refer to a handheld, a smart phone, a personal computer ("PC), a tablet PC, a notebook, a computer, or the like.

The user device 10 comprises a user interface 12, for example a display and/or touch display, configured to receive a user input, for example one or more queries, and/or to provide, for example display, one or more notifications 14, 16 to a user of the user device 10. In the example shown in FIG. 1, two notifications are displayed on the user interface 12.

The user device 10 further comprises a microphone 13 for providing one or more notifications to the user. It should be noted that a plurality of notifications 14, 16 may be provided to the user simultaneously or sequentially.

Further, the user device 10 comprises a communication circuitry 18 configured to communicatively couple the user device 10 to the server 100 and to receive one or more notifications 14, 16 from the server 100. By way of example, the user device 10 may be couplable and/or may be configured to communicate with the server 100 (and vice versa) via an Internet connection, a WiFi connection, a Bluetooth connection, a mobile phone network, a 3G connection, an edge connection, an LTE connection, a BUS connection, a wireless connection, a wired connection, a radio connection, a near field connection an IoT connection or any other connection using any appropriate communication protocol. A communication link or connection between the server 100 and the user device 10 is indicated by reference numeral 101 in FIG. 1.

The user device 10 further comprises a control circuitry 20 including one or more processors 21. The control circuitry 20 is configured to acquire reaction data indicative of a reaction of the user to one or more notifications 14, 16. Further, the control circuitry 20 is configured to determine one or more sentiment scores for transmission to the server 100 based on the acquired reaction data, wherein at least one sentiment score is indicative of a sentiment of the user in reaction to one or more of the notifications 14, 16.

The user device 10, further comprises a data storage 22 or memory 22 for storing for example one or more notifications 14, 16, reaction data, any other data, and/or software instructions.

The user device 10 further comprises a plurality of sensors 24, 26, 28 for capturing and/or acquiring sensor data. For instance, sensor 24 may refer to a camera 24 of the user device 10 configured to capture, as sensor data, image data comprising one or more images. Further, sensor 26 may be a motion sensor and sensor 28 may be GPS sensor. However, any of sensors 24, 26, 28 may be a different type of sensor, such as for example a camera, an acoustic sensor, an accelerometer, a motion sensor, a gyroscope, a capacitive sensor, a touch sensor, a piezoelectric sensor, a piezoresistive sensor, a Hall sensor, an optical sensor, an infrared sensor, a near field sensor, a position sensor, and as a Global Positioning System ("GPS") sensor.

The server 100 comprises a communication arrangement 102 configured to communicatively couple the server 100 with the user device 10 and to transmit a notification to the user device 10, wherein the communication arrangement 102 is further configured to receive one or more sentiment scores from the user device 10.

The server 100 further comprises a control arrangement 104 and an artificial intelligence module 108. The server 100 further comprises a reinforcement learning engine or model 110 configured to select one or more notifications 14, 16 for transmission to the user device 10.

The server 100 further comprises a data storage 106 with a knowledgebase 107 configured to store for example one or more notifications 14, 16, one or more queries from the user device 10, one or more sentiment scores and/or software instructions.

As described hereinabove, the sentiment score is an anonymized numerical measure indicative of the reaction of the user to the one or more notifications 14, 16. Further, the sentiment score correlates with and/or is indicative of a reinforcement learning reward configured for being used by the server 100 for training the reinforcement learning model 110 implemented on the server 100.

The system 500 further comprises a user-side sensor 50 and two user-side devices 52, 54, each having a user-side sensor 51, 53. Each of the user-side sensors 50, 51, 53 is configured to capture user-side sensor data. Further, each of the user side sensors 50, 51 53 and/or each of the user-side devices 52, 54 is configured to transmit sensor data to the user device 10 via a communication link, for example via an Internet connection, a WiFi connection, a Bluetooth connection, a mobile phone network, a 3G connection, an edge connection, an LTE connection, a BUS connection, a wireless connection, a wired connection, a radio connection, a near field connection an IoT connection or any other connection using any appropriate communication protocol.

Further, each of the user side sensors 50, 51 53 and/or each of the user-side devices 52, 54 is configured to transmit one or more sentiment scores to the server 100 via a communication link, for example via an Internet connection, a WiFi connection, a Bluetooth connection, a mobile phone network, a 3G connection, an edge connection, an LTE connection, a BUS connection, a wireless connection, a wired connection, a radio connection, a near field connection an IoT connection or any other connection using any appropriate communication protocol.

The user-side devices 52, 54, may for example, be a smart TV (television), a smart speaker, a smart watch, a health monitor, an IoT (Internet of Things) device, and an aerosol-generating device, or the like.

Further, the user-side sensors 50, 51, 53 may be at least one of a camera, an acoustic sensor, an accelerometer, a motion sensor, a gyroscope, a capacitive sensor, a touch sensor, a piezoelectric sensor, a piezoresistive sensor, a Hall sensor, a contact blood pressure sensor, a photoplethysmography sensor, an oximeter, a (non-invasive) laser sensor, a heart rate sensor, a respiratory sensor, an air flow sensor, an air pressure sensor, a temperature sensor, an electrochemical gas sensor, an ultrasonic sensor, an acoustic resonance sensor, an optical sensor, an infrared sensor, a near field sensor, a time-of-flight sensor, a radar sensor, and a bio-impedance sensor.

The control circuitry 20 of the user device 10 can be configured to determine an intermediate sentiment score based on the acquired reaction data, and to anonymize the intermediate sentiment score to generate the sentiment score, for example based on normalizing the intermediate sentiment score with a reference sentiment score. Hence, it may be possible to efficiently preserve privacy.

A determined sentiment score may then be transmitted via the communication circuitry 18 to the server 100. Upon transmission, the sentiment score and/or the intermediate sentiment score may be removed from the user device 10. By determining the sentiment score on the user device, a computing burden to train the reinforcement learning model 110 on the server 100 may be distributed to one or more user devices 10.

In order to determine the sentiment score (also referred to as final sentiment score) sentiment scores from a plurality of sources, such as sensors 24, 26, 28, user-side sensors 50, 51, 53 and/or user-side devices 52, 54 may be used. For example, sensor data of any of sensors 24, 26, 28 of the user device 10 and/or user-side sensor data of any of user side sensors 50, 51, 53 may be used to determine and/or derive the reaction data, based on which the sentiment score may be determined by the user device 10.

For example, one or more queries may be transmitted from the user device 10 to the server 100, and the server 10 may transmit one or more notifications 14, 16 to the user device 10. The camera 24 of the user device 10 may be used to record an image or images the user's facial reaction to one or more of the notifications 14, 16 received from server. The images of the user's facial reaction are not sent to the server; they do not leave the user device 10. Instead, the user device 10 identifies the user's facial reaction for example using a machine learning classifier 23 and/or a classifier circuitry 23 of the user device 10.

The control circuitry 20 of the user device 10 may then determine a reaction pattern, wherein the reaction pattern is indicative of an emotional expression, such as for example "happy" or "annoyed" of the user of the user device 10. Based thereon, the user device 10 may determine the sentiment score and transmit the sentiment score to the server 100 for training the reinforcement learning model 110 of the server 100. Hence, it may be possible to personalize and/or improve the overall interactive communication between the server 100 and the user device 10.

Alternatively or additionally, one or more user-side sentiment scores may be determined by one or more of user-side sensor 50, user device 52, and user-device 54. These one or more user-side sentiment scores can then be transmitted to the user device 10 and/or to the server 100.

Using multiple sentiment scores from multiple sources, such as sensors 24, 26, 28, 50, 51, 53, the sentiment score that is transmitted to the server 100 and used by the server 100 can be validated, as exemplary described in the following.

For instance, one or more user-side sentiment scores can be determined by the user device 10 based on sensor data of any of user-side sensors 50, 51, 53. Alternatively or additionally, one or more user-side sentiment scores can be determined by user-side sensor 50, and/or user-side devices 52, 54 and transmitted to the user device 10. Alternatively or additionally, one or more sentiment scores, for example current sentiment scores, can be determined by the user device based on sensor data of one or more of sensors 24, 26, 28. The one or more user-side sentiment scores and/or the one or more (current) sentiment scores can then be compared to each other, a deviation between the scores may be determined, for example for each pair of sentiment scores, and compared to a threshold value for the deviation. Is the threshold value exceeded or reached, one or more of the determined (current and/or user-side) sentiment scores can be discarded. If the threshold value is not exceeded one or more of the determined (current and/or user-side) sentiment scores can be used to determine the final sentiment score and/or the sentiment score transmitted to the server 100. The final sentiment score can be determined based on selecting one of the determined (current and/or user-side) sentiment scores as the final sentiment score. Alternatively, multiple sentiment scores may be combined to generate the final sentiment score.

It should be noted that the validation described hereinabove can alternatively or additionally be performed on the server 100. For this purpose, the plurality of determined (current and/or user-side) sentiment scores can be transmitted to the server 100, via the user device 10 and/or via the user-side devices 52, 54, and compared to one another by the server 100.

The validation is summarized exemplary in the following. A user sentiment can be calculated and/or determined implicitly from multiple sources, such as for example from a smart TV 52, a thermostat 50, a personal assistant 54, or the like. Hence, it may be possible to train the reinforcement learning model 110 only on reactions that are a consequence of the model's 110 responses or decisions, as opposed to reactions that are based on external factors and/or one or more environmental parameters. For instance, the server 100 might provide a notification 14, 16 that receives a negative reaction and/or sentiment from the user and results in a negative sentiment score. However, this negative sentiment score, sentiment and/or reaction might be a consequence of the temperature in the user's vicinity rather than from notification 14, 16. By determining the user sentiment score from multiple sources it is possible to use only user sentiment scores, for example for training the reinforcement learning model 110, that agree with one another and to ignore those that are anomalous.

Another possibility is to not immediately classify a certain response or sentiment as being correlated with a negative reaction or sentiment if at least two sentiment scores do not agree with one another (for example one is positive, one is negative). Instead, the same type or a similar notification 16 could be provided to the user device 10 again, for example at a different time. Then, the reaction or sentiment of the user to a first notification 14 can be ascertained based on the second notification 16 if there is an inconsistency and/or deviation between the at least two sentiment scores.

By using multiple sources and/or by delaying training until a reaction, sentiment and/or sentiment score has been confirmed, the reinforcement learning model 110 can be trained more accurately, for example when compared to conventional systems that are trained on a one-by-one basis.

In the following, various examples and/or advantages of the present disclosure are described. The system 500 may involve an interactive app, where the app may be able to converse with the user, providing interesting and relevant information and/or notifications 14, 16 to the user, either (on-demand) in response to a query or proactively, for example in the form of timely and relevant alerts (for example using a "chatbot" software application). Generally, the system 500 allows for an interaction personalization. In conventional systems, the sentiment is usually derived from user queries and/or responses, for example user feedback provided explicitly by the user. This may lead to a dependency on the user providing this feedback and implies additional effort on behalf of the user. Also, the feedback is very personal, provided specifically by the user without considering the surroundings, location (home, office, market, or the like), other family members present in the vicinity or any other environmental parameter or factor.

The system 500 according to the present disclosure, however, can provide a highly personalized and interactive experience based on implicit user feedback, accommodating both the user and his environmental context, which can be regarded as "implicit feedback". Therein, the sentiment score can be computed based on explicit feedback provided by the user, for example user response, queries, NPS scores, ratings or the like, and based on implicit feedback, such as for example a change in facial expression upon receiving one or more notifications 14, 16 from the server 100.

Further, the user's environmental (surrounding) aspects, parameters and/or factors can be taken into account, such as for example a location (home, office, market, or the like), a temperature, lighting, time of the day, weather, other family members present in the vicinity, and the like. Hence, sentiment scores for adapting the conversation and/or interactive communication according to the user and/or the user's environment can be used for training the reinforcement learning model 110.

Alternatively or additionally, a conversation history can be taken into account. For instance, a user feedback can be put in perspective with the user reaction to the conversation so far. Hence, it may be possible to discount a sudden change in user feedback and/or the determined sentiment score, which might be due to external factors and/or environmental parameters, and for example unrelated to the notification(s) 14, 16.

Moreover, by the system 500 a privacy-preserving interaction can be provided. This can for example be achieved by adding a privacy layer to the server 100 and/or the user device 10, for instance, in terms of not transmitting any private data from the user device 10 to the server 100.

From the server's 100 perspective, the conversation history can be accommodated in a privacy preserving fashion as sentiment scores to adapt and/or personalize the user conversation, wherein the sentiment scores do not contain any private or personal data of the user. With regard to the reinforcement learning model 110, the reinforcement learning rewards and/or sentiment score determination can be distributed, such that the user privacy is protected, while also providing an accurate representation of the reward function.

Further examples of the present disclosure are described in the following. One or more user-side devices 52, 54 can be, for example a (standalone) camera, a microphone, a thermostat, smartwatch, or the like. The one or more sensors 13, 24, 26, 28 of the user device 10 can, for example, be a camera, a microphone, an accelerometer embedded within the mobile device, for example hosting an app for interactive communication on the user device 10.

A user-side sentiment score can be computed based on audio, visual, and/or textual feedback, for example captured by one or more user-side devices 52, 54 and/or one or more user-side sensors 50, 51, 53. A privacy sensitivity level and/or privacy level, for example low, medium or high, may be defined by the user on the user device. The privacy level may correspond to different aspects, for example Location, People, Health, Activity, and/or may be indicative of one or more features in one or more of the reaction data, the sensor data, and the user-side sensor data, which one or more features are to be manipulated in and/or removed from one or more of the reaction data, the sensor data, and the user-side sensor data for determining and/or before determining the (final) sentiment score.

Let $A_t$, $V_t$, and $T_t$ refer to the captured audio, visual and textual feedback during time t.

For instance, let $V_t$ correspond to a video frame of the user with a family member in the background. A 'low' privacy level with respect to 'People' in this case would correspond to keeping the frame or image as it is. A 'Medium' privacy level would correspond to blurring the face of the person. A 'High' privacy level would correspond to cropping the image to remove the person altogether from the frame.

Similarly, let $T_t$ correspond to a text response provided by the user, for example "I will be going on a business trip tomorrow to Krakow." A 'low' privacy level with respect to 'Location' in this case could correspond to keeping the response as it is. A 'Medium' privacy level would correspond with abstracting "Krakow" to "somewhere in Europe" in the response. A 'High' privacy level would correspond to removing the destination completely from the response: "I will be going on a business trip tomorrow".

Accordingly, based on the defined privacy level for one or more of the feature groups, one or more processing operations to process one or more of the reaction data, the sensor data, and the user-side sensor data may be selected by the user device 10 for one or more features defined by the one or more feature groups.

Further, let $P(A_t)$, $P(V_t)$ and $P(T_t)$ denote the respective captured sensor data and/or user-side sensor data, with privacy preservation applied by the user-side sensors 50, 51, 53 and/or user-side devices 52, 54 according the user specified privacy level setting. The user-side sensors 50, 51, 53 and/or user-side devices 52, 54 may then share $P(A_t)$, $P(V_t)$ and $P(T_t)$ with the user device 10, for example an app on the user device 10.

Referring to the user device 10, let $s_{At}=f_s(P(A_t))$, $s_{Vt}=f_s(P(V_t))$, $s_{Tt}=f_s(P(T_t))$ denote the user-side sentiment scores computed independently based on the respective sensory data or feedback. The (final) sentiment score computation can be considered as a classifier outputting a value between a minimum and a maximum value, for example 1-10.

The user device 10 may then aggregate the above (independently computed) sentiment scores, and compute the consolidated or final sentiment $S_t$. The aggregation function can for example be a weighted average: $S_t=\frac{1}{3}\times[(w_A\times s_{At})+(w_V\times s_{Vt})+(w_T\times s_{Tt})]$, with $w_i$ denoting the weights.

If there exists a significant discrepancy between two or more sentiment scores $s_{At}$, $s_{Vt}$ and $s_{Tt}$, for example $s_{Vt}=9$, but $s_{Tt}=3$, then different strategies can be applied to consolidate them.

For instance, the feedback cycle can be ignored as there is too much discrepancy between the different sentiment scores. This may be denoted by assigning a value of 0 to the consolidated user sentiment $S_t$.

Alternatively, a higher weightage or weight can be applied for example to explicit versus implicit feedback, for example if $s_{Tt}$ was computed based on a user typed response or user input, while $s_{Vt}$ was computed based on a background frame using a sensor-side device 52, 54; then a higher weightage ca be given to $s_{Tt}$. For example, the user might be smiling with their child in the snapshot, but from their text/voice responses it seems that they are "stressed". Hence the "stressed" sentiment score can be prioritized by assigning a higher weight.

An output of the user device 10 or an app running thereon may be to provide the (consolidated) final sentiment $S_t$ or the server 100 may determine this sentiment score. Further, explicit user responses or queries $\{P(A_t), P(V_t), P(T_t)\}$ provided by the user device, for example anonymized according to the user settings or privacy levels set at the user device, the user-side sensors 50, 51, 53 and/or the user-side devices 52, 54. For example, in the event of a chat conversation, with 'Location'-'Medium' privacy level, the user device 10 could send $S_t$ together with the user response "I will be going on a business trip tomorrow to Europe" to the server 100.

Further, the server 100 may be configured to compute, calculate and/or derive a reinforcement learning reward based on one or more sentiment scores, for example the final sentiment score, as exemplary described in the following.

For training the reinforcement learning model 110, two functions of the reinforcement learning (RL) engine or model 110 may be considered: a rewards function and a reinforcement learning (RL) agent policy, which may together regulate the RL engine or model 110 content personalization. A categorized content catalogue can be considered, for example in the knowledge base, where server 100 or app may provide recommendations, notifications 14, 16 and/or (chat) responses, which can be grouped into categories related to user interests, for example Travel, Entertainment, Health, Location, or the like.

The rewards function $f_r$, which computes the RL reward $r_t$ corresponding to the last RL Engine (action $a_t$) recommendation, notification 14, 16 and/or response based on the determined user sentiment $S_t$, may be given as follows:

$r_t=f_r(S_t)$, where function $f_r$ logic may be given as follows:

If ($S_t=0$), this learning loop and or the sentiment score can be ignored due to inconsistency in the sentiment scores, as described hereinabove.

With historical normalization: For $S_t=[1-10]$, the $S_t$ value may be further normalized based on the historical context, before assigning it to the reward value $r_t$. The historical context is determined as follows.

In the case of an ongoing (continuous) conversation, the current sentiment score $S_t$ can be compared with that of a sentiment score curve of the conversation so far $SC_{t-1}$ to normalize its impact. For instance, if the conversation sentiment score was already declining, a low current sentiment $S_t$ might be assumed to not be the fault of the last action only; and as such the reward $r_t$ can be calibrated accordingly. On the other hand, given a declining sentiment curve $SC_{t-1}$, a high sentiment $S_t$ would imply that the last action had a very positive impact on the user and hence its corresponding reward can be boosted and/or increased further.

In the case of an ad-hoc recommendation, a similar normalization logic can be applied where the current sentiment $S_t$ can be calibrated according to feedback (sentiment scores) previously received for recommendation of the same category as that of the last action.

For delayed rewards, another strategy can also be applied, for both continuous conversations and ad-hoc recommendations, where the RL rewards of the last m actions can be combined and applied (retroactively) to the $[a_t, a_{t-1}, \ldots, a_{t-m}]$. For instance, if the current sentiment $S_t$ is low for a recommendation of category 'Travel', to which the user has been known to react very positively (to other 'Travel' recommendations) in the past; the delayed rewards strategy would simply buffer the current $(a_t, S_t)$ and provide an indication to the RL Agent (Policy) to try another recommendation of the same category to "validate" the user sentiment score before updating the rewards for both $a_t$ and $a_{t+1}$.

Accordingly, the server 100 may be configured to determine and/or compute the reinforcement learning reward based on determining a trend of a plurality and/or series of previous sentiment scores, for example a plurality and/or series of previously determined final sentiment scores determined at least in part based on one or more notifications provided to the user. Further, a weight may be determined based on the determined trend of the plurality and/or the series of previous sentiment scores, and the reinforcement learning reward may be determined based on the determined weight and the final sentiment score. Alternatively or additionally, the final sentiment score can be compared with the trend of the plurality and/or series of previous sentiment scores, and the reinforcement learning reward can be determined based on the comparison. Alternatively or additionally, the reinforcement learning reward can be determined based on a plurality of previously determined reinforcement learning rewards.

For the RL agent policy function, a policy (1−p) can be considered along the lines of an epsilon greedy strategy, where the agent policy is to try "exploration" with a (configurable) probability p. Two adaptations can be foreseen to accommodate the rewards function strategies (outlined above), for example "delayed rewards".

In the case of "delayed rewards", the RL Agent may not apply the policy (1−p) to select the next best action but may rather provide a recommendation "similar" to the last action: $a_{t+1} \sim a_t$.

For a hierarchical policy, given a categorized content catalogue, the hierarchical (1−p) policy can be applied, where the policy may be first used to select a 'Category': {Travel, Entertainment, Health, or the like}, and then a recommendation within the selected category C can be applied with an exploitation probability $q_C$: $(1-q_C)$. The p and $q_C$ policy exploitation probability values can be dynamically adapted based on the coverage of recommendations within the respective categories with known rewards.

Figure 4:
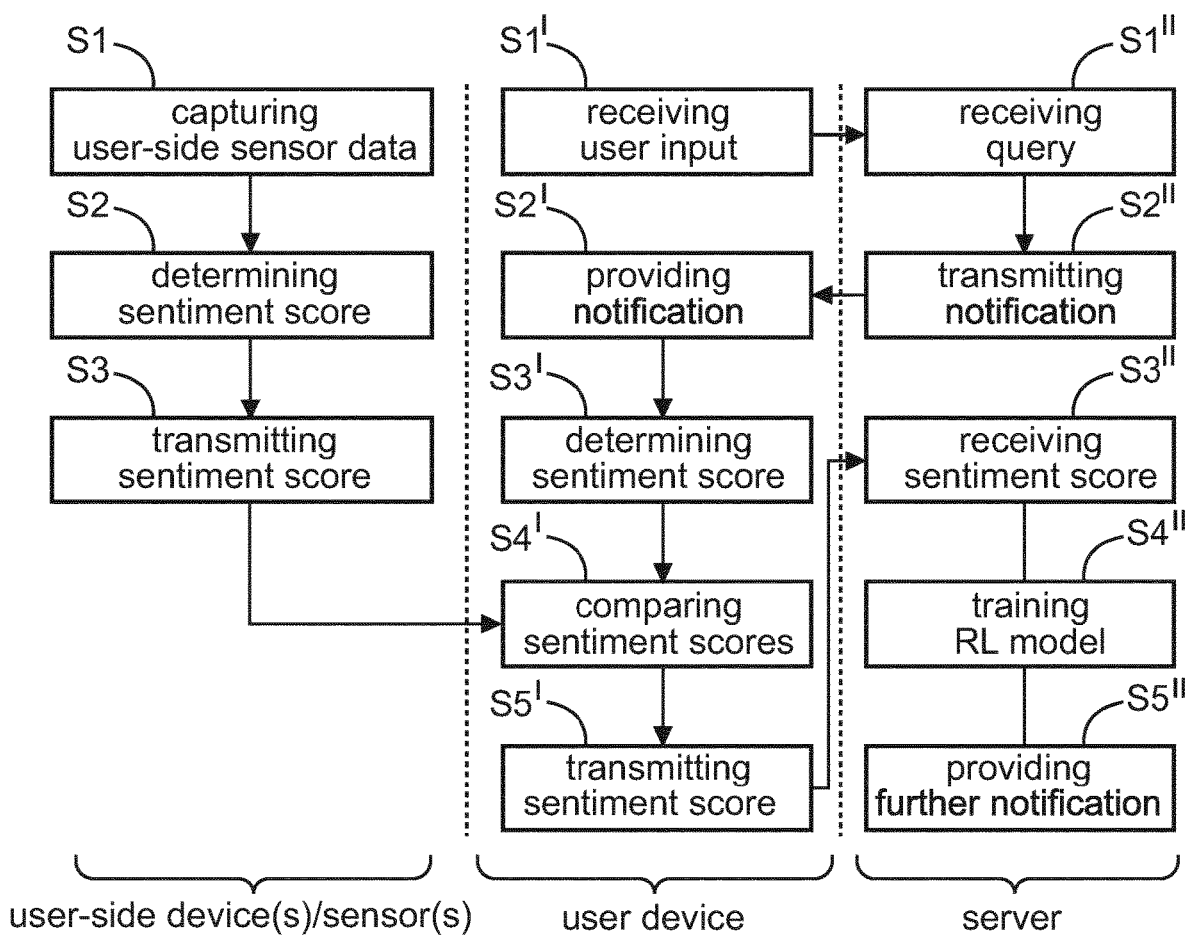
FIG. 4 shows a flowchart illustrating a method for interactive communication.

FIG. 4 shows a flowchart illustrating a method for interactive communication. The interactive communication may be performed by a system 500, for example as described with reference to FIGS. 1 to 3 and/or as described in accordance with any of the first to twenty-fifth aspects of the present disclosure.

The left column in FIG. 4 shows steps that are performed by one or more user-side sensors 50, 51, 53 and/or one or more user-side devices 52, 54. The middle column of FIG. 4 shows steps that are performed by the user device 10. The right column in FIG. 4 shows steps that are performed by the server 100.

It should be noted that at least some of the steps of the method of FIG. 4 can be performed simultaneously and some steps are performed sequentially.

In step S1' a user input is received at the user device 10, for example via user interface 12. The user input may refer to and/or be indicative of a query, for example a question. The query is further transmitted in step S1' to the server 100 and received by the server 100 at step S1".

Further, in step S1", the server 100 determines at least one notification 14, 16, for example in the form of a response to the query or question. Thus, the notification provided in response to the query or question provided by the user device 10 may be considered as a response notification.

In step S2", the at least one notification 14, 16 is transmitted to the user device 10 and provided on the user device 10, for example displayed on the user interface 12, in step S2'.

Further, in step S3', reaction data is acquired by the user device 10, for example using sensor data of one or more sensors 24, 26, 28 and one or more (current) sentiment scores are computed based on the reaction data.

Further, in step S1, user-side sensor data is captured by on one or more user-side sensors 50, 51, 53 and/or one or more user-side devices 52, 54.

In step S2, one or more user side sentiment scores are determined and transmitted in step S3 to the user device 10.

In step S4', the one or more user-side sentiment scores are received at the user device 10 and compared to one or more (current) sentiment scores determined by the user device. Therein, a final sentiment score may be determined S4'.

In step S5', at least one of the final sentiment score, the one or more (current) sentiment scores, and the one or more user-side sentiment scores is transmitted to the server 100, which receives one or more of these sentiment scores in step S3".

In step S4", the reinforcement learning ("RL") model 110 of the server 100 is trained based on at least one of the final sentiment score, the one or more (current) sentiment scores, and the one or more user-side sentiment scores.

Further, in step S5" a further notification 14, 16 can be sent to the user device 10 or the server 100 can await a further query from the user device 10. The further notification may be a response notification provided in response to the further query from the user device 10.

Various modifications to the method of FIG. 4 are possible. For instance, the user-side sentiment scores can be transmitted to the server 100 and/or the (current) sentiment scores can be transmitted to the server 100, wherein the server 100 may then determine the final sentiment score.

Moreover, one or more of the final sentiment score, the (current) sentiment score(s), and the user-side sentiment score(s) can be validated on the user device 10 and/or on the server 100 based on comparing at least two of these sentiment scores, as described in more detail hereinabove and hereinbelow.

Figure 5:
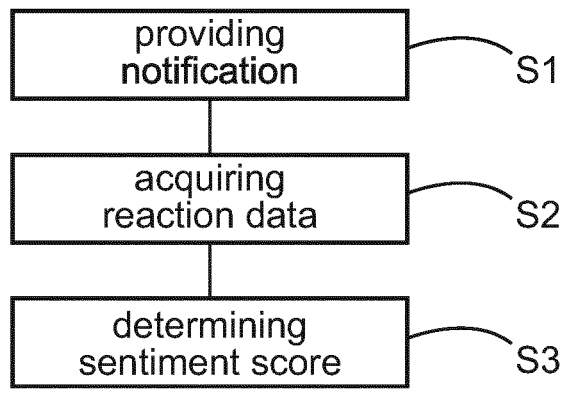
FIG. 5 shows a flowchart illustrating a method for interactive communication of a user device with a server.

FIG. 5 shows a flowchart illustrating a method for interactive communication of a user device 10 with a server 100. In particular, the method illustrated in FIG. 5 may correspond to the method according to the first aspect of the present disclosure. The method of FIG. 5 may refer to a method of operating a user device 10, for example a user device 10 as described with reference to any of the foregoing Figures or any of the first to twenty-fifth aspect of the present disclosure.

Step S1 comprises providing, on the user device 10, a notification 14, 16 to a user of the user device 10.

Step S2 comprises acquiring reaction data indicative of a reaction of the user to the notification 14, 16.

Step S3 comprises determining, based on the acquired reaction data, a sentiment score for transmission to the server 100, wherein the sentiment score is indicative of a sentiment of the user in reaction to the notification 14, 16.

The method can comprise numerous further steps, for example as described with reference to any of the methods of the first, the fourth, the seventh, the tenth, the thirteenth and the fourteenth aspect of the present disclosure.

Figure 6:
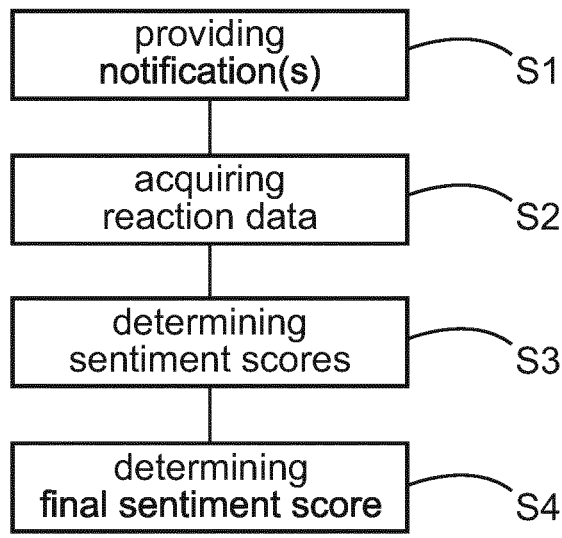
FIG. 6 shows a flowchart illustrating a method for interactive communication of a user device with a server.

FIG. 6 shows a flowchart illustrating a method for interactive communication of a user device 10 with a server 100. In particular, the method illustrated in FIG. 6 may correspond to the method according to the fourth aspect of the present disclosure. The method of FIG. 6 may refer to a method of operating a user device 10, for example a user device 10 as described with reference to any of the foregoing Figures or any of the first to twenty-fifth aspect of the present disclosure.

In step S1, one or more notifications 14, 16 are provided to a user on a user device 10.

Step S2 comprises acquiring reaction data indicative of one or more reactions of the user to the one or more notifications 14, 16.

Step S3 comprises determining, based at least in part on the acquired reaction data, a plurality of sentiment scores, wherein at least one of the plurality of sentiment scores is indicative of a sentiment of the user in reaction to the one or more notifications 14, 16.

In step S4, a final sentiment score is determined for transmission to the server 100 based on comparing at least two of the plurality of sentiment scores with one another, wherein the final sentiment score is usable by the server 100 for training a reinforcement learning model 110 implemented on the server 100.

The method can comprise numerous further steps, for example as described with reference to any of the methods of the first, the fourth, the seventh, the tenth, the thirteenth and the fourteenth aspect of the present disclosure.

Figure 7:
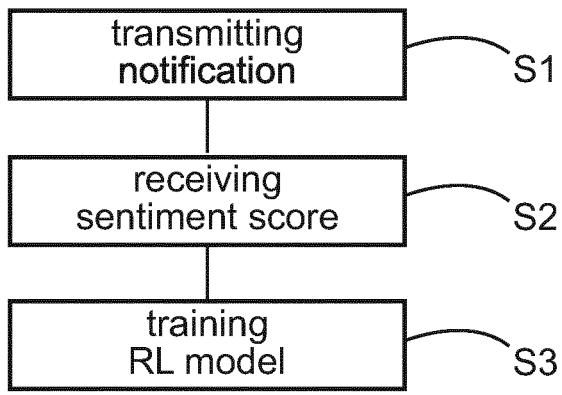
FIG. 7 shows a flowchart illustrating a method for interactive communication of a server with a user device.

FIG. 7 shows a flowchart illustrating a method for interactive communication of a server 100 with a user device 10. In particular, the method illustrated in FIG. 7 may correspond to the method according to the seventh aspect of the present disclosure. The method of FIG. 7 may refer to a method of operating a server 100, for example a server 100 as described with reference to any of the foregoing Figures or any of the first to twenty-fifth aspect of the present disclosure.

Step S1 comprises transmitting a notification 14, 16 from the server 100 to the user device 10.

Step S2 comprises receiving, by the server 100, a sentiment score, wherein the sentiment score correlates with a reinforcement learning reward for training a reinforcement learning model 110 implemented on the server 100.

Step S3 comprises training the reinforcement learning ("RL") model 110 implemented on the server 100 based on the received sentiment score.

The method can comprise numerous further steps, for example as described with reference to any of the methods of the first, the fourth, the seventh, the tenth, the thirteenth and the fourteenth aspect of the present disclosure.

Figure 8:
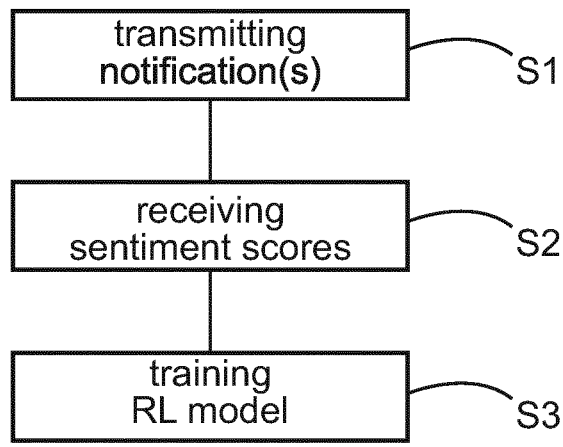
FIG. 8 shows a flowchart illustrating a method for interactive communication of a server with a user device.

FIG. 8 shows a flowchart illustrating a method for interactive communication of a server 100 with a user device 10. In particular, the method illustrated in FIG. 8 may correspond to the method according to the tenth aspect of the present disclosure. The method of FIG. 8 may refer to a method of operating a server 100, for example a server 100 as described with reference to any of the foregoing Figures or any of the first to twenty-fifth aspect of the present disclosure.

Step S1 comprises transmitting one or more notifications 14, 16 from the server 100 to the user device 10.

Step S2 comprises receiving, by the server 100, a plurality of sentiment scores, wherein each of the plurality of sentiment scores correlates with a reinforcement learning reward for training a reinforcement learning model 110 implemented on the server 100.

Step S3 comprises training the reinforcement learning ("RL") model 110 implemented on the server 100 based on comparing at least two of the plurality of sentiment scores with one another.

The method can comprise numerous further steps, for example as described with reference to any of the methods of the first, the fourth, the seventh, the tenth, the thirteenth and the fourteenth aspect of the present disclosure.

Figure 9:
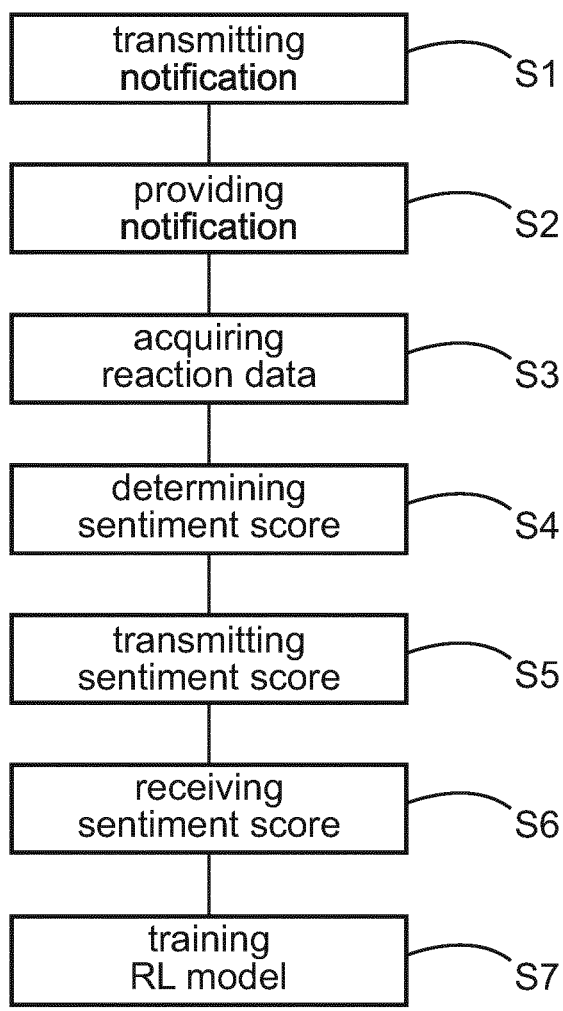
FIG. 9 shows a flowchart illustrating a method between a user device and a server.

FIG. 9 shows a flowchart illustrating a method between a user device 10 and a server 100. In particular, the method illustrated in FIG. 9 may correspond to the method according to the thirteenth aspect of the present disclosure. The method of FIG. 9 may refer to a method of operating a system 500, for example a system 500 as described with reference to any of the foregoing Figures or any of the first to twenty-fifth aspect of the present disclosure.

Step S1 comprises transmitting a notification 14, 16 from the server 100 to the user device 10.

Step S2 comprises providing, on the user device 10, the notification 14, 16 to a user of the user device 10.

Step S3 comprises acquiring, with the user device 10 and/or with at least one user-side device 52, 54, reaction data indicative of a reaction of the user to the notification 14, 16.

Step S4 comprises determining, with the user device 10 and/or with the at least one user-side device 52, 54, a sentiment score based on the acquired reaction data, wherein the sentiment score is indicative of a sentiment of the user in reaction to the notification 14, 16, and wherein the sentiment score correlates with a reinforcement learning reward for training a reinforcement learning model 110 implemented on the server 100.

Step S5 comprises transmitting the determined sentiment score to the server 100 from the user device 10 and/or the at least one user-side device 52, 54.

Step S6 comprises receiving, by the server 100, the sentiment score.

Step S7 comprises training the reinforcement ("RL") model 110 implemented on the server 100 based on the sentiment score received by the server 100.

The method can comprise numerous further steps, for example as described with reference to any of the methods of the first, the fourth, the seventh, the tenth, the thirteenth and the fourteenth aspect of the present disclosure.

Figure 10:
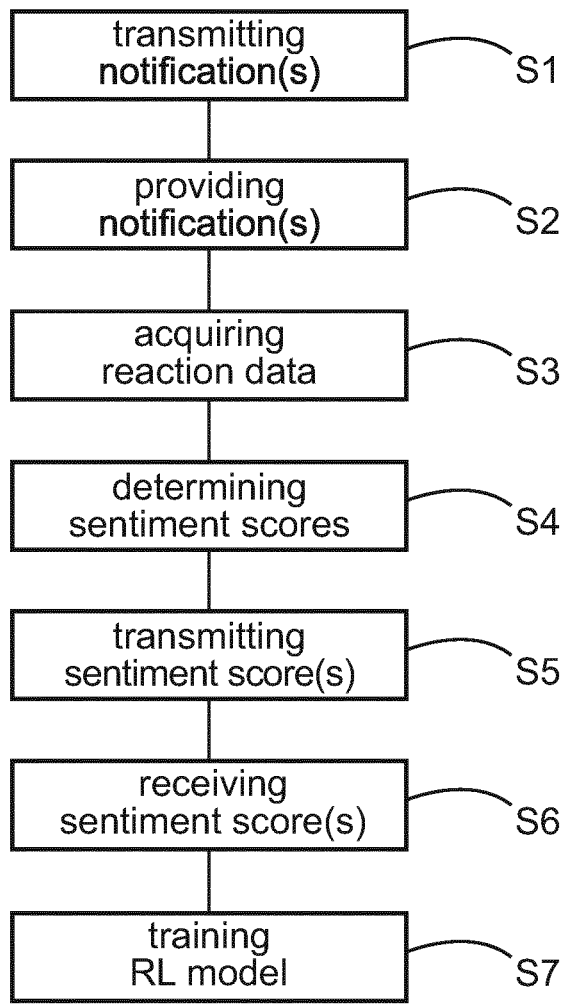
FIG. 10 shows a flowchart illustrating a method between a user device and a server.

FIG. 10 shows a flowchart illustrating a method between a user device 10 and a server 100. In particular, the method illustrated in FIG. 9 may correspond to the method according to the fourteenth aspect of the present disclosure. The method of FIG. 10 may refer to a method of operating a system 500, for example a system 500 as described with reference to any of the foregoing Figures or any of the first to twenty-fifth aspect of the present disclosure.

Step S1 comprises transmitting one or more notifications 14, 16 from the server 100 to the user device 10.

Step S2 comprises providing, on the user device 10, the one or more notifications 14, 16 to a user of the user device 10.

Step S3 comprises acquiring, with the user device 10 and/or with at least one user-side device 52, 54, reaction data indicative of one or more reactions of the user to the one or more notifications 14, 16.

Step S4 comprises determining, with the user device 10 and/or with the at least one user-side device 52, 54, a plurality of sentiment scores based on the acquired reaction data, wherein each of the plurality of sentiment scores correlates with a reinforcement learning reward for training a reinforcement learning model 110 implemented on the server 100.

Step S5 comprises transmitting at least one of the plurality of sentiment scores to the server 100 from the user device 10 and/or the at least one user-side device 52, 54.

Step S6 comprises receiving, by the server 100, at least one of the plurality of sentiment scores.

Step S7 comprises training the reinforcement learning ("RL") model 110 implemented on the server 100 based on at least one of the plurality of sentiment scores received by the server 100.

The method can comprise numerous further steps, for example as described with reference to any of the methods of the first, the fourth, the seventh, the tenth, the thirteenth and the fourteenth aspect of the present disclosure.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±20% of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A computer-implemented method for interactive communication of a user device with a server, the method comprising:
   providing, on the user device, a notification to a user of the user device;
   acquiring reaction data indicative of a reaction of the user to the notification; and
   determining, based on the acquired reaction data, a sentiment score for transmission to the server,
   wherein the sentiment score is an anonymized numerical measure indicative of a sentiment of the user in reaction to the notification, and
   wherein the sentiment score correlates with a reinforcement learning reward configured for being used by the server for training a reinforcement learning model implemented on the server.

2. The method according to claim 1,
   wherein the determined sentiment score is transmitted from the user device, and/or
   wherein the determined sentiment score is transmitted from a user-side device communicatively coupled with the user device.

3. The method according to claim 1, wherein determining the sentiment score comprises:
   determining an intermediate sentiment score based on the acquired reaction data, and
   anonymizing the intermediate sentiment score, thereby generating the sentiment score.

4. The method according to claim 3, wherein the sentiment score is anonymized based on normalizing the intermediate sentiment score with a reference sentiment score.

5. The method according to claim 3, further comprising removing the intermediate sentiment score from the user device upon anonymizing the intermediate sentiment score.

6. The method according to claim 1, further comprising removing the sentiment score from the user device upon transmitting the sentiment score to the server.

7. The method according to claim 1, wherein acquiring the reaction data includes:
   capturing sensor data with at least one sensor of the user device, and
   deriving, with the user device, the reaction data from the captured sensor data of the at least one sensor of the user device.

8. The method according to claim 1, wherein acquiring the reaction data comprises:
   receiving, with the user device, user-side sensor data from at least one user-side sensor communicatively couplable with the user device, and
   deriving, with the user device, the reaction data from the received user-side sensor data of the at least one user-side sensor.

9. The method according to claim 1,
   further comprising deriving, from the reaction data, at least one environmental parameter, wherein the at least one environmental parameter is indicative of an environment of the user affecting the sentiment of the user, and wherein the sentiment score is determined based on the at least one environmental parameter.

10. The method according to claim 1, wherein the reaction data is acquired by the user device based on sensor data of at least one sensor of the user device and based on user-side sensor data of at least one user-side sensor arranged in an environment of the user device.

11. A nontransitory computer-readable storage medium comprising computer program instructions stored therein, which, when executed on one or more processors of a user device, cause the user device to perform the steps of the method according to claim 1.

12. A user device for interactive communication with a server, wherein the user device is configured to perform the steps of the method according to claim 1.

* * * * *